US012172453B2

(12) United States Patent
Moran et al.

(10) Patent No.: US 12,172,453 B2
(45) Date of Patent: Dec. 24, 2024

(54) NAIL POLISH APPLICATION AND SOLIDIFICATION APPARATUS

(71) Applicant: Nailomatic Ltd., Tel-Aviv (IL)

(72) Inventors: Omri Moran, Brooklyn, NY (US); Avichay Mor Yosef, Jerusalem (IL); Ron Miller, Herzlia (IL); Omer Dolev, Tel-Aviv (IL); Boris Khodos, Beer Yaakov (IL)

(73) Assignee: Nailomatic Ltd., Tel-Aviv (IL)

( * ) Notice: Subject to any disclaimer, the term of this patent is extended or adjusted under 35 U.S.C. 154(b) by 631 days.

(21) Appl. No.: 17/424,567

(22) PCT Filed: Jan. 22, 2020

(86) PCT No.: PCT/IL2020/050090
§ 371 (c)(1),
(2) Date: Jul. 21, 2021

(87) PCT Pub. No.: WO2020/152683
PCT Pub. Date: Jul. 30, 2020

(65) Prior Publication Data

US 2022/0117371 A1 Apr. 21, 2022

Related U.S. Application Data

(60) Provisional application No. 62/795,050, filed on Jan. 22, 2019.

(51) Int. Cl.
*B41J 3/407* (2006.01)
*A45D 29/14* (2006.01)

(52) U.S. Cl.
CPC ............ *B41J 3/4073* (2013.01); *A45D 29/14* (2013.01); *A45D 2200/205* (2013.01)

(58) Field of Classification Search
None
See application file for complete search history.

(56) References Cited

U.S. PATENT DOCUMENTS

| | | | |
|---|---|---|---|
| 2,980,940 | A | 9/1958 | Crowe |
| 2014/0133895 | A1 | 5/2014 | Dockery |

(Continued)

FOREIGN PATENT DOCUMENTS

| | | |
|---|---|---|
| WO | WO 2018/142401 | 8/2018 |
| WO | WO 2020/152683 | 7/2020 |

OTHER PUBLICATIONS

Supplementary European Search Report and the European Search Opinion Dated Oct. 4, 2022 From the European Patent Office Re. Application No. 20744603.0. (5 Pages).

(Continued)

*Primary Examiner* — Erica S Lin

(57) ABSTRACT

Apparatuses and methods for automatically applying and solidifying nail polish on nails of a user comprising operating one or more nail polish applying elements configured to crudely apply nail polish on one or more nail surfaces of one or more fingers identified in a treatment space based on analysis of sensory data captured by one or more imaging sensors configured to capture sensory data depicting the treatment space, operating one or more solidifying energy source(s) to solidify the nail polish applied on the nail surface(s) and operating one or more nail polish removal elements to accurately remove nail polish residues applied on skin of the finger(s) surrounding at least partially a boundary of the nail surface(s) while avoiding removing the nail polish applied within the boundary.

17 Claims, 25 Drawing Sheets

(56) References Cited

U.S. PATENT DOCUMENTS

| | | | | |
|---|---|---|---|---|
| 2015/0007841 | A1* | 1/2015 | Yamasaki | A45D 29/00 132/73.5 |
| 2016/0175227 | A1* | 6/2016 | Samaia Landis | A45D 29/004 424/61 |
| 2016/0270506 | A1 | 9/2016 | Kafuku | |
| 2017/0000235 | A1 | 1/2017 | Teshima | |
| 2017/0042306 | A1 | 2/2017 | Yiu | |
| 2017/0215550 | A1* | 8/2017 | Walia | A45D 44/005 |
| 2018/0369093 | A1* | 12/2018 | Tran | A61K 8/19 |
| 2019/0239616 | A1* | 8/2019 | Walia | B41J 3/4073 |
| 2019/0313765 | A1* | 10/2019 | Leong | G06F 3/13 |

OTHER PUBLICATIONS

International Preliminary Report on Patentability Dated Aug. 5, 2021From the International Bureau of WIPO Re. Application No. PCT/IL2020/050090. (7 Pages).

International Search Report and the Written Opinion Dated Jul. 1, 2020 From the International Searching Authority Re. Application No. PCT/IL2020/050090. (14 Pages).

Invitation to Pay Additional Fees Dated Apr. 24, 2020 From the International Searching Authority Re. Application No. PCT/IL2020/050090. (2 Pages).

Requisition by the Examiner Dated Dec. 13, 2023 From the Innovation, Science and Economic Development Canada, Canadian Intellectual Property Office Re. Application No. 3,125,965. (6 Pages).

* cited by examiner

NAIL POLISH APPLICATION AND SOLIDIFICATION APPARATUS

RELATED APPLICATIONSAPPLICATION

This application is a National Phase of PCT Patent Application No. PCT/IL2020/050090 having International filing date of Jan. 22, 2020, which claims the benefit of priority under 35 USC § 119 (e) of U.S. Provisional Patent Application No. 62/795,050 filed on Jan. 22, 2019. The contents of the above applications are all incorporated by reference as if fully set forth herein in their entirety.

FIELD AND BACKGROUND OF THE INVENTION

The present invention, in some embodiments thereof, relates to a nail polish applying and solidification apparatus and, more particularly, but not exclusively, to a nail polish applying and solidification apparatus configured for crude nail polish application, solidification of nail polish applied on the nail(s) and accurate removal of nail polish residues from skin surrounding the nail(s).

Applying nail polish to fingernails and/or toenails has been practiced since ancient times. Decorating the finger and/or toe nails is still fashionable in modern times as many people, in particular woman apply nail polish to decorate their fingernails and/or toenails.

The nail polish, for example, base coat, a top coat, a nail polish and/or the like is a fluid that once applied on the nail surface dries to form a solid layer over the nail surface.

Presently, manual nail polish application is the most common method. The manual nail polish application may require some expertise, skills and/or experience and may be time consuming. In addition, manual application of the nail polish to one self's nails may be physically challenging due to the need to master the art in both hands and in case of the foot toenails reaching conveniently and efficiently the toes may also present difficulties. While many individuals have mastered the art of applying the nail polish manually for themselves, nail polish application may often be practiced by professional manicurists and/or pedicurists.

SUMMARY OF THE INVENTION

According to a first aspect of the present invention there is provided an apparatus for nail polish application and solidification, comprising:

- One or more nail polish applying elements configured to apply nail polish.
- One or more solidifying energy sources configured to solidify nail polish.
- One or more nail polish removal elements configured to remove nail polish.
- One or more imaging sensors configured to capture sensory data depicting a treatment space.
- One or more processors executing a code for:
  - Analyzing the sensory data to identify one or more nail surface of one or more fingers.
  - Calculating instructions for operating one or more of the nail polish applying element to crudely apply nail polish on one or more of the nail surface.
  - Calculating instructions for operating one or more of the solidifying energy source to solidify the nail polish applied within on one or more of the nail surfaces.

- Calculating instructions for operating the one or more nail polish removal element to accurately remove nail polish residues applied on skin of the at least one finger surrounding at least partially a boundary of the at least one nail surface while avoiding removing the nail polish applied within the boundary.

According to a second aspect of the present invention there is provided a method of controlling an apparatus for nail polish application and solidification, comprising using one or more processors of an apparatus for nail polish application and solidification. One or more of the processors executing a code for:

- Analyzing sensory data captured by one or more imaging sensors depicting a treatment space to identify one or more nail surfaces of one or more fingers.
- Calculating instructions for operating one or more nail polish applying elements to crudely apply nail polish on one or more of the nail surfaces.
- Calculating instructions for operating one or more solidifying energy sources to solidify the nail polish applied within on one or more of the nail surfaces.
- Calculating instructions for operating one or more nail polish removal elements to accurately remove nail polish residues applied on skin of the at least one finger surrounding at least partially a boundary of the at least one nail surface while avoiding removing the nail polish applied within the boundary.

According to a third aspect of the present invention there is provided an apparatus for nail polish application and solidification, comprising:

- One or more nail polish applying elements configured to apply nail polish.
- One or more solidifying light sources configured to project solidifying light.
- One or more imaging sensors configured to capture sensory data depicting a treatment space.
- One or more processors executing a code for:
  - Analyzing the sensory data to identify one or more nail surfaces of one or more fingers.
  - Calculating instructions for operating one or more of the nail polish applying elements to crudely apply nail polish on one or more of the nail surfaces.
  - Calculating instructions for operating one or more of the solidifying light sources such that solidifying light emitted therefrom is projected within a boundary of one or more of the nail surfaces while avoiding projecting light on skin surrounding the boundary thus accurately solidifying only nail polish applied within the boundary.

According to a fourth aspect of the present invention there is provided a method of controlling an apparatus for nail polish application and solidification, comprising using one or more processors of an apparatus for nail polish application and solidification. One or more of the processors executing a code for:

- Analyzing sensory data captured by one or more imaging sensors depicting a treatment space to identify one or more nail surfaces of one or more fingers.
- Calculating instructions for operating one or more nail polish applying elements to crudely apply nail polish on one or more of the nail surfaces.
- Calculating instructions for operating one or more solidifying light sources such that solidifying light emitted therefrom is projected on one or more of the nail surfaces within a boundary of one or more of the nail surfaces while avoiding projecting solidifying light on skin surrounding at least partially the boundary thus accurately solidifying only nail polish applied within the boundary.

According to a fifth aspect of the present invention there is provided an apparatus for nail polish application and solidification, comprising:

One or more nail polish applying elements configured to apply nail polish in a treatment space.

One or more solidifying light sources configured to project solidifying light in the treatment space.

One or more imaging sensors configured to capture sensory data depicting the treatment space.

One or more processors executing a code for:

Analyzing the sensory data to identify one or more nail surfaces of one or more fingers.

Calculating instructions for operating one or more of the solidifying light sources such that light emitted therefrom is projected on a borderline of a boundary of one or more of the nail surfaces while avoiding projecting solidifying light or heat within the boundary.

Calculating instructions for operating one or more of the nail polish applying elements to crudely apply nail polish on one or more of the nail surfaces. The nail polish reaching the borderline solidifies by the projected solidifying light thus limiting dissemination of the nail polish to within the boundary of one or more of the nail surfaces.

Calculating instructions for operating one or more of the solidifying light sources such that solidifying light emitted therefrom solidifies the disseminated nail polish.

According to a sixth aspect of the present invention there is provided an apparatus for nail polish application and solidification, comprising:

One or more nail polish applying elements configured to apply nail polish in a treatment space.

One or more air blowers constructed to blow air in the treatment space.

One or more imaging sensors configured to capture sensory data depicting the treatment space.

One or more processors executing a code for:

Analyzing the sensory data captured by one or more of the imaging sensor to identify one or more nail surfaces of one or more fingers.

Calculating instructions for operating one or more of the nail polish applying elements to crudely apply nail polish fluid on one or more of the nail surfaces.

Calculating instructions for operating one or more of the air blowers such that air blown therefrom is blown on one or more of the nail surfaces within a boundary of one or more of the nail surfaces while avoiding blowing air on skin surrounding at least partially the boundary thus accurately solidifying only nail polish applied within the boundary.

According to a seventh aspect of the present invention there is provided a method of controlling an apparatus for nail polish application and solidification, comprising using one or more processors of an apparatus for nail polish application and solidification. One or more of the processors executing a code for:

Analyzing sensory data captured by one or more imaging sensors to identify one or more nail surfaces of one or more fingers.

Calculating instructions for operating the one or more nail polish applying elements to crudely apply nail polish on one or more of the nail surfaces.

Calculating instructions for operating one or more air blowers such that air blown therefrom is blown on the one or more nail surface within a boundary of one or more of the nail surfaces while avoiding blowing air on skin surrounding at least partially the boundary thus accurately solidifying only nail polish applied within the boundary.

In a further implementation form of the first, second, third, fourth, fifth, sixth and/or seventh aspects, the nail polish comprises one or more members of a group consisting of: a nail polish material, a base coating material, a top coating material, a gel polish material, a drying material, a polish removal material, a nail art polish and/or a medical nail treatment material.

In an optional implementation form of the first, second, third, fourth, fifth, sixth and/or seventh aspects, one or more of the nail polish applying elements are moveable by one or more actuators. One or more of the processors calculate instructions for operating one or more of the actuators according to the analysis to move one or more of the nail polish applying elements with respect to one or more of the nail surfaces.

In a further implementation form of the first, second, third, fourth, fifth, sixth and/or seventh aspects, one or more of the nail polish applying elements are part of a nail polish capsule inserted in a capsule compartment of the apparatus.

In a further implementation form of the first, second, third, fourth, fifth, sixth and/or seventh aspects, one or more of the processors are further configured to execute code for calculating instructions for operating one or more of the solidifying energy sources to accurately solidify only nail polish applied within the boundary while avoiding solidification of the nail polish residues applied on the surrounding skin.

In a further implementation form of the first, second, third, fourth, fifth, sixth and/or seventh aspects, one or more of the solidifying energy sources comprise one or more solidifying light sources configured to project solidifying light to solidify the nail polish. The solidifying light is a member of a group consisting of: Infra-Red (IR) light, Ultra Violate (UV) light and/or a coherent laser beam.

In a further implementation form of the first, second, third, fourth, fifth, sixth and/or seventh aspects, one or more of the solidifying light sources comprises a light array constructed of a plurality of limited range light sources each adjusted to project solidifying light on a respective predefined limited area of a treated surface. One or more of the processors calculate instructions for operating only a subset of the plurality of limited range light sources such that solidifying light emitted from the subset of limited range light sources is projected only within the boundary.

In a further implementation form of the first, second, third, fourth, fifth, sixth and/or seventh aspects, one or more of the solidifying light sources comprise one or more moveable focused light sources configured to project solidifying light on a limited surface area. One or more of the moveable focused light sources are moveable by one or more actuators in a longitudinal axis crossing the treatment space and in a lateral axis perpendicular to the longitudinal axis. One or more of the processors calculate instructions for operating one or more of the actuators according to the analysis to move one or more of the moveable focused light sources across one or more of the nail surfaces within the boundary.

In a further implementation form of the first, second, third, fourth, fifth, sixth and/or seventh aspects, one or more of the solidifying light sources comprise one or more wide angle light sources coupled with a light masking screen deployed between one or more of the wide angle light sources and a treated surface. One or more of the wide angle light sources is configured to emit solidifying light and the light masking screen is configured to limit the emitted solidifying light to project on a limited surface area. One or more of the processors calculate instructions for operating the light masking screen according to the analysis such that solidifying light transferred by the light masking screen is projected only within the boundary.

In a further implementation form of the first, second, third, fourth, fifth, sixth and/or seventh aspects, the light masking screen comprises a limited size opening adjusted to limit the solidifying light projection to a fraction of the limited surface area. The light masking screen is moveable to move the limited size opening across one or more of the nail surfaces within the boundary. One or more of the processors calculate instructions for moving the light masking screen according to the analysis such that solidifying light emitted by one or more of the wide angle light sources is transferred by the limited size opening only within the boundary.

In a further implementation form of the first, second, third, fourth, fifth, sixth and/or seventh aspects, the light masking screen comprises a dynamically adjustable opening. One or more of the processors calculate instructions for adjusting the adjustable opening according to the analysis such that solidifying light emitted by one or more of the wide angle light sources is transferred by the adjustable opening only within the boundary.

In a further implementation form of the first, second, third, fourth, fifth, sixth and/or seventh aspects, the light masking screen is constructed of a plurality of tiles each dynamically configurable to be in opaque state or in at least partial transparency state. One or more of the processors calculate instructions for setting each of the plurality of tiles in the at least partial transparency state according to the analysis such that a shape formed by the tiles set in the at least partial transparency state matches the boundary and hence solidifying light emitted by one or more of the wide angle light sources is transferred only within the boundary.

In a further implementation form of the first, second, third, fourth, fifth, sixth and/or seventh aspects, one or more of the solidifying energy sources comprise one or more air blowers configured to blow air to solidify the nail polish.

In a further implementation form of the first, second, third, fourth, fifth, sixth and/or seventh aspects, one or more of the air blowers are shaped to blow air over a predefined limited area of a treated surface.

In an optional implementation form of the first, second, third, fourth, fifth, sixth and/or seventh aspects, one or more of the air blowers is operated to blow air on one or more of the nail surfaces to spread the applied nail polish over one or more of the nail surfaces.

In an optional implementation form of the first, second, third, fourth, fifth, sixth and/or seventh aspects, one or more of the air blowers are operated to blow air at a first temperature on one or more of the nail surfaces to spread the applied nail polish while operated to blow air at a second temperature over one or more of the nail surfaces to solidify the spread nail polish. The second temperature is higher than the first temperature.

In a further implementation form of the first, second, third, fourth, fifth, sixth and/or seventh aspects, one or more of the solidifying energy sources comprise one or more thermally reactive substance applying elements configured to apply one or more thermally reactive substances configured to solidify the nail polish by producing heat on interaction with the nail polish applied on the one or more nail surface.

In a further implementation form of the first, second, third, fourth, fifth, sixth and/or seventh aspects, one or more of the thermally reactive substance applying elements is operated in conjunction with a masking screen deployed over one or more of the fingers. The masking screen is configured to expose the nail surface only within the boundary such that the thermal substance is applied only within the boundary of one or more of the nail surfaces.

In a further implementation form of the first, second, third, fourth, fifth, sixth and/or seventh aspects, one or more of the solidifying energy sources comprise one or more second nail polish applying elements configured to apply a second nail polish component while one or more of the nail polish applying elements are configured to apply a first nail polish component. Mixture of the first component and the second component on one or more of the nail surfaces solidifies the nail polish into a solid nail polish.

In a further implementation form of the first, second, third, fourth, fifth, sixth and/or seventh aspects, one or more of the second nail polish applying elements are operated in conjunction with a masking screen deployed over one or more of the fingers. The masking screen is configured to expose the nail surface only within the boundary such that the second nail polish component is applied only within the boundary of one or more of the nail surfaces.

In an optional implementation form of the first, second, third, fourth, fifth, sixth and/or seventh aspects, one or more of the solidifying energy sources are moveable by one or more actuators. One or more of the processors calculate instructions for operating one or more of the actuators according to the analysis to move one or more of the solidifying energy sources with respect to one or more of the nail surfaces.

In a further implementation form of the first, second, third, fourth, fifth, sixth and/or seventh aspects, one or more of the nail polish removal elements comprise one or more mechanical elements configured to perform one or more abrasion operations to remove the nail polish. The one or more abrasion operations are members of a group consisting of: scarping, scratching, sanding, peeling and/or grinding.

In a further implementation form of the first, second, third, fourth, fifth, sixth and/or seventh aspects, one or more of the nail polish removal elements comprises one or more removal substance applying elements configured to apply one or more nail polish removal substances to remove the nail polish. One or more of the nail polish removal substances are configured to remove the nail polish through one or more chemical reactions which is a member of a group consisting of: de-polymerization, random chain scissoring, side group elimination, oxidation and/or solvent reaction.

In a further implementation form of the first, second, third, fourth, fifth, sixth and/or seventh aspects, one or more of the removal substance applying elements are part of a removal substance capsule containing the removal substance. The removal substance capsule is inserted in a capsule compartment of the apparatus.

In an optional implementation form of the first, second, third, fourth, fifth, sixth and/or seventh aspects, one or more of the nail polish removal elements are moveable by one or more actuators. One or more of the processors calculate instructions for operating one or more of the actuators according to the analysis to move one or more of the nail polish removal elements with respect to one or more of the nail surfaces.

In a further implementation form of the first, second, third, fourth, fifth, sixth and/or seventh aspects, one or more of the nail polish removal elements further comprise one or more wall segments constructed to shield at least part of one or more of the nail surfaces when deployed on the boundary while one or more of the nail polish removal elements are operated to remove the nail polish from the skin surrounding one or more of the nail surfaces such that the nail polish applied on one or more of the nail surfaces is not affected by operation of the nail polish removal element(s).

In an optional implementation form of the first, second, third, fourth, fifth, sixth and/or seventh aspects, one or more protective substance applying elements configured to apply protective substance to the skin prior to application of the nail polish to prevent the nail polish from adhering to the skin.

In an optional implementation form of the first, second, third, fourth, fifth, sixth and/or seventh aspects, one or more of the protective substance applying elements are moveable by one or more actuators. One or more of the processors calculate instructions for operating one or more of the actuators according to the analysis to move one or more of the protective substance applying elements with respect to one or more of the nail surfaces.

In a further implementation form of the first, second, third, fourth, fifth, sixth and/or seventh aspects, one or more of the protective substance applying elements are part of a protective substance capsule containing the protective substance. The protective substance capsule is inserted in a capsule compartment of the apparatus.

In an optional implementation form of the first, second, third, fourth, fifth, sixth and/or seventh aspects, a protective screen is deployed over one or more of the nail surfaces within the boundary while one or more of the nail polish removal elements are operated to remove the nail polish from the skin surrounding one or more of the nail surfaces such that the nail polish applied on one or more of the nail surfaces is not affected by operation of the nail polish removal element(s).

In a further implementation form of the first, second, third, fourth, fifth, sixth and/or seventh aspects, the protective screen is dynamically adjustable. One or more of the processors calculate instructions for adjusting the adjustable opening according to the analysis such that the protective screen is deployed to accurately fit over one or more of the nail surfaces within the boundary.

In an optional implementation form of the first, second, third, fourth, fifth, sixth and/or seventh aspects, the protective screen is moveable by one or more actuators. One or more of the processors calculate instructions for operating one or more of the actuators according to the analysis to move the protective screen with respect to one or more of the nail surfaces.

In a further implementation form of the first, second, third, fourth, fifth, sixth and/or seventh aspects, one or more of the nail polish removal elements are further configured for removing previously applied nail polish from one or more of the nail surfaces prior to application of the nail polish on one or more of the nail surfaces.

In a further implementation form of the first, second, third, fourth, fifth, sixth and/or seventh aspects, one or more of the imaging sensors comprise one or more visual imaging sensors configured to capture one or more images of the treatment space.

In a further implementation form of the first, second, third, fourth, fifth, sixth and/or seventh aspects, one or more of the imaging sensors comprise one or more Radio Frequency (RF) sensors configured to transmit radio waves and intercept reflected waves reflected from objects in the treatment space to create one or more images of the treatment space.

In a further implementation form of the first, second, third, fourth, fifth, sixth and/or seventh aspects, the analysis comprises image processing for identifying one or more of:

Detecting one or more segments of the boundary of one or more of the nail surfaces.

Detecting a three dimension (3D) surface of one or more of the nail surfaces.

Detecting a 3D surface of the skin surrounding one or more of the nail surfaces.

Detecting a movement of one or more of the nail surfaces in the nail polish treatment space.

Estimating a drying state of the nail polish applied on one or more of the nail surfaces.

In an optional implementation form of the first, second, third, fourth, fifth, sixth and/or seventh aspects, the treatment space comprises one or more finger sockets. Each finger socket having a surface shaped to receive and accommodate a finger which is a member of a group consisting of: a human finger and/or a human toe.

In an optional implementation form of the first, second, third, fourth, fifth, sixth and/or seventh aspects, the nail applying and solidifying apparatus comprises one or more restriction elements adapted to limit a movement of one or more of: a palm of a user and/or one or more of the fingers while one or more of the fingers are placed in one or more of the finger sockets.

In an optional implementation form of the first, second, third, fourth, fifth, sixth and/or seventh aspects, the nail applying and solidifying apparatus comprises a hand resting ledge in front of the treatment space, the hand resting ledge having a surface shaped to receive and accommodate a palm of a user.

In an optional implementation form of the first, second, third, fourth, fifth, sixth and/or seventh aspects, the treatment space is constructed to reduce external lighting coming in from outside the nail polish treatment space.

In an optional implementation form of the first, second, third, fourth, fifth, sixth and/or seventh aspects, the nail applying and solidifying apparatus comprises one or more communication interfaces operated by one or more of the processors to communicate with one or more networked devices through one or more networks. Each of the networked devices includes a client terminal of a user using the apparatus, a remote networked node and/or the like.

In an optional implementation form of the first, second, third, fourth, fifth, sixth and/or seventh aspects, the nail applying and solidifying apparatus comprises a user interface operated by one or more of the processors to interact with one or more users. The user interface comprises one or more members of a group consisting of: an indication light, a display, a sound indication and/or a control switch.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 10A:
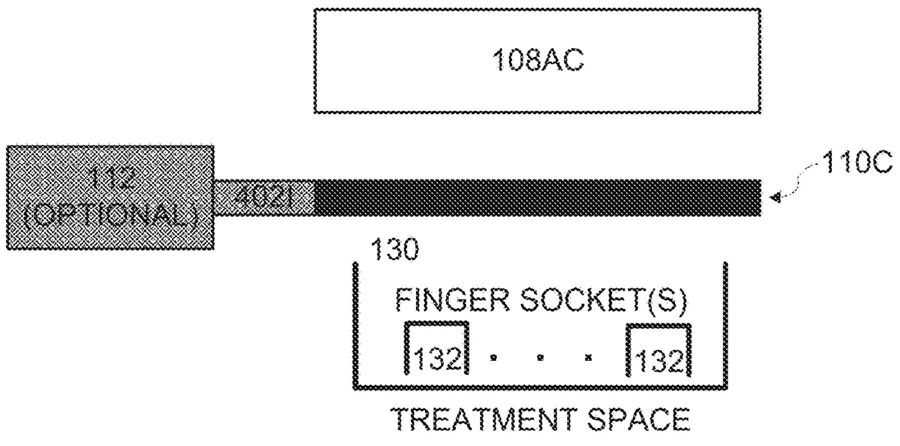
Figure 10B:
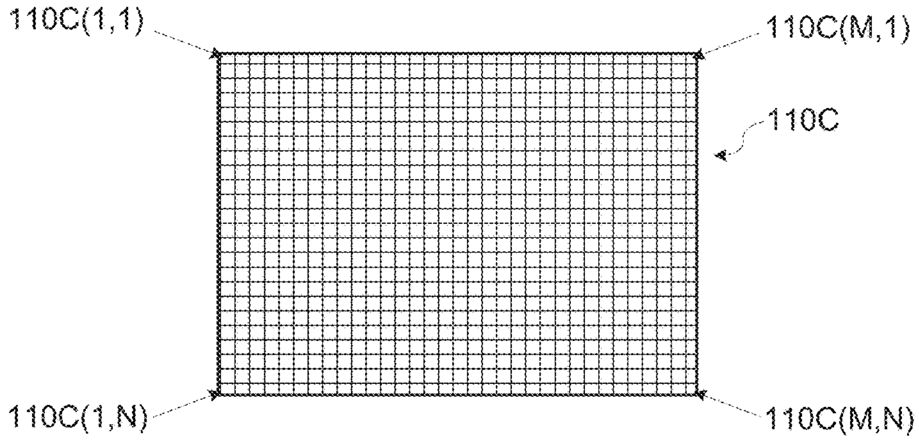
Figure 10C:
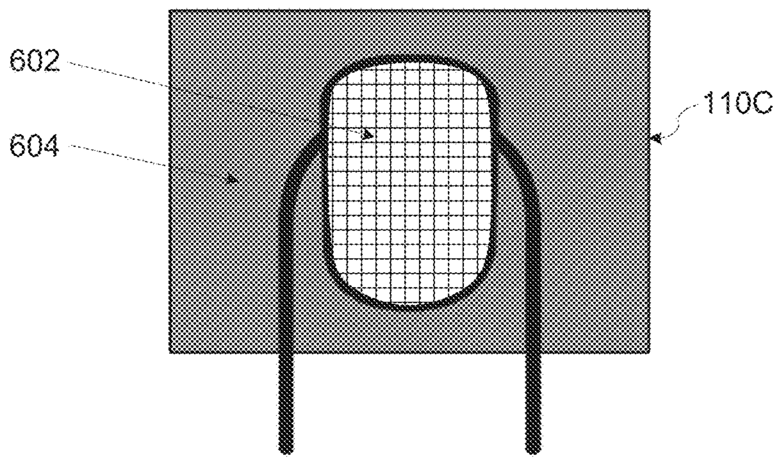
Figure 11A:
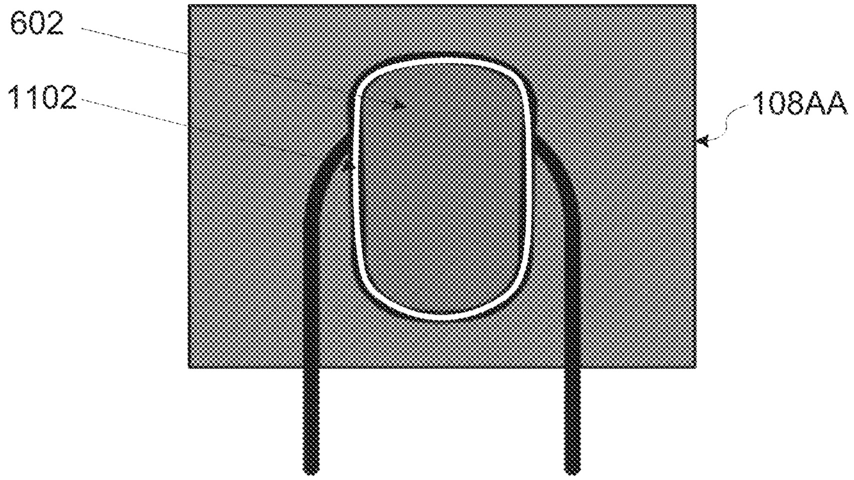
Figure 11B:
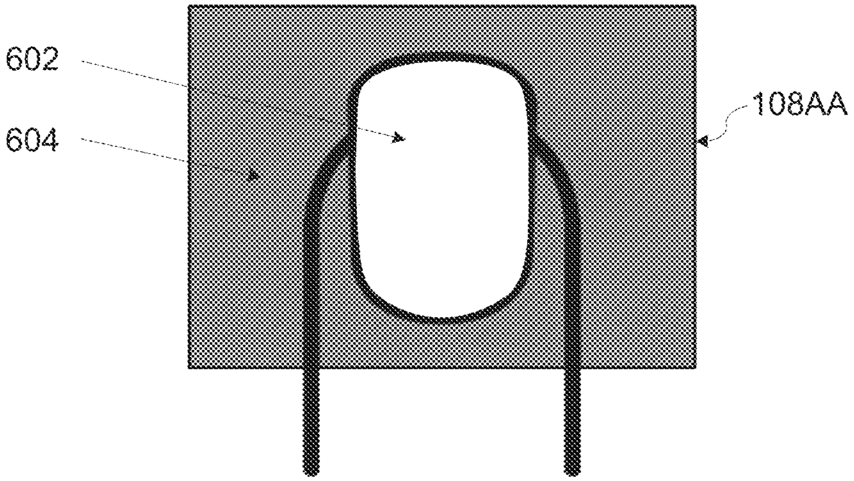
Figure 12A:
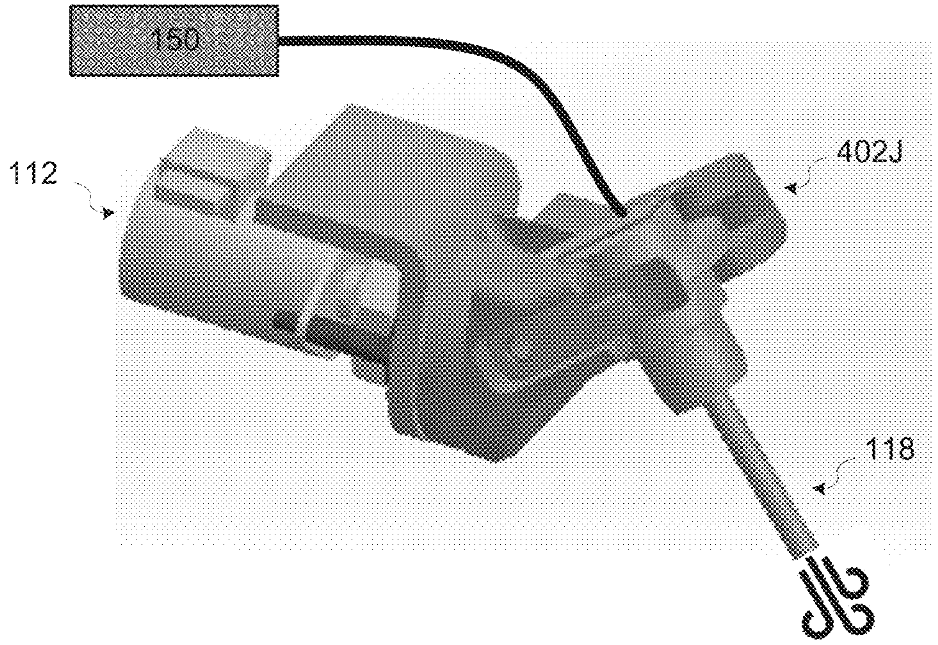
Figure 12B:
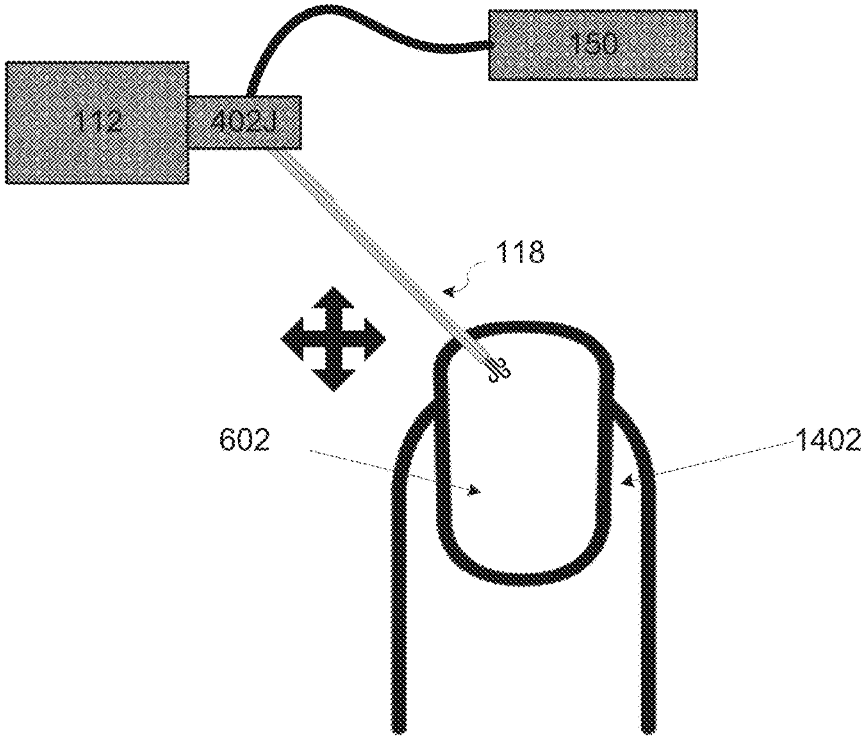
Figure 13A:
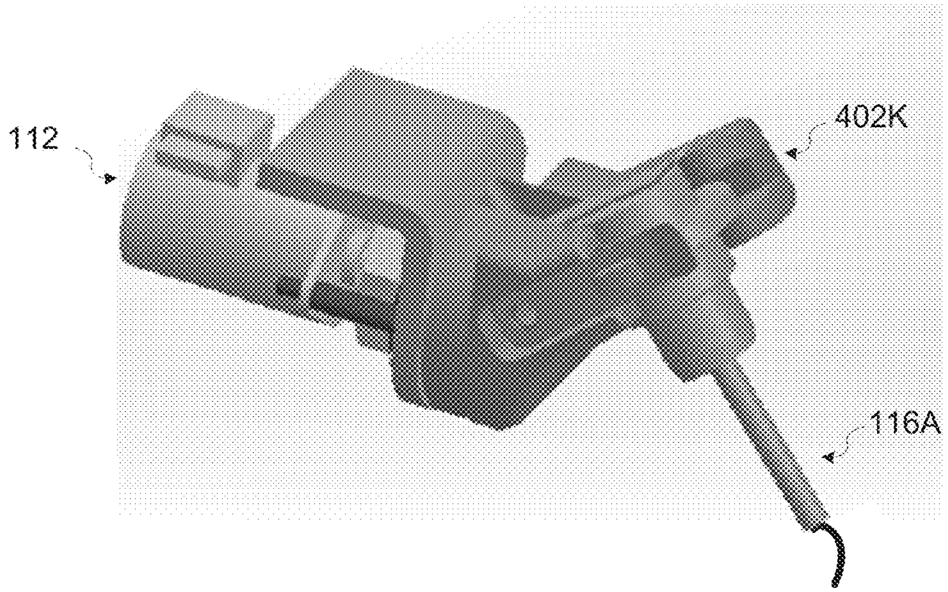
Figure 13B:
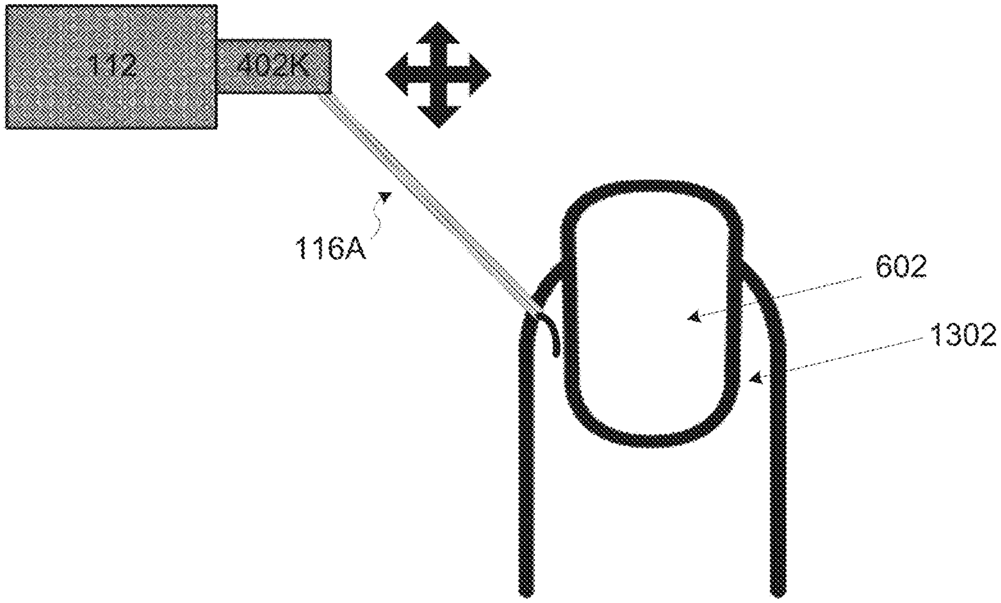
Figure 14A:
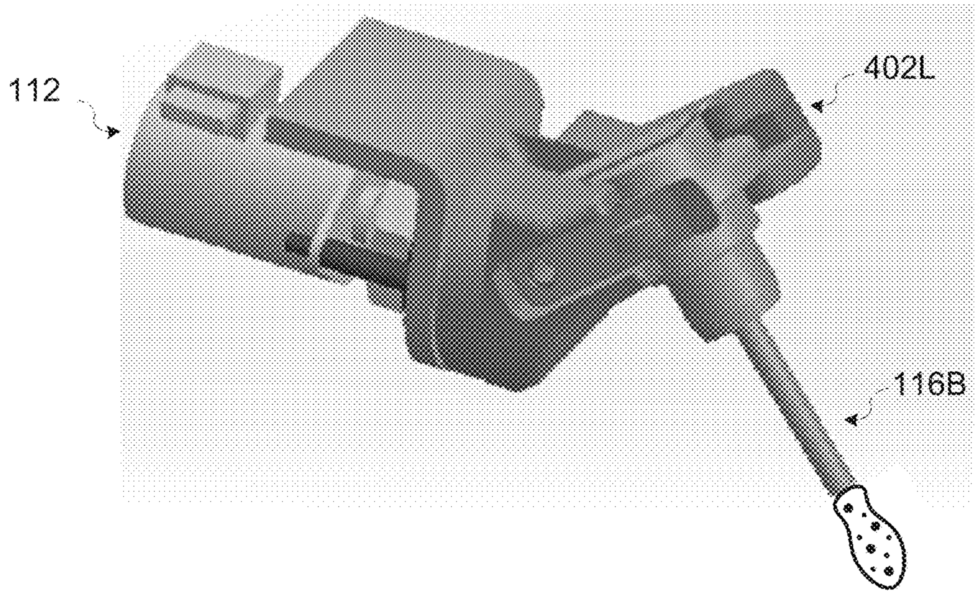
Figure 14B:
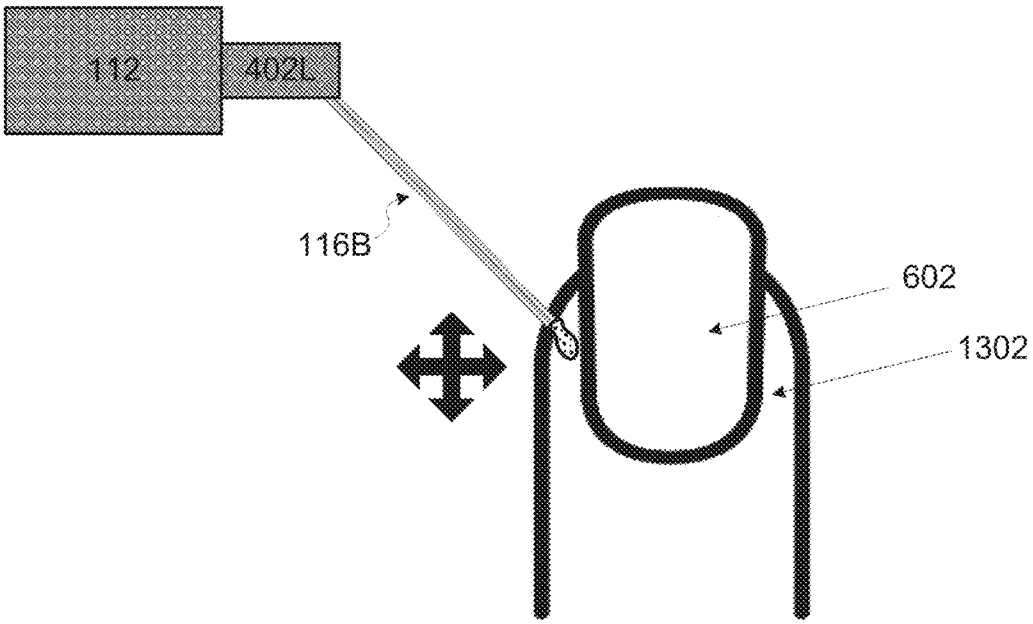
Figure 15A:
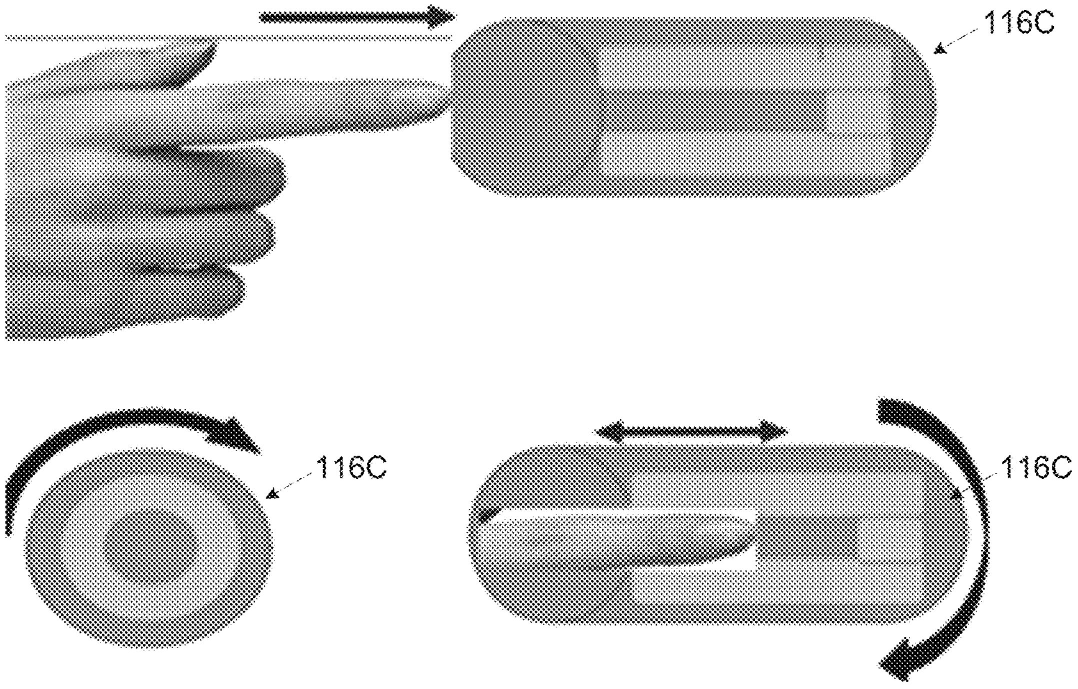
Figure 15B:
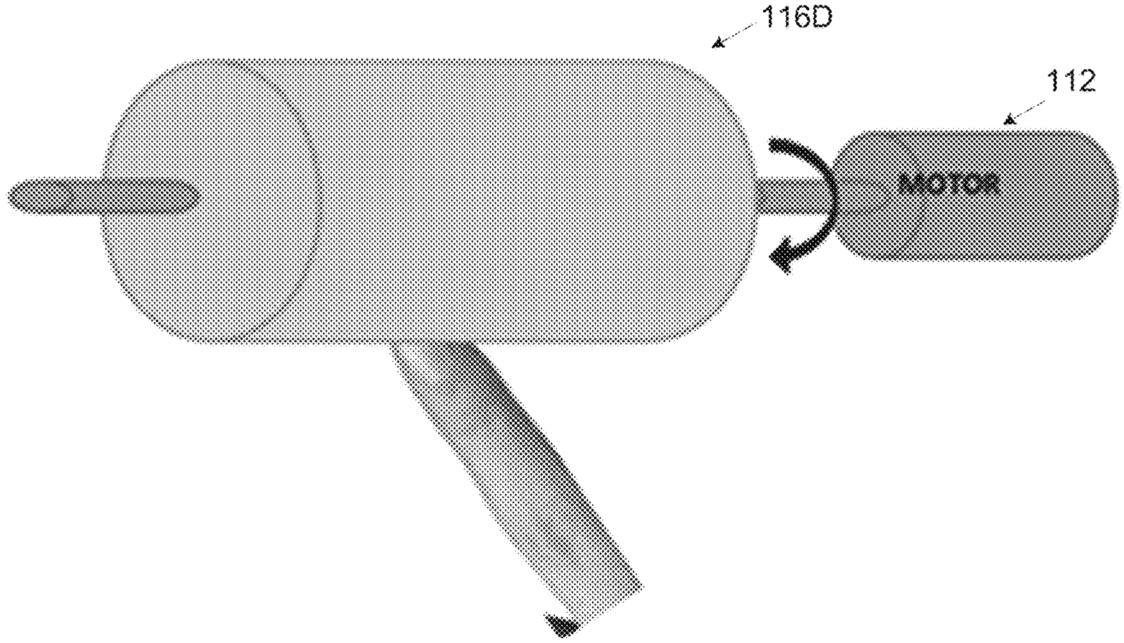
Figure 16:
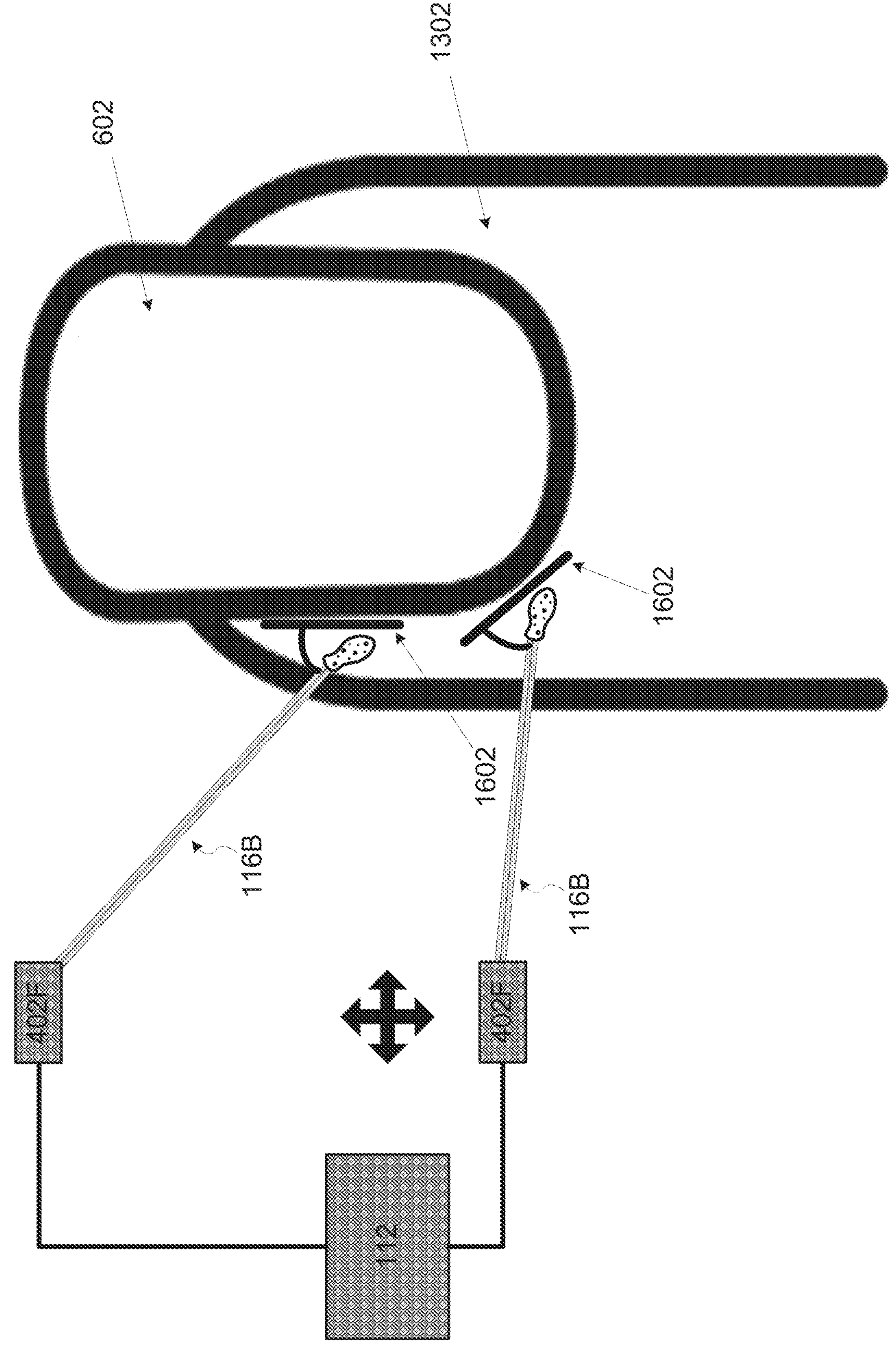
Figure 17:
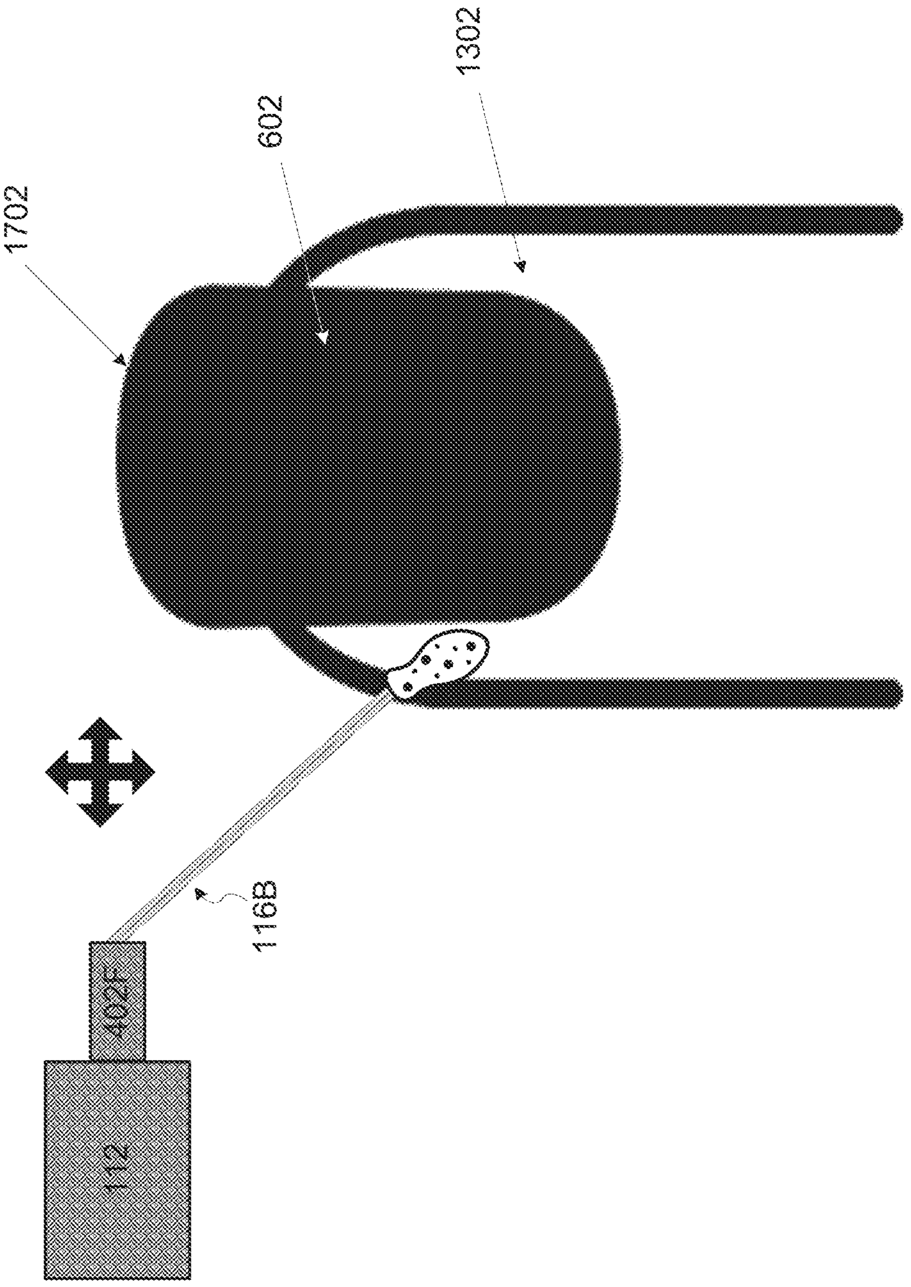
Figure 18A:
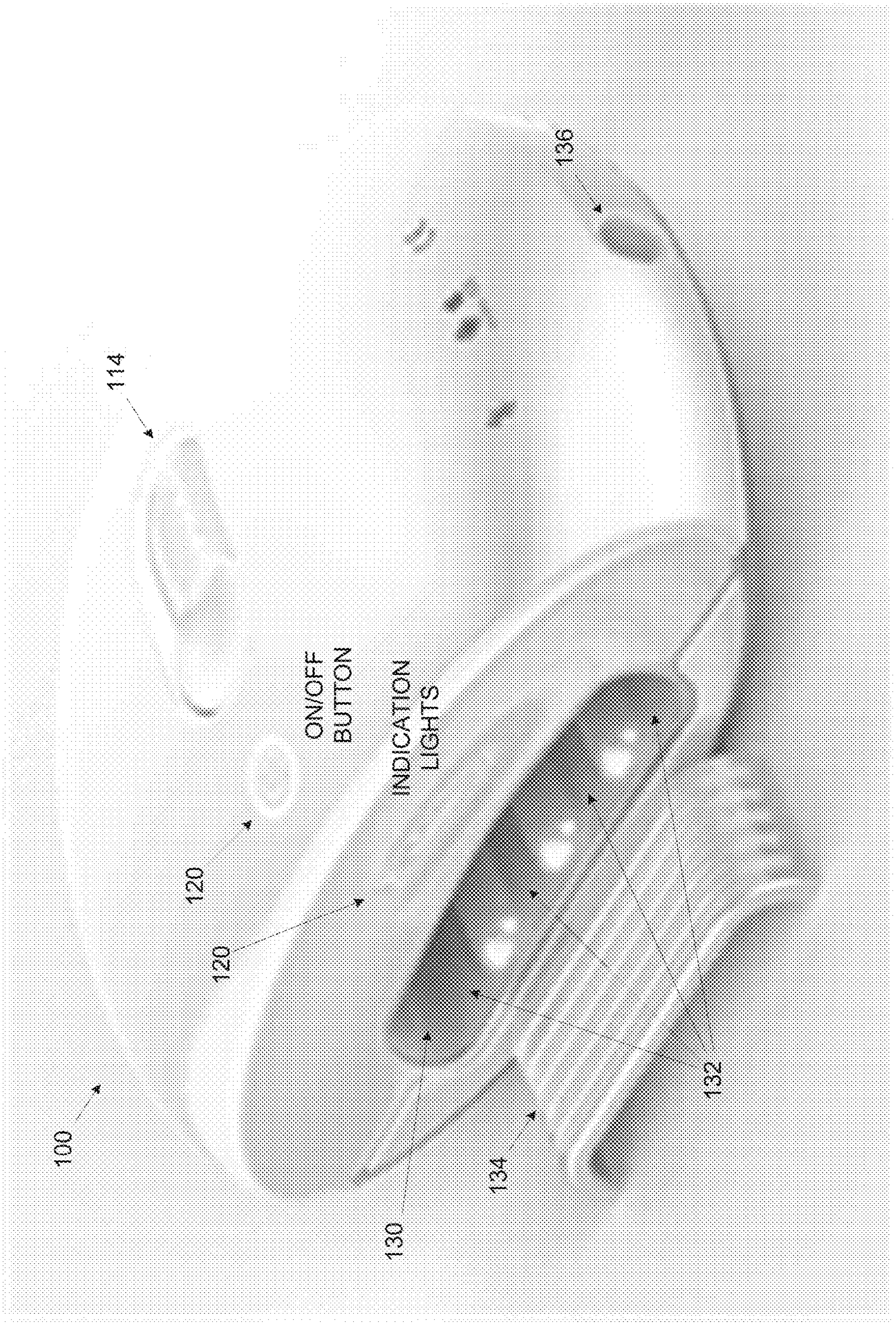
Figure 18B:
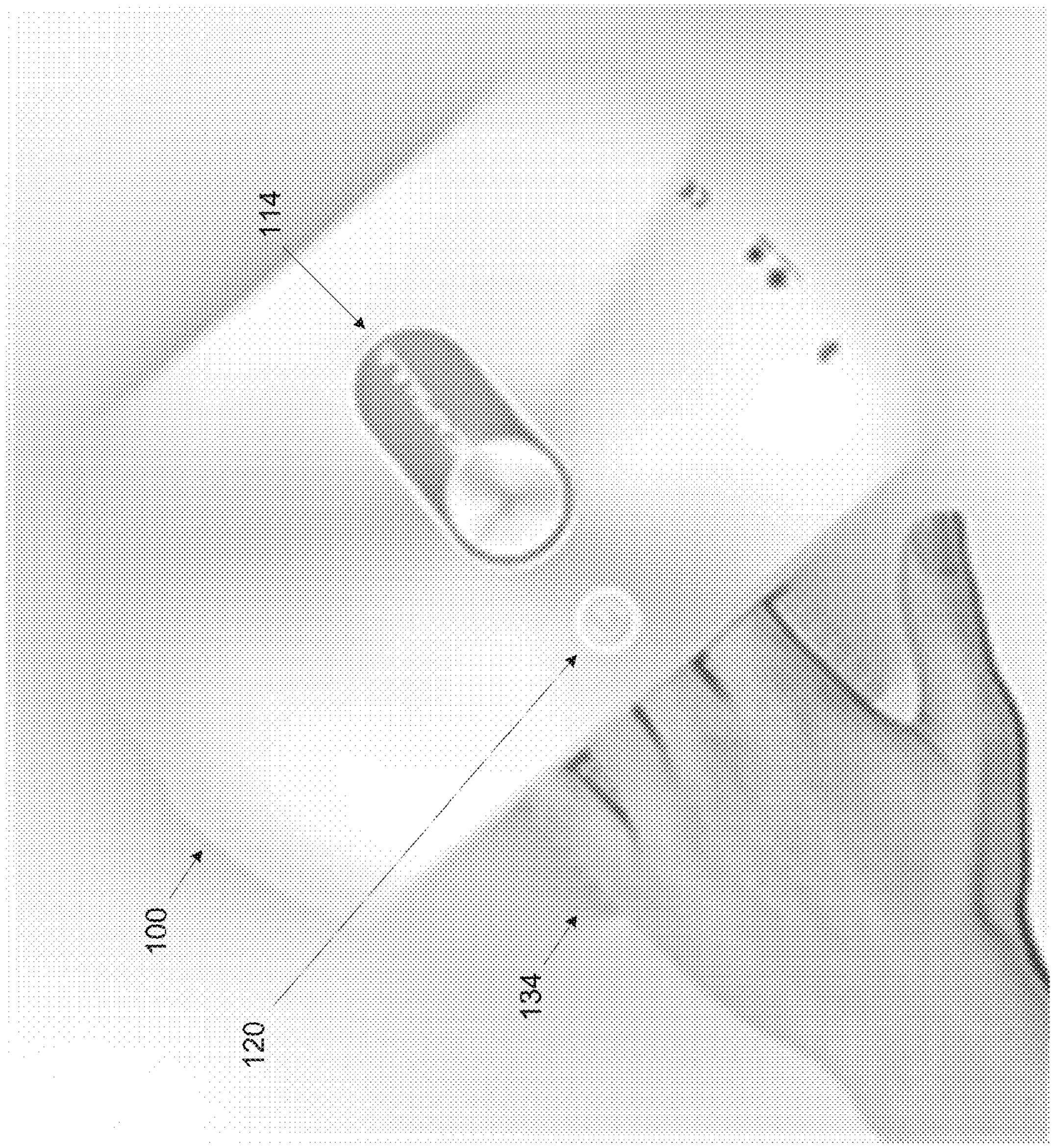
Figure 19:
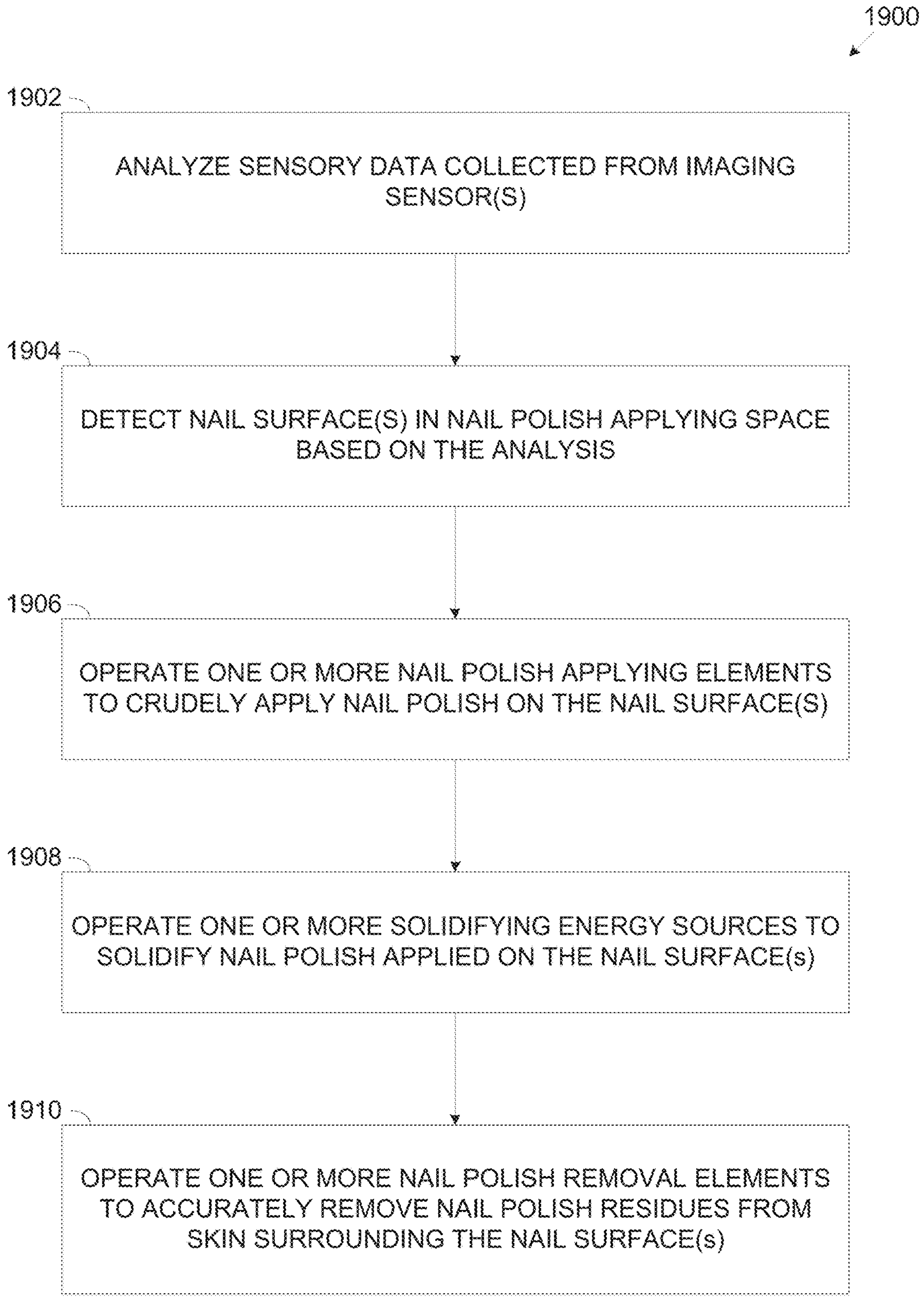
Figure 20:
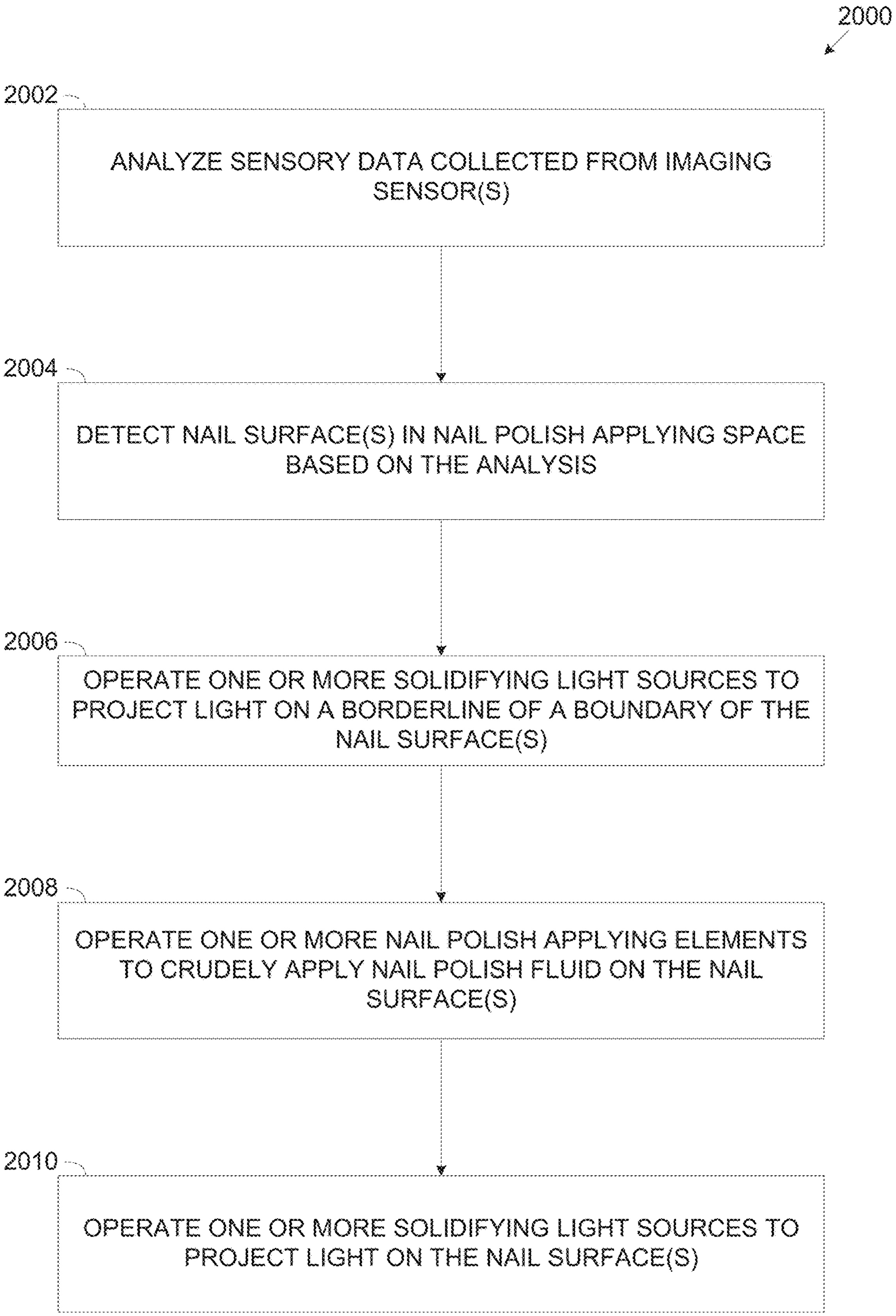

FIG. 10A, FIG. 10B and FIG. 10C are schematic illustrations of an exemplary light masking screen constructed of a plurality of tiles each configurable to be opaque or at least partially transparent for transferring an adjustable pattern of light projected by a solidifying light source deployed in a nail polish applying and solidifying apparatus, according to some embodiments of the present invention;

FIG. 11A and FIG. 11B are schematic illustrations of an exemplary nail surface applied with light projected by a solidifying light source deployed in a nail polish applying and solidifying apparatus on a borderline of a boundary of the nail surface while nail polish is applied on the nail surface, according to some embodiments of the present invention;

FIG. 12A and FIG. 12B are schematic illustrations of an exemplary air blower deployed in a nail polish applying and solidifying apparatus, according to some embodiments of the present invention;

FIG. 13A and FIG. 13B are schematic illustrations of an exemplary mechanical nail polish removal element of a nail polish applying and solidifying apparatus, according to some embodiments of the present invention;

FIG. 14A and FIG. 14B are schematic illustrations of an exemplary nail polish removal element of a nail polish applying and solidifying apparatus utilizing removal substance to remove nail polish, according to some embodiments of the present invention;

FIG. 15A and FIG. 15B are schematic illustrations of exemplary nail polish removal elements of a nail polish applying and solidifying apparatus, according to some embodiments of the present invention;

FIG. 16 is a schematic illustration of an exemplary nail polish removal element of a nail polish applying and solidifying apparatus comprising a wall segment to protect nail surface during removal of nail polish residues, according to some embodiments of the present invention;

FIG. 17 is a schematic illustration of an exemplary protective screen of a nail polish applying and solidifying apparatus such as the nail polish applying and solidifying apparatus 100 comprising a shielding element configured to protect nail(s) applied with nail polish during nail polish residues removal, according to some embodiments of the present invention;

FIG. 18A and FIG. 18B are perspective side and top views of exemplary embodiments of a nail polish applying and solidifying apparatus, according to some embodiments of the present invention; and FIG. 19 is a flow chart of an exemplary process of automatically applying nail polish to nail surface(s) and solidifying the nail polish using solidifying light source(s), according to some embodiments of the present invention; and FIG. 20 is a flow chart of an exemplary process of automatically applying nail polish to nail surface(s) while projecting solidifying light to a borderline of a boundary of the nail surface(s), according to some embodiments of the present invention.

DETAILED DESCRIPTION OF EMBODIMENTS OF THE INVENTION

The present invention, in some embodiments thereof, relates to a nail polish applying and solidification apparatus and, more particularly, but not exclusively, to a nail polish applying and solidification apparatus configured for crude nail polish application on nail(s), solidification of nail polish applied on the nail(s) and accurate removal of nail polish residues from skin surrounding the nail(s).

According to some embodiments of the present invention there are provided apparatuses, systems and methods for automatically applying and solidifying nail polish, for example, polish fluid, a base coating fluid, a top coating fluid, a gel polish, a drying material, a polish removal fluid, a nail art polish fluid, a medical nail treatment fluid and/or the like on nail surfaces of fingers of a user.

In particular, the nail polish applying and solidifying apparatus is configured and adapted to crudely apply nail polish in one or more forms, for example, solid, powder, liquid, gel and/or the like on nail surface(s) identified in a treatment space of the nail polish applying and solidifying apparatus such that the nail polish is not applied accurately on the nail surface(s) but rather applied in a manner that may cause the nail polish to disperse over the nail surface(s) and potentially spread over skin areas of the finger(s) surrounding the nail surface(s).

The nail polish applying and solidifying apparatus is further configured to solidify the nail polish crudely applied on the nail surfaces. Optionally, the nail polish applying and solidifying apparatus is configured to accurately solidify only nail polish applied on the nail surface(s) while avoiding solidifying the nail polish applied on the skin surrounding the nail surface(s).

However, while the nail polish application and potentially the solidification may be done crudely, the nail polish applying and solidifying apparatus is further configured to accurately and effectively remove nail polish residues which may have spread over the surrounding skin which may be unsolidified in case the accurate solidification is applied or at least partially solidified otherwise.

In particular, accurate solidification may be applied for nail fluid materials which may be difficult to remove when solidified, for example, polish gel and/or the like while accurate solidification may not be required when other nail polish materials are applied which are easier to remove even when solidified, for example, polish fluid, base coating fluid, top coating fluid and/or the like.

The nail polish applying and solidifying apparatus applying the accurate nail polish removal may therefore easily remove the nail polish residues (solidified or not) without removing and/or damaging the nail polish applied on the nail surface(s) itself thus ensuring that the nail polish solidified on the nail surface(s) remains intact.

The nail polish applying and solidifying apparatus comprises a control unit for operating one or more nail polish applying elements, one or more nail polish solidifying energy sources and one or more nail polish removal elements to crudely apply the nail polish on the nail surface(s), solidify the nail polish applied on the nail surface(s) and accurately remove the nail polish residues applied on the skin surrounding the nail surface(s) without damaging the nail polish applied on the nail surface(s).

The control unit may collect sensory data from one or more imaging sensors, for example, a visual imaging sensor (e.g. camera, video camera, depth camera, laser etc.), a Radio Frequency imaging sensor, a thermal imaging sensor and/or the like deployed, positioned and/or located to depict the treatment space. The control unit may analyze the collected sensory data, for example, image(s), depth maps, heat maps and/or the like to identify the nail surface(s) of one or more of fingers and/or toes of the user located in the treatment space, optionally in one or more dedicated finger sockets.

The control unit may operate, based on the analysis of the sensory data, one or more actuators used to maneuver one or more of the nail polish applying elements through the treatment space to crudely apply nail polish on the identified nail surface(s).

After applying the nail polish to the nail surface(s), the control unit may operate, again based on the analysis of the sensory data, one or more of the solidifying energy sources configured to solidify (cure, dry) the nail polish applied on the nail surface(s). Optionally, possibly depending on the applied nail polish material, the control unit may operate one or more of the solidifying energy sources to accurately solidify only nail polish applied on the nail surface(s) within a boundary of the nail surface(s).

The control unit may then operate, once again based on the analysis of the sensory data, one or more actuators used to maneuver one or more of the nail polish removal elements optionally in the treatment space to accurately remove the nail polish residues applied on the skin surrounding the nail surface(s) without damaging the nail polish applied on the nail surface(s) within the boundary(s).

According to some embodiments of the present invention, the solidifying energy sources may include one or more solidifying light sources configured to emit solidifying light to solidify the nail polish applied on the nail surface(s). Optionally, specifically in order to enable accurate solidification, the solidifying light source(s) may be configured and/or operated to emit the solidifying light only within the boundary identified for the nail surface(s) thus solidifying only nail polish applied within the boundary(s). Moreover, in some embodiments of the present invention, specifically in case accurate solidification is applied, the solidifying light source(s) may be operated in conjunction with one or more light masking screens configured to limit the light emitted from the solidifying light source(s) to certain areas, specifically within the boundary identified for the nail surface(s).

According to some embodiments of the present invention, the solidifying energy sources may include one or more air blowers which may blow air to solidify the nail polish applied on the nail surface(s). The air blower(s) may be connected to a compressor such via an air tube conveying compressed air from the compressor to the air blower(s). Optionally, one or more of the air blowers may be configured and/or operated to blow heated air to expedite the solidifying of the nail polish on the nail surface(s). Optionally, specifically in order to enable accurate solidification, the air blower(s) may be shaped, configured and/or adapted to blow air over a substantially small and limited size segment of the treated surface area, i.e., within the boundary identified for the nail surface(s).

According to some embodiments of the present invention, the solidifying energy sources may include one or more thermally reactive substance applying elements configured to apply one or more thermally reactive substances which are configured and/or adapted to solidify the nail polish on reaction with the nail polish. Optionally, specifically in order to enable accurate solidification, the thermally reactive substance applying element(s) may be shaped, configured and/or operated to accurately apply the thermally reactive substance(s) only within the boundary of the nail surface(s). Optionally, the thermally reactive substance applying element(s) is operated in conjunction with one or more masking screens configured to shield the surrounding skin from application of the thermally reactive substance(s) thus limiting the solidification to within the boundary identified for the nail surface(s).

According to some embodiments of the present invention, the solidifying energy sources may include one or more second nail polish applying elements. The nail polish may be composed of two components where the first component is crudely applied by the nail polish applying element(s) and the second component is accurately applied by the second nail polish applying element(s). Mixture of the two components may solidify the nail polish to form a solid nail polish. Optionally, the same nail polish applying element(s) may be used to apply both the first component and the second component of the nail polish. Optionally, specifically in order to enable accurate solidification, the second nail polish applying element(s) may be shaped, configured and/or operated to accurately apply the second component only within the boundary of the nail surface(s). Optionally, the second nail polish applying element(s) is operated in conjunction with one or more masking screens configured to shield the surrounding skin from application of the second component of the nail polish thus limiting the solidification to within the boundary identified for the nail surface(s).

Optionally, the nail polish applying and solidifying apparatus may utilize one or more disposable dispensing and storage capsules containing nail polish and/or component(s) thereof intended for a single or a limited number of applications of the nail polish over one or more nail surfaces of a user. The disposable capsules may be constructed as two-part capsules having a container (body portion) containing the nail polish and a detachable nail polish applying element that may be detached from the capsule for applying the nail polish on the nail surface(s). However, the disposable capsules may include integrated capsules having a body portion containing the nail polish and an integrated nail polish applying element such as the nail polish applying element 106 integrated with the body portion.

While the thermally reactive substance(s) may be stored in one or more reservoirs and/or containers of the nail polish applying and solidifying apparatus, one or more of the thermally reactive substance(s) may be also provided through one or more of the disposable capsules.

Optionally, the nail polish removal element(s) may be operated to remove nail polish residues and/or other materials present on the nail surface(s) in order to clean the nail surface(s) prior to applying the new nail polish. While the nail polish removal element(s) may typically be operated in the treatment space, optionally the nail polish application apparatus further includes a nail polish removal space in in which the nail polish removal element(s) may be operated to remove the nail polish residues from one or more of the nail surfaces.

Optionally, the nail polish application apparatus includes one or more user interface elements, for example, an indication light, a display, a control switch and/or the like for interacting with the user, for example, presenting status to the user and/or receiving instructions and/or settings from the user.

Optionally, the nail polish application apparatus includes a network interface supporting one or more communication protocols to communicate with one or more remote devices, for example, a mobile device of the user, a remote server and/or a cloud service.

The automated nail polish applying and solidifying apparatus may present significant benefits compared to existing devices, systems and/or methods for nail polish application and solidification.

First, as opposed to traditional manual nail polish application which may be the most common method, the nail polish applying and solidifying apparatus facilitates an automated nail polish application and solidification process. While the manual nail polish application may be very time consuming and may require skills, expertise and/or experience, the automated nail polish application and solidification may allow any user having no relevant skills, knowledge, expertise and/or experience to easily apply the nail polish. Moreover, the automated nail polish application and solidification process may significantly shorten the time of the application and solidification process and may even allow the user to engage in other activities while applying and solidifying the nail polish to his finger and/or toe nail surfaces.

Moreover, some of the existing devices and systems may apply automated nail polish application in which the nail polish is accurately applied on the nail surface(s). However, accurately applying the nail polish only to the nail surfaces while preventing the skin areas surrounding the nail surfaces from being soiled with nail polish may prove to be very difficult and practically impossible since the nail polish applying elements may need to be very accurately controlled and maneuvered.

The nail polish applying and solidifying apparatus on the other hand employs different strategies in which the nail polish may be crudely applied thus eliminating the need for accurate nail polish applying elements and/or mechanisms. In particular, the nail polish and solidifying apparatus applies these strategies to easily remove the nail polish residues applied and soiling the surrounding skin due to the crude nail polish application.

A first strategy may be applied primarily to the nail polish materials which do not adhere and/or insignificantly adhere to the skin even after solidified, for example, the polish fluid, the base coating fluid, the top coating fluid and/or the like and thus may be easily removed even in their solid state. In such cases, the nail polish and solidifying apparatus may employ inaccurate simple and typically low cost solidifying energy sources configured to solidify the nail polish crudely applied on the nail surface(s). The inaccurate solidification however may lead to solidification of the nail polish residues applied on the surrounding skin. The nail polish applying and solidifying apparatus may therefore apply nail polish removal element(s) applied configured and operated to effectively and accurately remove the easily removable (even in the solidified state) nail polish residues from the surrounding skin without affecting the nail polish solidified on the nail surface as it is in the solid state.

A second strategy may be applied to the nail polish materials which may not be easily removed from the skin after solidified, for example, the gel polish and/or the like. In such cases, the nail polish and solidifying apparatus may apply the accurate solidifying energy source(s) configured and operated to accurately solidify only the nail polish applied within the boundary of the nail surface while avoiding solidifying the nail polish which was accidently spread on the surrounding skin. As such, the nail polish is solidified only on the nail surface(s) themselves, i.e. within the boundary of the nail surface(s) while the nail polish residues applied on the surrounding skin are not solidified. The nail polish and solidifying apparatus may then operate the nail polish removal element(s) to effectively and accurately remove the unsolidified and hence easily removable nail polish residues from the surrounding skin without affecting the nail polish solidified on the nail surface as it is in the solid state. As such, the nail polish residues removal process from the surrounding skin is made very simple, requiring simple nail polish removal elements as opposed to the existing systems where the removal process of the nail polish residues needs to be extremely precise to avoid removing (even partially) the nail polish applied on the nail surface(s) and damaging the painting of the nail surface(s). It should be noted that this approach (strategy) may be also applied to one or more of the polish materials which do not adhere to the skin in order to prevent their solidification on the surrounding skin thus further simplifying their removal from the skin.

Furthermore, solidifying the nail polish after applied on the nail surface may significantly reduce the drying/solidifying period of the nail polish which may be significantly long.

Utilizing the storage and dispensing capsules for the nail polish and/or for one or more of the other materials used to solidify the nail polish may present another major advantage as it provides a convenient user friendly solution. The user may be relieved of the need to handle the nail polish, the brush and/or the like as may be needed by the existing devices. In addition, by isolating the nail polish from the nail polish applying and solidifying apparatus, maintenance of the nail polish applying and solidifying apparatus may be significantly reduced.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Several embodiments of an apparatus used for nail polish application are described hereinafter. However, the presented embodiments should not be construed as limiting. A person skilled in the art may implement, construct, arrange and/or produce the nail polish application apparatus and/or parts thereof through multiple other implementations, structures, shapes, production methods and the like which employ the same concepts described throughout the present invention. Moreover, while one or more of the apparatus's features may be described hereinafter for one or more of the embodiments, one or more of the features may be applicable for other embodiments as well even when not explicitly stated.

Moreover, the nail polish application apparatus may utilize one or more disposable capsules containing nail polish. While the capsule is out of scope of the present invention, some elements, features and/or mechanisms of the apparatus nail polish application may be adapted, configured and/or adjusted according to the structure, implementation and/or features of the capsule hosted by the nail polish application apparatus. The capsule(s) may therefore be described only to the extent required to describe, explain and present the nail polish application apparatus.

Figure 1:
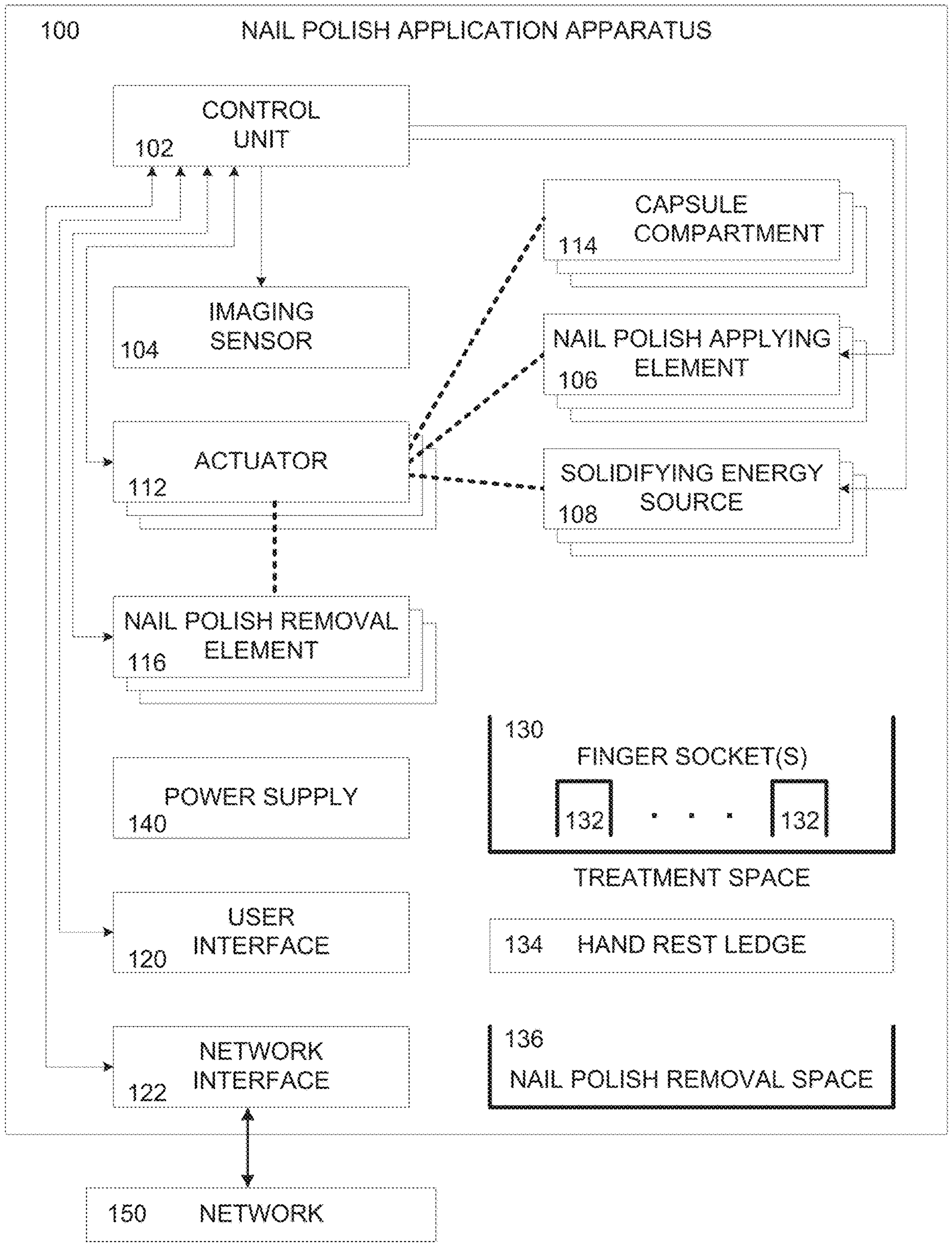
FIG. 1 is a schematic illustration of an exemplary apparatus for applying and solidifying nail polish on nail surface(s) of a user, according to some embodiments of the present invention.

Referring now to the drawings, FIG. 1 is a schematic illustration of an exemplary apparatus for applying and solidifying nail polish on nail surface(s) of a user, according to some embodiments of the present invention. An exemplary nail polish applying and solidifying apparatus 100 is designed, configured and adapted for applying nail polish on nail surfaces of one or more fingers and/or toes (collectively designated fingers herein after) of a user, solidifying the nail polish applied on the nail surface(s) and cleaning (removing) nail polish residues from skin surrounding the nail surface(s).

The nail polish which may be available in one or more forms, for example, solid, powder, liquid, gel and/or the like may include, for example, polish fluid, a base coating fluid, a top coating fluid, a gel polish, a drying material, a polish removal fluid, a nail art polish fluid, a medical nail treatment fluid and/or the like.

In particular, the nail polish applying and solidifying apparatus 100 is configured to crudely apply the nail polish on the nail surface(s) such that the nail polish is not accurately applied on the nail surface(s) but rather applied in a manner that may cause the nail polish to disperse over the nail surface(s) and potentially spread over skin areas of the finger(s) surrounding the nail surface(s). The nail polish applying and solidifying apparatus 100 is further configured to solidify the nail polish applied on the nail surface(s) which may solidify nail polish residues applied on skin surrounding the nail surface(s). Optionally, the nail polish applying and solidifying apparatus 100 is configured to accurately solidify only nail polish applied within a boundary of each of the nail surface(s) while avoiding solidification of the nail polish applied on the surrounding skin. However, the nail polish applying and solidifying apparatus 100 is configured to accurately remove the nail polish applied on the surrounding skin which may be at least partially solidified or not solidified at all while not damaging the nail polish applied and solidified on the nail surface(s) itself thus ensuring that the nail polish solidified on the nail surface(s) remains intact.

The nail polish applying and solidifying apparatus 100 may include a control unit 102, one or more imaging sensors 104 deployed to depict a treatment area 130 in which a user may place one or more fingers and a nail polish applying element 106 which may be operated to crudely apply the nail polish on the nail surface of one or more of the fingers. The nail polish applying and solidifying apparatus 100 may further include one or more solidifying energy sources 108 and one or more nail polish removal elements 116.

The treatment space 130 constructed in the nail polish applying and solidifying apparatus 100 is configured to receive and accommodate the fingers of the user for nail polish application and solidifying on the nail surface(s).

The control unit 102 may include one or more processing devices, for example, a processor (homogenous or heterogeneous), a controller and/or the like. The control unit 102 may further include storage for storing code, data and/or the like. The storage may include one or more persistent and/or volatile devices, for example, a Read Only Memory (ROM) device, a Flash device, a hard drive, an attachable storage media, a random access memory (RAM) and/or the like. The processing device(s) may execute one or more software modules, for example, a process, an application, an agent, a utility, a service and/or the like wherein a software module refers to a plurality of program instructions executed by such as the processing device(s) of the control unit 102 from a program store such as the storage of the control unit 102. Executing one or more of such software modules, the control unit 102 may calculate instructions to control operation of the other elements of the nail polish applying and solidifying apparatus 100.

The treatment space 130 may be constructed to include one or more finger sockets 132 each adapted to receive and accommodate a finger (and/or a toe) of the user in order to reduce potential movement of the finger(s) and hence movement of the nail surface(s) during the nail polish application and solidification process. The finger sockets 132 may be constructed and shaped to receive and accommodate the finger(s) in one or more of a plurality of utilizations, for example, one or more fingers of a single hand, fingers of two hands, five fingers of a first hand and a thumb of a second hand, one or more toes of a single foot, toes of two feet and/or the like.

The finger socket(s) 132 may be static and structured in one or more of a plurality of structures and/or materials shaped to receive and accommodate the finger(s). For example, the finger socket(s) 132 may be structured as a flat plate having thin slots 132A which may mark the positioning of the fingers to allow for easy and accurate nail polish application and solidification. In another example, the finger socket(s) 132 may be structured as finger grooves shaped to accommodate the finger(s) and reduce movement of the fingers to improve the nail polish application. In another example, the finger socket(s) 132 may be structured as barriers shaped to isolate each of the finger(s) and restrict the movement of the finger(s) to improve the nail polish application. In another example, the finger socket(s) 132 may be structured of soft material such as a "memory foam" finger socket which may dynamically adapt to the shape of the finger(s) and hence further reduce movement of the finger during the nail polish application and solidification to improve the nail polish application results.

Optionally, the nail polish applying and solidifying apparatus 100 includes one or more hand and/or finger restriction elements which may be placed, manually and/or automatically, over one or more of the finger(s) and/or hand(s) of the user once the finger(s) are placed in the finger socket(s) 132. The hand and/or finger(s) restriction elements may restrict the hand and/or finger(s) to significantly limit, reduce and/or prevent movements of the hand and/or the fingers in order to improve accuracy of the nail polish application and solidification and moreover to accurately remove the nail polish applied on the skin surrounding the nail surface(s).

Optionally, the nail polish applying and solidifying apparatus 100 includes a hand rest ledge 134 which may be constructed to provide ergonomic support for the user's hand and/or foot during the nail polish application and solidification process. The hand rest ledge 134 may be fixed in the nail polish applying and solidifying apparatus 100 and/or it may attachable/detachable to/from the nail polish applying and solidifying apparatus 100. For example, the hand rest ledge 134 may be utilized by an at least partially elastic cushion which the user may place under his wrist and/or along his arm while his finger(s) are placed in the finger socket(s) 132. The at least partially elastic cushion may adjust to the shape of the user's wrist and/or arm in order to comfortably support his hand during the nail polish application and solidification process.

Moreover, the hand rest ledge 134 may be stored in a storage space optionally constructed in the nail polish applying and solidifying apparatus 100. The hand rest ledge 134 may be further equipped with one or more attachment means, for example, Velcro stripes, magnetic elements, snap fasteners and/or the like for safely stashing the hand rest ledge 134 in the nail polish applying and solidifying apparatus 100 equipped with corresponding attachment means. Prior to initiating the nail polish application and solidification process, the user may detach the hand rest ledge 134 to remove it from the storage space and may place and position the hand rest ledge 134 to comfortably support his hand. After the nail polish application and solidification process is complete, the user may store the hand rest ledge 134 back in the storage space and attach securely.

Figure 3A:
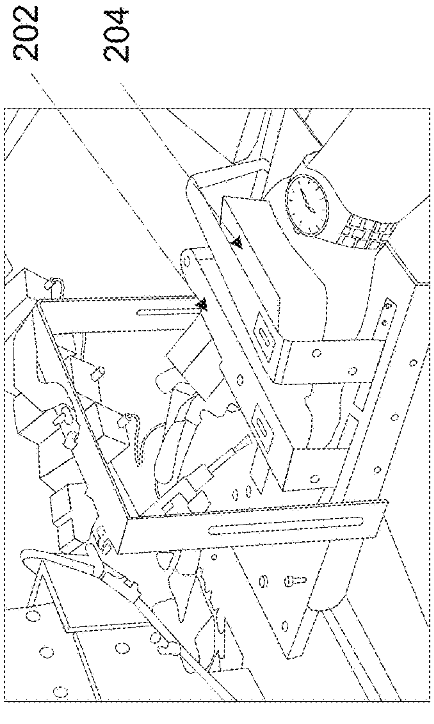
FIG. 3A is a schematic illustration of an exemplary hand restriction element of a nail polish application and solidifying apparatus, according to some embodiments of the present invention.

Reference is now made to FIG. 3A, which is a schematic illustration of an exemplary hand restriction element of a nail polish applying and solidifying apparatus such as the nail polish applying and solidifying apparatus 100, according to some embodiments of the present invention. The nail polish applying and solidifying apparatus 100 may include one or more finger restriction elements 202 which may be placed, manually and/or automatically, over the fingers of the user once the fingers are placed in one or more finger socket(s) such as the finger socket(s) 132. The finger restriction element 202 may restrict the fingers to significantly reduce movement of the fingers in order to improve the nail polish application results. Additionally and/or alternatively, the nail polish applying and solidifying apparatus 100 includes one or more hand restriction elements 204 which may be placed over one or more of the user hands once the finger(s) are placed in the finger socket(s) 132. Optionally, the finger(s) restriction element(s) 202 and/or the hand restriction element(s) 204 are static while the finger socket (s) 132 are moveable to force the finger(s) against the finger restriction element(s) 202 and/or the hand restriction 204 to restrict the movement of the finger(s) and/or the hand(s) respectively. The positioning (location) of the fingers restriction element 202 may be dynamically adjustable to press down on the fingers at a location which is significantly close to the nail surface thus improving the limitation, reduction and/or prevention of the finger(s) movements.

The hand restriction element(s) 204 and/or the fingers restriction element(s) 202 may employ one or more mechanical designs and/or concepts. For example, the hand restriction element(s) 204 and/or the fingers restriction element(s) 202 may utilize a moveable (e.g. up/down) mechanical bar which may be pressed against the hand and/or the fingers respectively to press down the hand and/or the fingers towards the finger socket(s) 132 thus reducing movement of the hand(s) and/or the finger(s). In another example, the hand restriction element(s) 204 and/or the fingers restriction element(s) 202 may utilize an inflatable cushion type element that when inflated may press down the hand and/or the fingers towards the finger socket(s) 132 thus reducing movement of the hand(s) and/or the finger(s).

Reference is now made to FIG. 3B, FIG. 3C, FIG. 3D and FIG. 3E, which are schematic illustrations of exemplary finger sockets such as the finger sockets 132 and finger restriction elements of a nail polish applying and solidifying apparatus such as the nail polish applying and solidifying apparatus 100, according to some embodiments of the present invention.

Figure 3B:
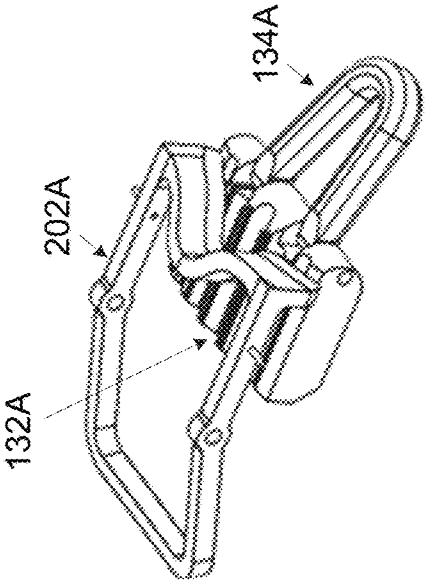
FIG. 3B, FIG. 3C, FIG. 3D and FIG. 3E are schematic illustrations of exemplary finger sockets and finger restriction elements of a nail polish applying and solidifying apparatus, according to some embodiments of the present invention.

FIG. 3B presents a fingers restriction element 202A which is another exemplary embodiment of the fingers restriction element 202 that may be used in the nail polish applying and solidifying apparatus 100. The fingers restriction element 202A may be shaped, for example, in at least partially curved shape and/or the like to make contact with each of the fingers of the user placed in one or more finger sockets 132A such as the finger sockets 132. Optionally, a hand rest ledge 134A such as the hand rest ledge 134 may be constructed to provide ergonomic support for the user's hand during the nail polish application and solidification session. In its open state, the fingers restriction element 202A is lifted to allow the user to place his fingers in the finger sockets 132A. After the fingers are placed in their designated finger sockets 132A, the fingers restriction element 202A may be lowered, either manually by the user and/or automatically under control of the control unit 102, to a closed state in which the fingers restriction element 202A may press down on the fingers of the user against the finger sockets 132A.

The fingers restriction element 202A may be designed and constructed to have a partially curved shape such that in the closed state the fingers restriction element 202A may come in contact with all fingers placed in the finger sockets 132A in order to press them downwards. The positioning (location) of the fingers restriction element 202A may be dynamically adjustable to press down on the fingers at a location which is significantly close to the nail surface thus improving the limitation, reduction and/or prevention of the finger(s) movements regardless of the size of the finger(s), the shape of the hand or the proportion of the finger(s) in a given hand.

Figure 3C:
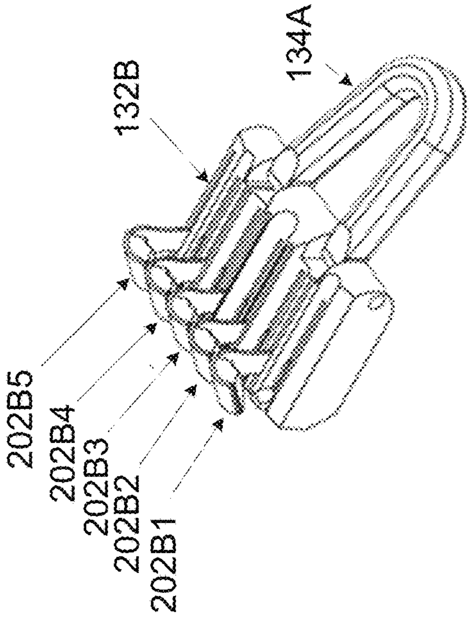

FIG. 3C presents an exemplary fingers restriction element 202B comprising one or more individual restriction elements, for example, individual restriction elements 202B1, 202B2, 202B3, 202B4 and/or 202B5 each adapted to restrict a respective finger by applying pressure to the respective finger against a plurality of finger sockets 132B such as the finger sockets 132. In its open state, each of the individual restriction elements 202B1, 202B2, 202B3, 202B4 and/or 202B5 is lifted to allow the user to place his fingers in the finger sockets 132B. Once the user places his finger(s) in their designated finger sockets 132B, the individual restriction elements 202B1, 202B2, 202B3, 202B4 and/or 202B5 may be lowered, either manually by the user and/or automatically under control of the control unit 102, to a closed state. In the closed state, each of the individual restriction elements under control of the control unit 102 may press down the respective finger against the finger sockets 132B.

One or more of the individual restriction elements 202B1, 202B2, 202B3, 202B4 and/or 202B5 may move along its respective finger socket 132B. Positioning of each of the individual restriction elements 202B1, 202B2, 202B3, 202B4 and/or 202B5 with respect to the respective finger may therefore be adjusted according to a length of the respective finger. As such, the positioning (location) of each of the individual restriction elements 202B1, 202B2, 202B3, 202B4 and/or 202B5 may be dynamically adjustable to press down on the respective finger at a location which is significantly close to the nail surface thus improving the limitation, reduction and/or prevention of the finger(s) movements regardless of the size of the finger(s), the shape of the hand or the proportion of the finger(s) in a given hand.

Figure 3D:
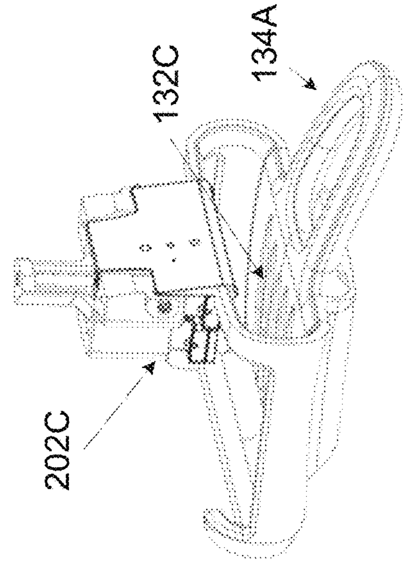
Figure 3E:
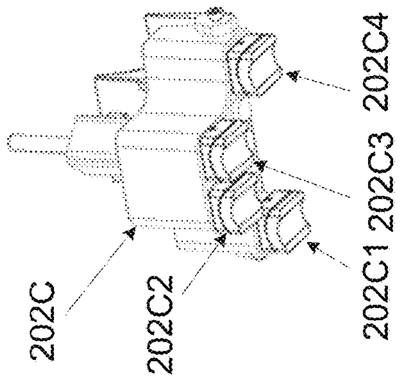

FIG. 3D and FIG. 3E present another exemplary fingers restriction element 202C comprising one or more individual restriction elements, for example, individual restriction elements 202C1, 202C2, 202C3 and/or 202C4 each adapted to restrict a respective finger by applying pressure to the respective finger against a respective one of a plurality of finger sockets 132C. In its open state, each of the individual restriction elements 202C1, 202C2, 202C3 and/or 202C4 is lifted to allow the user to place his fingers in the finger sockets 132C. The fingers restriction element 202C may be constructed to adapt to the anatomy of the human hand and fingers such that positioning of each of the individual restriction elements 202C1, 202C2, 202C3 and/or 202C4 with respect to the respective finger may be adjusted according to a length of the respective finger. As such, the positioning (location) of each of the individual restriction elements 202C1, 202C2, 202C3 and/or 202C4 may be dynamically adjustable to press down on the respective finger at a location which is significantly close to the nail surface thus improving the limitation, reduction and/or prevention of the finger(s) movements. After the user places his finger(s) in their designated finger sockets 132C, one or more of the individual restriction elements 202C1, 202C2, 202C3 and/or 202C4 may be lowered down to the closed state to press down on the respective fingers against the finger sockets 132C.

One or more of the individual restriction elements 202C1, 202C2, 202C3 and/or 202C4 may include a tension element, for example, a spring, a coil, an elastic band and/or the like for applying pressure to press down the respective finger against the finger socket 132A. Applying pressure to the tension element may be done manually by the user or automatically by the apparatus 100 under control of the control unit 102. For example, the control unit 102 may operate one or more actuators to apply/release pressure to the tension element and move down/up one or more of the individual restriction elements 202C1, 202C2, 202C3 and/or 202C4.

Optionally, the fingers restriction element 202, for example, the fingers restriction elements 202A, 202B and/or 202C may include an at least partially elastic material at their bottom face which is in contact with the fingers thus adjusting to the shape of each finger without inflicting pain and/or discomfort to the user. The finger socket(s) 132, for example, the finger socket(s) 132A, 132B and/or 132C may also be covered with the at least partially elastic material at their top face to prevent discomfort to the user while pressure is applied on the finger(s) by the fingers restriction element 202A, 202B and/or 202C respectively to press the finger(s) down.

The fingers restriction element 202, for example, the fingers restriction elements 202A, 202B and/or 202C may be lifted and/or lowered to a plurality of positions to fit the pressure on the fingers against the finger socket(s) 132A, 132B and/or 132C respectively. The upward/downward movement of the fingers restriction elements 202A, 202B and/or 202C may be continuous and/or comprise a plurality of adjustment points. The fingers restriction element 202A, 202B and/or 202C may further include a locking mechanism for locking the fingers restriction element 202A, 202B and/or 202C in the closed state. The apparatus 100 may further include an emergency mechanism that unlocks automatically the fingers restriction element 202A, 202B and/or 202C, for example, in an event of "power off" of the apparatus 100 while the fingers restriction element 202A, 202B or 202C is in the closed state.

The imaging sensor(s) 104 may be deployed in the nail polish applying and solidifying apparatus 100 to depict at least part of the treatment space 130, specifically the expected location of the nail surface(s) of the fingers placed in the treatment space 130, for example, in the finger sockets 132. One or more of the imaging sensor(s) 104 may be operated by the control unit 102 to capture sensory data depicting the treatment space 130 before, during and/or after a nail polish application and solidification session.

The imaging sensor(s) 104 may be based on one or more imaging technologies and/or types and may therefore generate various types of sensory data, for example, visual sensory data (e.g. images, video, 3-Demension (3D) images, etc.), depth sensory data (i.e., depth images, depth maps), thermal sensory data (i.e., thermal images, thermal maps), a laser line and/or a laser spot sensor and/or the like. For example, the imaging sensors 104 may include one or more visual imaging sensors, for example, a camera, a video camera, a depth camera and/or the like configured to capture visual sensory data in the form of one or more images, a sequence of images, a video clip and/or the like depicting at least part of the treatment space 130. In another example, the imaging sensors 104 may include one or more Radio Frequency (RF) sensors configured to transmit radio waves and intercept reflected radio waves reflected from one or more objects located in the treatment space 130 to produce depth sensory data in the form of at least one depth image mapping at least part of the treatment space 130. In another example, the imaging sensors 104 may include one or more thermal imaging sensors configured to capture heat of objects located in the treatment space 130 and produce thermal sensory data in the form of at least one thermal image mapping at least part of the treatment space 130.

The control unit 102 may receive the sensory data from one or more of the imaging sensor(s) 104 and analyze the sensory data to identify the finger(s) placed in the treatment area 130, specifically to identify the nail surface(s) which are the target for the nail polish application. Based on the analysis of the sensory data, the control unit 102 may therefore identify a location in space of each of the finger(s) placed in the finger socket(s) 132 and a boundary of each of the nail surface(s) of the identified finger(s). The control unit 102 may further construct a 3D surface of the nail surface(s) based on the sensory data received from the imaging sensor(s).

Optionally, the control unit 102 analyzes the sensory data to identify one or more attributes, characteristics and/or parameters of the nail surface(s) as described herein after. Optionally, the control unit 102 analyzes the sensory data to identify one or more attributes, characteristics and/or parameters of one or more of the elements operated by the control unit 102 during the nail polish application and solidification session as described herein after.

Optionally, the nail polish applying and solidifying apparatus 100 includes one or more lighting sources operated by the control unit 102 to illuminate at least part of the treatment space 130, specifically the nail surface(s). Illuminating the nail surface(s) may significantly improve the quality of the sensory data captured by the imaging sensor(s) 104, in particular image(s) captured by the visual imaging sensor(s). The lighting source(s) may be selected, configured and/or operated according to one or more operational parameters of the visual imaging sensor(s) and/or the lighting source(s), for example, a field of view (FOV), a distance from the nail surface(s), a spectral range and/or the like. The lighting source(s) may include, for example, a Light Emitting Diode (LED), a laser emitter device, an Infra-Red (IR) emitter and/or the like.

Moreover, one or more spaces of the nail polish applying and solidifying apparatus 100, for example, the treatment space 130 are mechanically constructed and/or adapted to limit and/or control the level of illumination (light) coming in from the (external) environment. This may be done by constructing the treatment space 130 to have enclosing walls and/or faces which may substantially block the external light coming in from outside the treatment space 130. Limiting and/or controlling the external illumination may allow adjusting the illumination in the treatment space 130 using the lighting source(s) to improve the lighting conditions in the treatment space 130 and hence improve the quality and/or usability of the image(s) captured by the visual imaging sensor(s). The control unit 102 may efficiently analyze the enhanced image(s) captured in the controlled lighting treatment space 130 thus requiring reduced computation resources, for example, computing power, memory resources, computing time and/or the like for the analysis.

The control unit 102 may operate one or more of the nail polish applying element 106 to crudely apply the nail polish on the nail surface(s). In particular, the control unit 102 may operate the nail polish applying element 106A to crudely apply the nail polish on the nail surface(s) such that the nail polish is not accurately applied on the nail surface(s) but rather applied in a manner that may cause the nail polish to disperse over the nail surface(s) and potentially spread over the skin areas of the finger(s) surrounding the nail surface(s).

The control unit 102 may operate the nail polish applying element(s) 106 based on the analysis of the sensory data captured by the imaging sensor(s) 104 during which the control unit 102 may identify the nail surface of one or more fingers detected in the treatment space, specifically in the finger socket(s) 132.

Typically, the nail polish applying element(s) 106 is moveable in the treatment space 130 such that the nail polish applying element 106 may be positioned with respect to the identified nail surface(s) to properly apply the nail polish on the nail surface(s). However, the nail polish applying element 106 may be fixed in the nail polish applying and solidifying apparatus 100, specifically in the treatment space 130.

The nail polish applying element 106 may be moved through the treatment space 130 by one or more of actuators 112 of the nail polish applying and solidifying apparatus 100 operated by the control unit 102. The nail polish applying element 106 may be mechanically attached and/or coupled to the actuator(s) 112 though one or more mounting elements serving as a fixture configured to mechanically couple the nail polish applying element 106 to the actuator(s) 112.

The actuator(s) 112 may be operated to move the nail polish applying element 106 in a longitudinal axis crossing the treatment space 130 and in a lateral axis perpendicular to the longitudinal axis. In addition, the actuator(s) 112 may be adapted to rotate the nail polish applying element 106 around the longitudinal axis. Optionally, the actuator(s) 112 are adapted to move the nail polish applying element 106 in an axis substantially perpendicular to the identified nail polish surface(s) in order to control the height of the nail polish applying element 106 above the nail surface(s). The actuator(s) 112 may be further adapted to adjust a pitch of the nail polish applying element 106 with respect to the identified nail surface(s) in order to adjust an attack angle of the nail polish applying element 106 with respect to the nail surface(s).

The mechanical structure of the actuator(s) 112 moving the nail polish applying element 106 may include one or more implementations, mechanisms and/or concepts to allow the actuator(s) 112 operated by the control unit 102 to efficiently move the nail polish applying element 106 through the treatment space 130. For example, the actuator(s) 112 may move a 3 and/or 4 axes moveable grid (serving as the mounting element) to which the nail polish applying element 106 is fixed. In another exemplary embodiment the actuator(s) 112 may move one or more rotating shafts and/or telescopic rotating shafts (serving as the mounting element) to which the nail polish applying element 106 is fixed.

The control unit 102 may operate the actuator(s) 112 to move the nail polish applying element 106 according to one or more coordinate systems, for example, Cartesian coordinates, cylindrical coordinates, spherical coordinates, Euler angles with respect to a fixed coordinate system and/or the like. Naturally, the mechanical element(s) operated by the actuator(s) 112 to move the nail polish applying element 106 may be adapted for movement along axes of the selected coordinate system(s). For example, the actuator(s) 112 may operate a 3-axes liner mechanism which may move the nail polish applying element 106A along X, Y and/or Z axes of the Cartesian coordinate system. The actuator(s) 112 may further operate the 3-axes liner mechanism to adjust the height and/or the pitch of the nail polish applying element 106 in the treatment space 130. In another example, the actuator(s) 112 may operate a moveable telescopic arm which may be moved along Theta and/or Phi axes of a spherical coordinate system. In another example, the actuator(s) 112 may operate a moveable telescopic arm which may be operated to tilt, pitch and/or roll with respect to the plane of the nail surface. The actuator(s) 112 may be also operated to move the telescopic arm in the longitudinal and/or lateral axis across the treatment space 130 to place the telescopic arm in a desired position and/or location in the treatment space 130.

Based on the analysis of the sensory data conducted to identify the nail surface(s), the control unit 102 may operate the actuator(s) 112 to maneuver the nail polish applying element 106 over the nail surface(s). The control unit 102 may continuously analyze the sensory data captured in real-time to identify the location and/or positioning of the nail polish applying element 106 with respect to the nail surface(s) and operate the actuator(s) 112 to adjust the location and/or the positioning accordingly in order for the nail polish applying element 106 to properly apply the nail polish on the nail surface(s). The control unit 102 may further estimate the height of the nail polish applying element 106 above the nail surface (gap) based on the analysis of the sensory data and may adjust the location and/or positioning of the nail polish applying element 106 with respect to the nail surface(s).

The control unit 102 may further detect movement of the finger(s) in the nail polish applying space 130 based on the analysis of the sensory data. The movement of the finger(s) may naturally lead to movement of the nail surface(s) on which the nail polish is applied. The control unit 102 may identify the new location and/or position of the nail surface(s) and may operate the actuator(s) 112 to correct, fix and/or adjust the location and/or the positioning of the nail polish applying element with respect to the nail surface(s) according to the detected new location and/or position of the nail surface(s).

Optionally, based on the analysis of the sensory data, the control unit 102 may identify one or more of the attributes, characteristics and/or parameters of the nail surface(s). In particular, the control unit 102 may analyze the sensory data to determine a result of the nail polish application process and identify one or more defects in the nail polish application on the nail surface(s). For example, the control unit 102 may estimate a quality of the nail polish application on the nail surface(s). In another example, the control unit 102 may detect one or more flaws and/or inconsistent in the nail polish applied on the nail surface(s). In another example, the control unit 102 may detect insufficient or excessive quantity of nail polish applied on the on the nail surface(s). The control unit 102 may operate the nail polish applying element 106 to correct, fix and/or re-do the nail polish application process to at least part of the nail surface(s) in which the defects are identified.

Optionally, the control unit 102 may use one or more of the lighting sources, specifically the laser emitter device(s) to calibrate the motion system, specifically the movement of the actuator(s) 112. The nail polish applying and solidifying apparatus 100 may further include one or more target indications, for example, a marking, a mechanical marking (e.g. a bulge, a depression, a carved pattern, etc.) and/or the like which may be used by the control unit 102 in conjunction with the laser emitting device(s) to calibrate one or more elements of the nail polish applying and solidifying apparatus 100. For example, one or more of the target indications may be placed on the nail polish applying element 106 and using the laser emitter device(s), the control unit 102 may identify the exact location of the target indications and calibrate the motion system of nail polish applying and solidifying apparatus 100 accordingly, in particular, the actuator(s) 112, the nail polish applying element(s) 106 and/or the imaging sensor(s) 104.

Figure 4A:
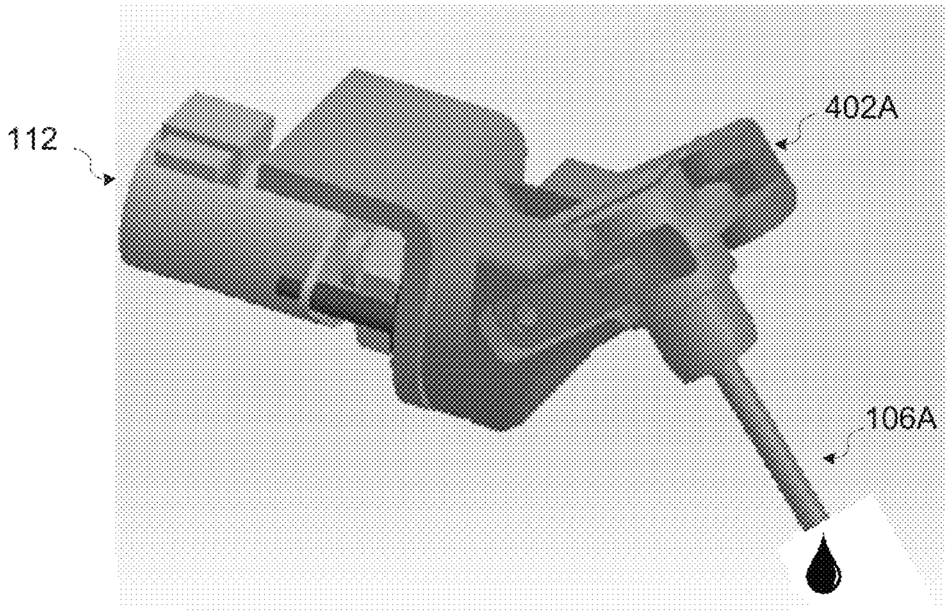
FIG. 4A, FIG. 4B and FIG. 4C are schematic illustrations of exemplary nail polish applying elements, according to some embodiments of the present invention.
Figure 4B:
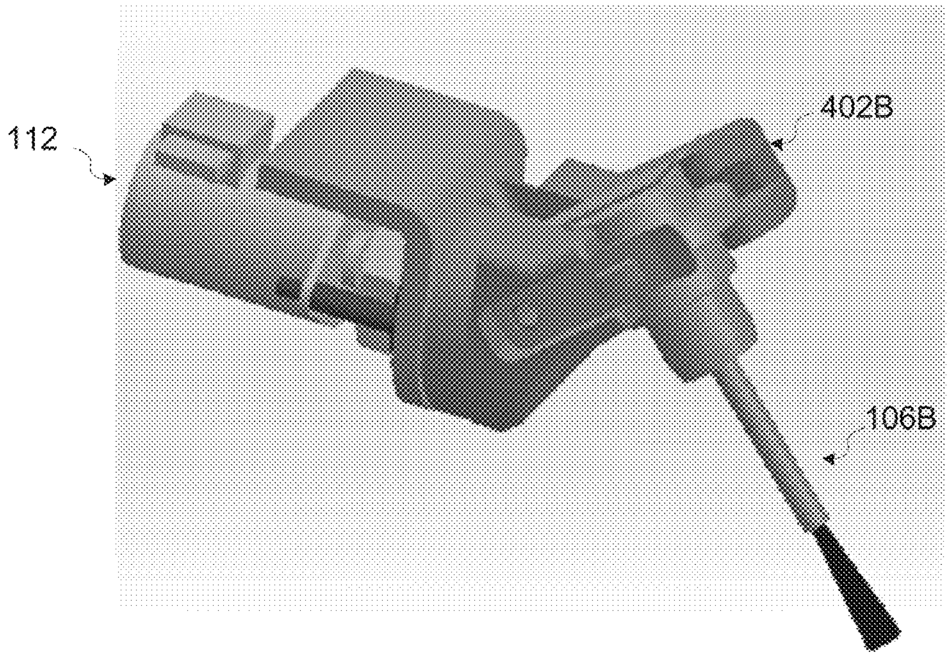
Figure 4C:
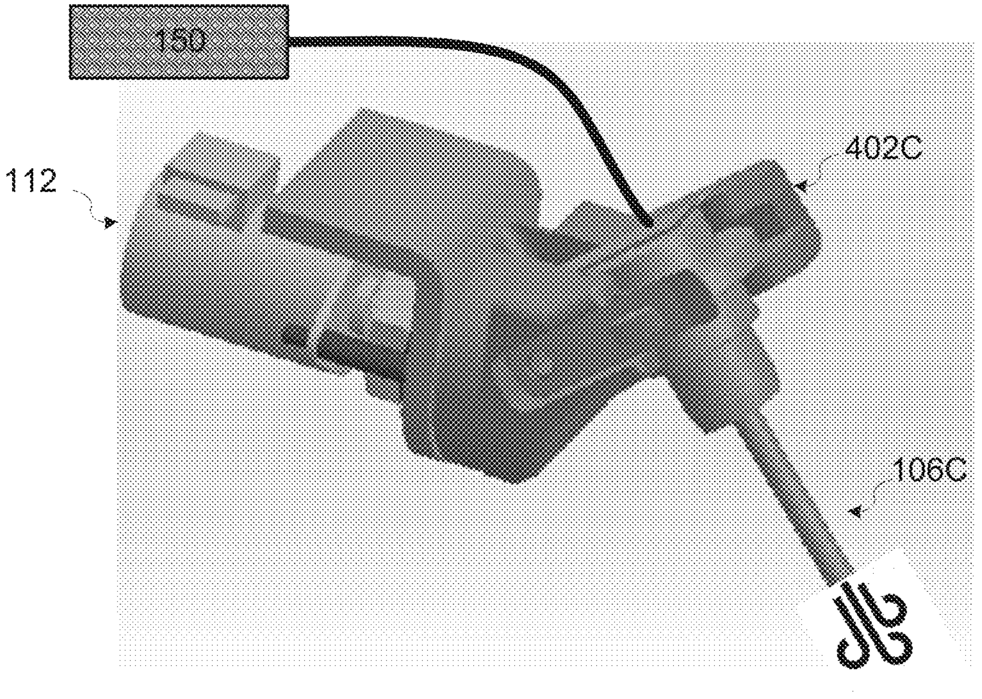

Reference is now made to FIG. 4A, FIG. 4B and FIG. 4C, which are schematic illustrations of exemplary nail polish applying elements, according to some embodiments of the present invention.

In a first exemplary embodiment described in FIG. 4A, a nail polish applying element 106A such as the nail polish applying element 106 may comprise a dispenser configured to directly dispense the nail polish on the nail surface(s). A nail polish applying and solidifying apparatus such as the nail polish applying and solidifying apparatus 100 may include one or more such dispensing nail polish applying element 106A which may be operated to dispense the nail polish on one or more nail surfaces identified in a treatment space such as the treatment space 130. The dispensing nail polish applying element 106A may collect the nail polish using one or more implementations. For example, the nail polish applying element 106A may be mechanically coupled to a conveying tube which may convey the nail polish from one or more reservoirs containing the nail polish to the dispensing nail polish applying element 106A. In another example, the nail polish applying element 106A may be operated to collect the nail polish from one or more of the reservoirs using a suction mechanism configured to suck the nail polish from the reservoir into a collection tube and/or compartment within the nail polish applying element 106A.

The nail polish applying element 106A may be mechanically coupled to a mounting element 402A moveable through the treatment space 130 by one or more actuators such as the actuator 112 as described herein before for the nail polish applying element 106 in order to crudely apply the nail polish on the identified nail surface(s). For example, the control unit 102 may operate the actuator(s) 112 to position the nail polish applying element 106A over a center of the nail surface(s) and operate the nail polish applying element 106A to dispense the nail polish on the nail surface(s). The nail polish dispensed on the center of the nail surface which is typically elevated with respect to nail surface may naturally disseminate over the nail surface(s) due to the gravity force. In another example, the control unit 102 may operate the actuator(s) 112 to move and position the nail polish applying element 106A at multiple points above the nail surface(s) and operate the nail polish applying element 106A to dispense the nail polish at several locations on the nail surface(s).

Moreover, the control unit 102 may analyze the sensory data to calculate a size of each nail surface and may calculate instructions to operate the nail polish applying element 106A to dispense a certain amount of the nail polish estimated to sufficiently cover the respective nail surface after disseminated.

In another exemplary embodiment described in FIG. 4B, a nail polish applying element 106B such as the nail polish applying element 106 may comprise a dispensing head comprising, for example, a brush, a plurality of hair strands, a sponge, one or more elastic tubes, one or more solid pipes and/or the like for applying and/or spreading the nail polish over the nail surface(s).

The nail polish applying element 106B may be mechanically coupled to a mounting element 402B moveable through the treatment space 130 by one or more actuators such as the actuator 112 as described herein before for the nail polish applying element 106 in order to crudely apply the nail polish on the identified nail surface(s). The nail polish applying element 106B may be further moved by the actuator(s) 112 to one or more reservoirs in the nail polish applying and solidifying apparatus 100 which contain nail polish to collect the nail polish. The nail polish applying element 106B may be maneuvered by the actuator(s) 112 to dip at least part of the dispensing head in the nail polish reservoir(s).

Based on the analysis of the sensory data, the control unit 102 may calculate instructions to operate the actuator(s) 112 for maneuvering the nail polish applying element 106B over the nail surface(s) such that at least part of the dispensing head is in contact with the nail surface(s) thus spreading the nail polish over the nail surface(s). However, the control unit 102 may operate the actuator(s) 112 to maneuver the nail polish applying element 106B to crudely apply (spread) the nail polish on the nail surface(s) in a manner that may cause the nail polish to disperse over the nail surface(s) and potentially spread over the skin areas of the finger(s) surrounding the nail surface(s). The control unit 102 may continuously analyze the sensory data captured in real-time by the imaging sensor(s) 104 to identify location and/or positioning of the nail polish applying element 106B with respect to the nail surface(s) and operate the actuator(s) 112 to adjust the location and/or the positioning accordingly in order to improve application of the nail polish on the nail surface(s).

Optionally, the nail polish applying element 106B may be used to complement the operation of the nail polish applying element 106A by spreading over the nail surface(s) the nail polish dispensed on the nail surface(s) by the nail polish applying element 106A.

In another exemplary embodiment described in FIG. 4C, a nail polish applying element 106C such as the nail polish applying element 106 comprising one or more air blowers may be used to complement the operation of the nail polish applying element 106A by blowing air over the nail surface(s) to spread the nail polish dispensed on the nail surface(s) by the nail polish applying element 106A.

The nail polish applying element 106C may be statically fixed in the treatment space 130 to blow air on the nail surface(s) to crudely spread the nail polish applied on the nail surface(s) using the nail polish applying element 10A and/or 106B. Optionally, the nail polish applying element 106C may be mechanically coupled to a mounting element 402C moveable through the treatment space 130 by one or more actuators such as the actuator 112 as described herein before for the nail polish applying element 106 in order to crudely spread the nail polish applied on the nail surface(s). The air blowing nail polish applying element 106C may be connected to a compressor via an air tube conveying compressed air from the compressor to the air blowing nail polish applying element 106C.

Additionally and/or alternatively, the nail polish applying element 106C may be shaped, configured and/or adapted to suck air and may be operated in conjunction with the nail polish applying element 106A and/or 106B to limit and potentially prevent spreading of the nail polish applied on the nail surface(s) to the skin surrounding the nail surface(s). While the nail polish applying element 106A and/or 106B are operated to apply the nail polish on the nail surface(s), the nail polish applying element 106C may be operated to suck air from over a borderline of the nail surface(s) thus creating under-pressure above the nail surface(s)' borderline. The relative sucking force (effect) applied to each segment of a certain surface that the air sucking nail polish applying element 106C is operated upon may depend on one or more operational parameters of the nail polish applying element 106C relative to each segment, for example, an angle, a distance, a height and/or the like. The nail polish applying element 106C may therefore be located and/or positioned with respect to the nail surface(s) such that the sucking force applied to the surrounding skin and/or the borderline is significantly higher compared to the sucking force applied to the nail surface(s) itself. The nail polish applied on the nail surface(s) may therefore disseminate over the nail surface(s) undisturbed by the air sucking effect while the prevented by the air sucking effect from disseminate beyond the borderline towards the surrounding skin. Under some conditions the suction operation may be more effective to prevent spreading of the nail polish on the surrounding skin compared to the blowing operation. For example, the control unit 102 may operate the actuator(s) 112 to maneuver the nail polish applying element 106C to suck the air above nail surface(s) borderline from an angle opposite the advancement direction of the nail polish. In such case due to its viscosity, the nail polish may not be actually sucked into the nail polish applying element 106C but dissemination of the nail polish may be reduced and potentially stopped by the suction operation to avoid spreading the nail polish outside the boundary of the nail surface(s).

Based on the analysis of the sensory data, the control unit 102 may calculate instructions to operate the actuator(s) 112 for maneuvering the nail polish applying element 106C over the nail surface(s) such that the air blown by nail polish applying element 106C spreads the nail polish previously dispensed on the nail surface(s) by the nail polish applying element 106A. However, the control unit 102 may operate the actuator(s) 112 to maneuver the nail polish applying element 106C to crudely spread the nail polish on the nail surface(s) in a manner that may cause the nail polish to disperse over the nail surface(s) and potentially spread over the skin areas of the finger(s) surrounding the nail surface(s). The control unit 102 may continuously analyze the sensory data captured in real-time by the imaging sensor(s) 104 to identify location and/or positioning of the nail polish applying element 106C with respect to the nail surface(s) and operate the actuator(s) 112 to adjust the location and/or the positioning accordingly in order to improve spreading of the nail polish on the nail surface(s).

According to some embodiments of the present invention, the nail polish applying and solidifying apparatus 100 may utilize one or more disposable capsules containing the nail polish. The disposable capsules may be constructed as two-part capsules having a container (body portion) containing the nail polish and a detachable nail polish applying element such as the nail polish applying element 106 for applying the nail polish to one or more of the nail surface(s). However, the disposable capsules may be integrated capsules having a body portion containing the nail polish and an integrated nail polish applying element such as the nail polish applying element 106 integrated with the body portion.

To this end the nail polish applying and solidifying apparatus 100 may include one or more capsule compartments 114 each adapted to receive and accommodate a nail polish capsule. The capsule compartments 114 may naturally be designed, constructed and adapted according to the capsule the nail polish applying and solidifying apparatus 100 is designed to use. For example, in case the nail polish applying and solidifying apparatus 100 utilizes one or more of the two-part capsules, the capsule compartment(s) 114 may be configured to receive and accommodate the two-part capsule(s), specifically the container of the two-part capsule(s). Moreover, the nail polish applying and solidifying apparatus 100 may be constructed and configured such that the detachable nail polish applying element 106 is moveable by the actuator(s) 112 operated by the control unit 102 between the capsule compartment(s) 114 accommodating the container of the two-part capsule(s) and the treatment area 130. In the treatment space 130, the control unit 102 may operate the detachable nail polish applying element 106 to apply the nail polish on the nail surface(s). In another example, in case the nail polish applying and solidifying apparatus 100 utilizes one or more of the integrated capsules, the capsule compartment(s) 114 may be configured to receive and accommodate the integrated capsule(s). Moreover, the nail polish applying and solidifying apparatus 100 may be constructed and configured such that the capsule compartment(s) 114 is moveable by the actuator(s) 112 operated by the control unit 102 to move the integrated nail polish applying element 106 with respect to the nail surface(s) in order to properly apply the nail polish on the nail surface(s).

Optionally, one or more of the two-part capsules contain nail polish sufficient for several nail polish applying sessions. In such case at the end of a nail polish application and solidification process, the control unit 102 may operate the actuator(s) 112 to re-attach the detachable nail polish applying element 106 to the container of the two-part capsule(s) thus sealing the nail polish in the container of the two-part capsule(s). During a following nail polish application and solidification process, the control unit 102 may operate the actuator(s) 112 to detach the detachable nail polish applying element 106 from the container and make it available for the applying the nail polish.

Figure 5A:
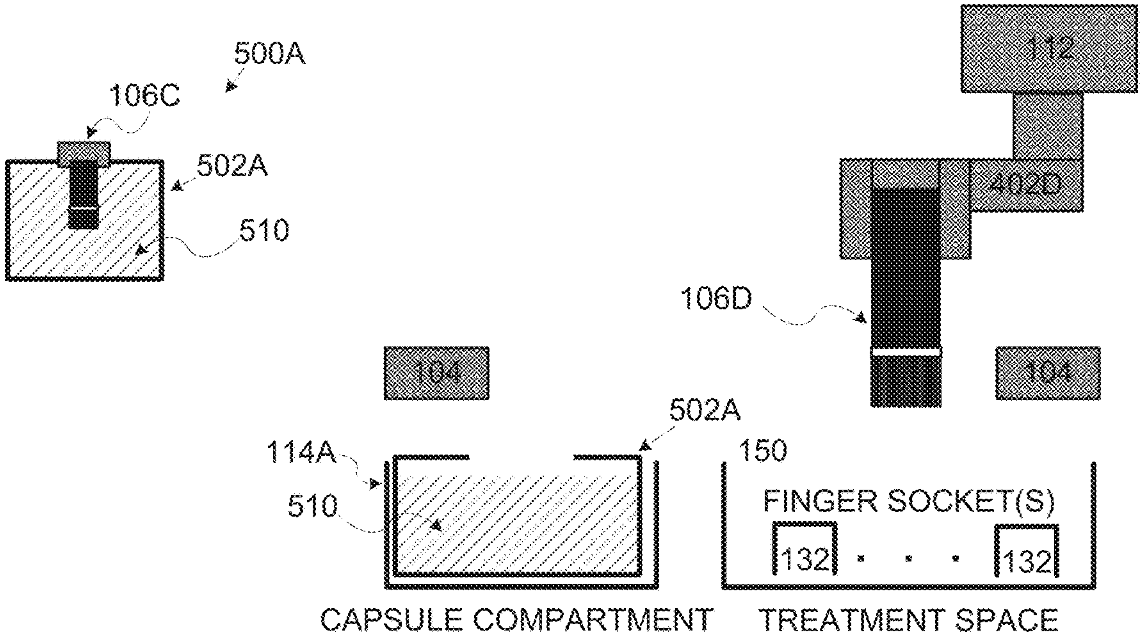
FIG. 5A and FIG. 5B are schematic illustrations of exemplary embodiments of nail polish capsules used by a nail polish applying and solidifying apparatus, according to some embodiments of the present invention.
Figure 5B:
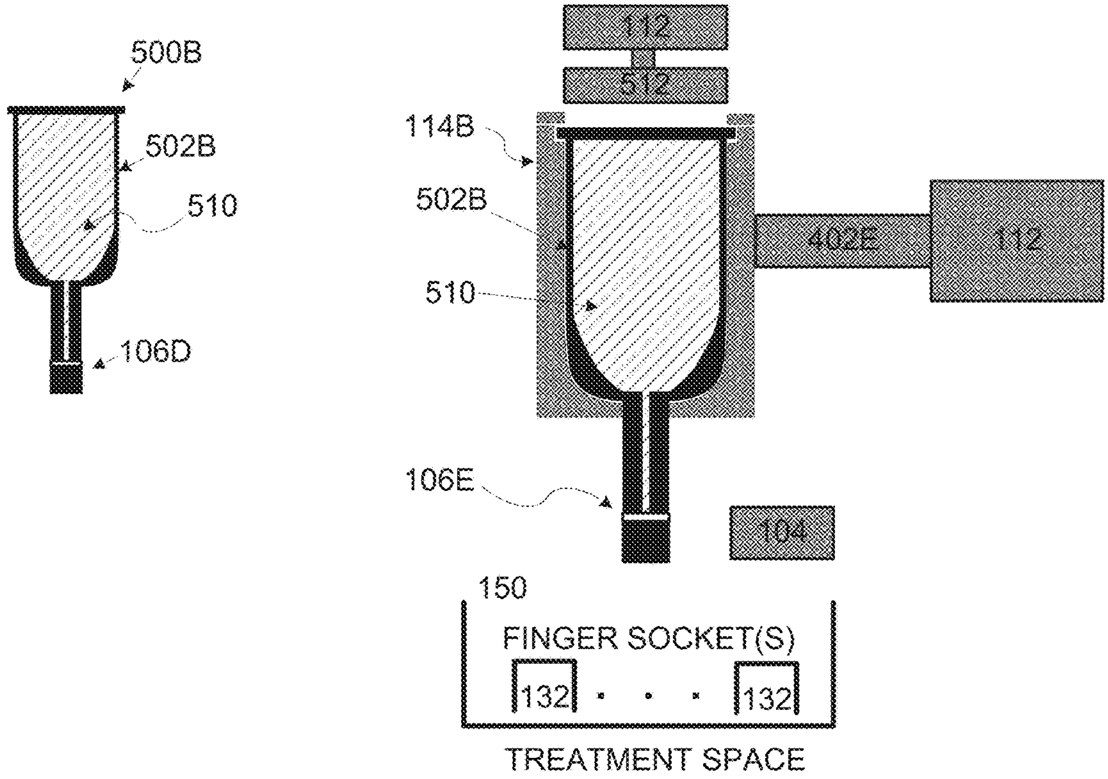

Reference is now made to FIG. 5A and FIG. 5B, which are schematic illustrations of exemplary embodiments of nail polish capsules used by a nail polish applying and solidifying apparatus such as the nail polish applying and solidifying apparatus 100, according to some embodiments of the present invention.

As seen in FIG. 5A, the nail polish applying and solidifying apparatus 100 may be designed, constructed, adapted and/or configured to receive and accommodate one or more two-part nail polish capsules 500A which may typically be disposable. Each two-part capsule 500A is constructed as a flask comprising a nail polish container (body portion) 502A containing nail polish 510 and a detachable nail polish applying elements 106D such as the nail polish applying element 106. As seen, the detachable nail polish applying element 106D initially covers the container 502A to seal the nail polish 510 in the container 502A. The detachable nail polish applying element 106D includes a dispensing head, for example, a brush, an application head and/or the like shaped and adapted to apply the nail polish 510 over one or more nail surfaces. The dispensing head may be dipped in the nail polish container 502A in order to collect the nail polish 510 to be applied over the nail surface(s).

To accommodate the two-part capsule(s) 500A, the nail polish applying and solidifying apparatus 100 may include one or more capsule compartments 114A such as the capsule compartment 114 adapted to receive and accommodate the nail polish capsule(s) 500A. The nail polish applying and solidifying apparatus 100 may further include a mounting element 402D adapted to receive and accommodate the detachable nail polish applying element 106D. The two-part capsule 500A may be placed in the nail polish applying and solidifying apparatus 100 manually by the user who may detach the detachable nail polish applying element 106D from the container 502A and place the container 502A in the capsule compartment 114A and the detachable nail polish applying element 106D in its designated location in the mounting element 402D. However, the nail polish applying and solidifying apparatus 100 may be configured to receive the two-part capsule 500A and automatically place the container 502A in the capsule compartment 114A and/or place the detachable nail polish applying element 106D in its designated location in the mounting element 402D. Moreover, the nail polish applying and solidifying apparatus 100 may be configured to automatically detach the detachable nail polish applying element 106D from the container 502A.

The mounting element 402D may be moveable across the treatment space 130 by one or more of the actuators 112 operated by the control unit 102 as described herein above for the nail polish applying element 106. Moreover, the control unit 102 may calculate the instructions for operating the actuator(s) 112 for moving the mounting element 402D based on the analysis of the sensory data captured by the imaging sensor(s) 104 deployed to depict the treatment space 130. Based on the analysis, the control unit 102 may identify nail surface(s) in the treatment space 130, specifically of fingers placed in the finger socket(s) 132. The control unit 102 may thus operate the actuator(s) 112 accordingly to move the mounting element 402D and maneuver the detachable nail polish applying element 106D, specifically the dispensing head of the detachable nail polish applying element 106D with respect to the identified nail surface(s) in order to properly apply the nail polish on the nail surface(s).

The control unit 102 may further operate the actuator(s) 112 to move the mounting element 402D and hence the detachable nail polish applying element 106D to the capsule compartment 114A accommodating the container 502A and further dip at least part of the dispensing head in the nail polish 510 contained in the container 502A in order to collect the nail polish 510. Optionally, one or more of the imaging sensors 104 may be deployed to depict the container 502A accommodated in the capsule compartment 114A. The control unit 102 may analyze the sensory data captured by the imaging sensor(s) 104 depicting the container 502A to identify the location and/or the positioning of the container 502A and/or of the detachable nail polish applying element 106D. based on the identified location and/or positioning, the control unit 102 may operate the actuator(s) 112 to maneuver the detachable nail polish applying element 106D to the container 502A and dip the dispensing head in the nail polish 510 contained in the container 502A.

As seen in FIG. 5B, the nail polish applying and solidifying apparatus 100 may be designed, constructed, adapted and/or configured to receive and accommodate one or more integrated nail polish capsules 500B which may typically be disposable. Each integrated capsule 500B is constructed of a body portion 502B containing the nail polish 510 and an integrated nail polish applying elements 106E such as the nail polish applying element 106. The body portion 502B may typically be sealed to prevent the nail polish 510 from flowing to the integrated nail polish applying elements 106E, specifically to a dispensing head of the integrated nail polish applying elements 106E. The integrated capsule 500B may employ one or more mechanical techniques, structures, implementations and/or elements to force extrusion of the nail polish from the body portion 502B to the integrated nail polish applying elements 106E.

The sealed body portion 502 may be manually opened by the user. However, the nail polish applying and solidifying apparatus 100 may include one or more puncturing elements configured to automatically open the sealed body portion 502B to allow the nail polish 510 contained in the body portion 502B to flow to the integrated nail polish applying elements 106E. Optionally, the integrated capsule 500B may include one or more mechanical features and/or elements to support opening the sealed body portion 502B.

To accommodate the integrated capsule(s) 500B, the nail polish applying and solidifying apparatus 100 may include one or more capsule compartments 114B such as the capsule compartment 114 adapted to receive and accommodate the nail polish capsule(s) 500B. The capsule compartment(s) 114B may be mechanically coupled to a mounting element 402E which is moveable across the treatment space 130 by one or more of the actuators 112 operated by the control unit 102 as described herein above for the nail polish applying element 106. As such, control unit may calculate instructions for operating the actuators to move the mounting element 402E while the integrated capsule(s) 500B are located in the capsule compartment(s) 114B and hence move the integrated nail polish applying element 106E in the treatment area 130. Moreover, the control unit 102 may calculate the instructions for operating the actuator(s) 112 for moving the mounting element 402E based on the analysis of the sensory data captured by the imaging sensor(s) 104 deployed to depict the treatment space 130. Based on the analysis, the control unit 102 may identify nail surface(s) in the treatment space 130, specifically of fingers placed in the finger socket(s) 132. The control unit 102 may thus operate the actuator(s) 112 accordingly to move the mounting element 402E and maneuver the integrated nail polish applying element 106E, specifically the dispensing head of the integrated nail polish applying element 106E with respect to the identified nail surface(s) in order to properly apply the nail polish on the nail surface(s).

Depending on the mechanical structure and and/or elements applied by the integrated capsule 500B for forcing extrusion of the nail polish from the body portion 502B to the integrated nail polish applying elements 106E, the nail polish applying and solidifying apparatus 100 may include complementary elements to interact with the mechanical structure and/or elements of the integrated capsule 500B in order to force extrusion of the nail polish to the integrated nail polish applying elements 106E. For example, assuming the integrated capsule 500B is constructed as a syringe like capsule having a moveable cover that when pressed down forces extrusion of the nail polish from the body portion 502B. In such case, the nail polish applying and solidifying apparatus 100 may include a pressing element 512, for example, a piston, a plunger and/or the like which may be moved by one or more of the actuator(s) 12 operated by the control unit 102 to press down the moveable cover. In another example, assuming the integrated capsule 500B is constructed with one or more collapsible walls that when pressed inwards forces extrusion of the nail polish from the body portion 502B. In such case, the nail polish applying and solidifying apparatus 100 may include a pressing element 512, for example, a piston, a plunger, a bar and/or the like which may be moved by the actuator(s) 12 operated by the control unit 102 to press on one or more walls of the capsule compartment 114A thus pressing inwards the collapsible wall(s).

After the nail polish is crudely applied on the nail surface(s) by the nail polish applying element(s) 106 operated by the control unit 102, the control unit 102 may further operate one or more of the solidifying energy sources 108 to solidify the nail polish applied on the nail surface(s). Optionally, the control unit 102 operates the solidifying energy source(s) 108 to accurately solidify only nail polish applied on the nail surface(s) while reducing and potentially preventing (avoiding) solidifying the nail polish which may has spread on the skin areas surrounding the nail surface(s).

The nail polish applying and solidifying apparatus 100 may employ one or more solidifying techniques, technologies and/or implementations for solidifying (drying) the nail polish applied on the nail surface(s). The nail polish applying and solidifying apparatus 100 may optionally apply accurately solidification of the crudely applied nail polish by solidifying only the nail polish applied on the nail surface(s) while reducing and potentially avoiding solidifying the nail polish which may has spread on the skin surrounding the nail surface(s). In order to solidify only the nail polish applied on the nail surface(s), the control unit 102 may operate the solidifying element(s) 108 based on the analysis of the sensory data captured by the imaging sensor(s) 104 depicting the treatment space 130.

According to some embodiments of the present invention, the solidifying energy sources employed by the nail polish applying and solidifying apparatus 100 to solidify the nail polish crudely applied on the nail surface(s). may include one or more solidifying light sources which may emit solidifying light to solidify the nail polish. Optionally, one or more of the solidifying light sources are configured and/or operated to emit solidifying light only within a boundary of the nail surface(s) while avoiding projecting solidifying light on area outside the boundary(s), specifically avoiding projecting solidifying light on the surrounding skin.

Figure 2A:
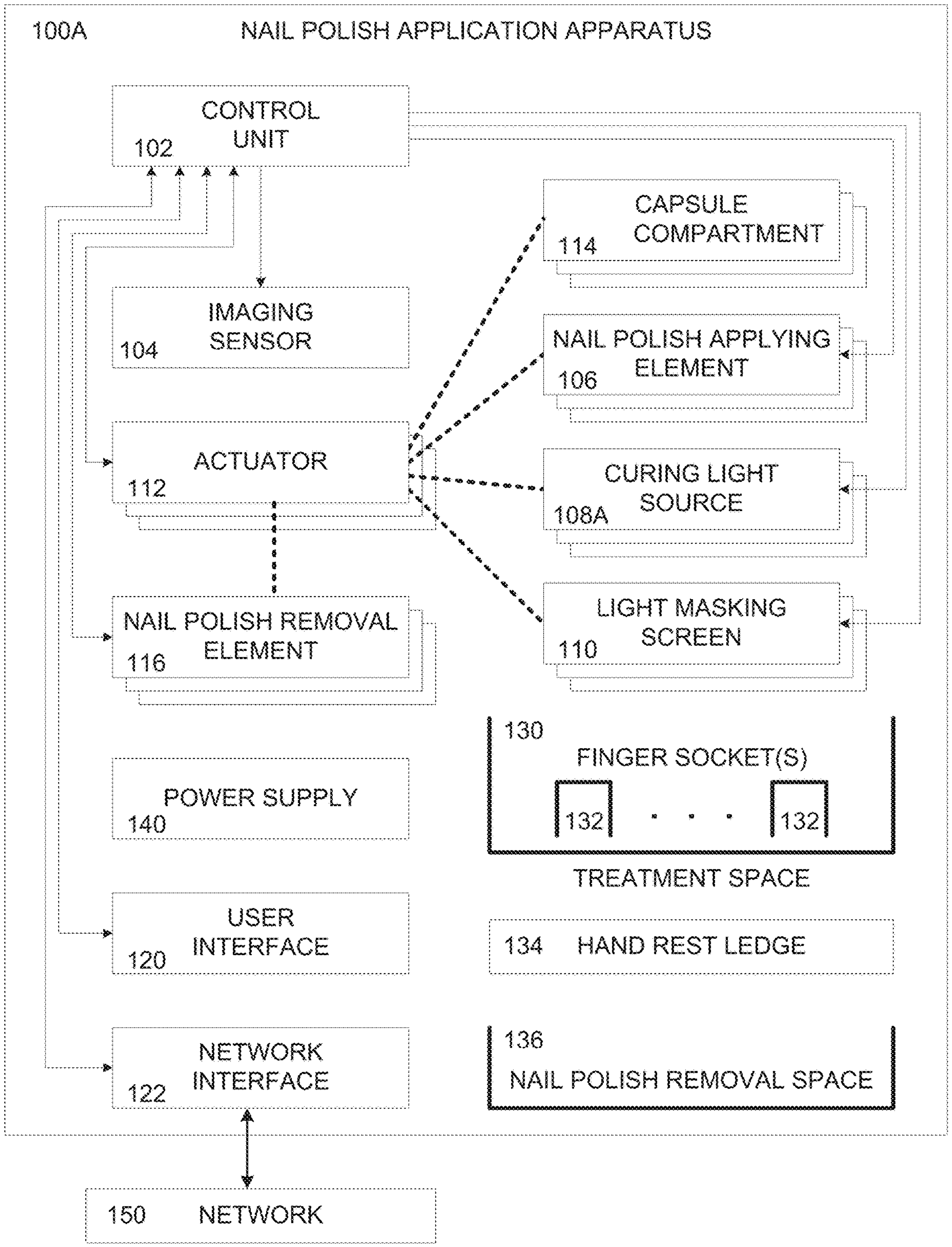
FIG. 2A, FIG. 2B, FIG. 2C and FIG. 2D are schematic illustrations of exemplary embodiments of apparatuses for applying and solidifying nail polish on nail surface(s) of a user, according to some embodiments of the present invention.

Reference is now made to FIG. 2A, which is a schematic illustrations of an exemplary embodiment 100A of a nail polish applying and solidifying apparatus such as the nail polish applying and solidifying apparatus 100 for applying and solidifying nail polish on nail surface(s) of a user, according to some embodiments of the present invention. The nail polish applying and solidifying apparatus 100A may employ one or more solidifying light sources 108A which may emit light to solidify nail polish crudely applied on the nail surface of one or more fingers placed in a treatment space such as the treatment space 130, in particular finger(s) placed in one or more finger sockets such as the finger socket 132.

Moreover, in some embodiments, the solidifying light source(s) 108A may be operated in conjunction with one or more light masking screens 110 configured to limit the light emitted from the solidifying light source(s) 108A to certain areas.

Based on the analysis of the sensory data, the control unit 102 may identify the nail surface(s), and may operate the solidifying light source(s) 108A and optionally the masking screen(s) 110 accordingly such that (solidifying) light emitted by the (solidifying) light source(s) 108A is projected on the nail surface(s).

Optionally, the control unit 102 may identify the boundary of the nail surface(s) based on analysis of the sensory data and may operate the solidifying light source(s) 108A such that the solidifying light emitted by the solidifying light source(s) 108A is projected only within the boundary of the nail surface(s) while reducing and potentially preventing (avoiding) projection of the (solidifying) light on skin areas surrounding the nail surface(s), i.e., outside the identified boundary thus accurately solidifying only the nail polish applied on the nail surface(s).

The solidifying light source(s) 108A may be configured to emit different types of light which may vary in their spectral characteristics light emission characteristics and/or the like. For example, the solidifying light source(s) 108A may be configured to emit Ultra-Violet (UV) light. In another example, the solidifying light source(s) 108A may be configured to emit Infra-Red (IR) light. In another example, the solidifying light source(s) 108A may be configured to emit focused light for example, a coherent laser beam and/or the like.

The solidifying light source(s) 108A and the optional light masking screen(s) 110 may be implemented using one or more technologies, techniques and/or implementations to project solidifying light on the nail surface(s). Optionally one or more of the solidifying light source(s) 108A may be operated to accurately project solidifying light only within the boundary of the nail surface(s).

Figure 6A:
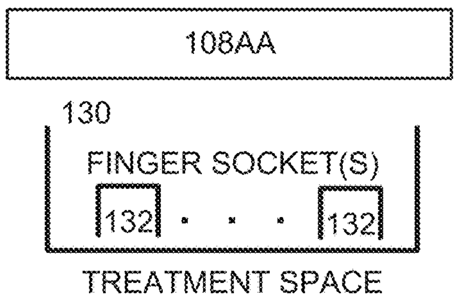
FIG. 6A, FIG. 6B and FIG. 6C are schematic illustrations of an exemplary solidifying light array deployed in a nail polish applying and solidifying apparatus, according to some embodiments of the present invention.
Figure 6B:
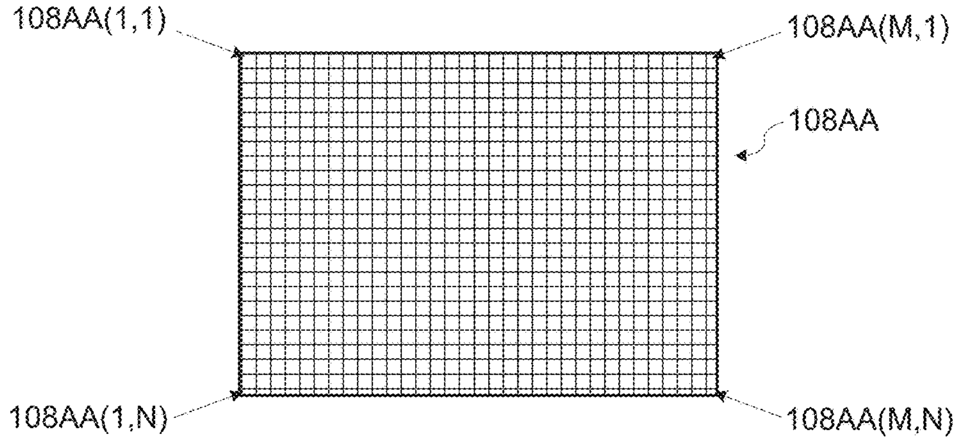
Figure 6C:
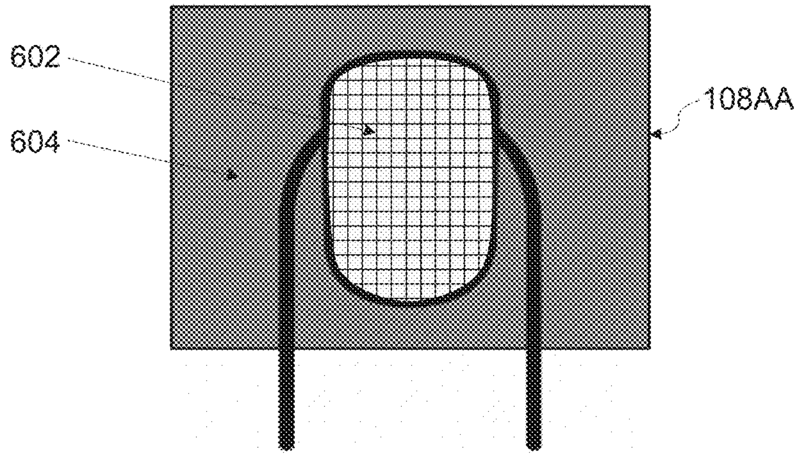

Reference is now made to FIG. 6A, FIG. 6B and FIG. 6C, which are schematic illustrations of an exemplary solidifying light array deployed in a nail polish applying and solidifying apparatus such as the nail polish applying and solidifying apparatus 100A, according to some embodiments of the present invention. One or more solidifying light arrays 108AA such as the solidifying light source 108A may be used in the nail polish applying and solidifying apparatus 100A.

As seen in FIG. 6A, the solidifying light array 108AA may be placed, positioned and/or deployed in a treatment space such as the treatment space 130 such that the solidifying light array 108AA is located above the nail surface(s) of the finger(s) placed in the treatment space 130, specifically in one or more finger sockets such as the finger socket 132. Optionally, the solidifying light array 108AA may be moved with respect to the finger socket 132 by one or more actuators such as the actuator 112 operated by a control unit such as the control unit 102 to adjust a location and/or a position of the solidifying light array 108AA with respect to the finger socket 132.

As seen in FIG. 6B, the solidifying light array 108AA may be constructed of a plurality of limited range light sources 108AA(m,n) (m=1, . . . M; n=1, . . . N) each adjusted to project light, for example, UV light, IR light and/or the like on a respective predefined limited area of a treated surface, i.e., of the nail surface. The number and/or arrangement of the limited range light sources 108AA(m,n) constituting the solidifying light array 108AA may be selected, configured and/or positioned to effectively cover the entire nail surface(s) while supporting a fine, high resolution grid. As such, the light emitted by each of the limited range light sources 108AA(m,n) is projected on a respective substantially small and limited segment of the treated surface area, i.e., the nail surface(s).

In case inaccurate solidification is applied, the control unit 102 may calculate instructions to operate the plurality of limited range light sources 108AA(m,n) and/or part thereof such that the light emitted by the subset of limited range light sources 108AA(m,n) is projected on the boundary 602 and possibly on skin of the finger surrounding the boundary 602 of the nail surface.

However, as seen in FIG. 6C, in case accurate solidification is applied, the control unit 102 may analyze the sensory data captured by one or more imaging sensors such as the imaging sensor 104 to identify a nail surface 602 within a boundary of each of the nail surface(s) identified in the treatment space 130. The control unit 102 may then calculate instructions to operate a subset of the plurality of limited range light sources 108AA(m,n) such that the overall light emitted by the subset of limited range light sources 108AA (m,n) is projected only within the boundary 602. As result only the nail polish applied on the nail surface(s) 602 within the boundary(s) of the nail surface(s) is accurately solidified while the nail polish applied in areas 604 outside the boundary(s), for example, on the skin surrounding the nail surface(s) is not solidified.

As described herein before, the control unit 102 may optionally operate the actuator(s) 112 to adjust the location and/or the position of the solidifying light array 108AA with respect to the identified nail surface(s).

The control unit 102 may further analyze the sensory data captured by the imaging sensor(s) 104 during the solidification process to estimate a drying state of the nail polish applied on the nail surface(s). Based on the estimated drying state, in particular in case the nail polish is not sufficiently solidified (dry), the control unit 102 may further operate the subset of limited range light sources 108AA(m,n) to further project light on at least part of the nail surface(s) 602.

Moreover, based on the analysis of the sensory data captured during the solidification process, the control unit 102 may detect movement of the finger(s) in the nail polish applying space 130 which may naturally lead to movement of the nail surface(s). The control unit 102 may identify the new location and/or position of the nail surface(s) and may operate the solidifying light array 108AA, specifically select an adjusted subset of the limited range light sources 108AA (m,n) to accurately project light on the nail surface(s) 602 in their newly detected location and/or position.

Figure 7A:
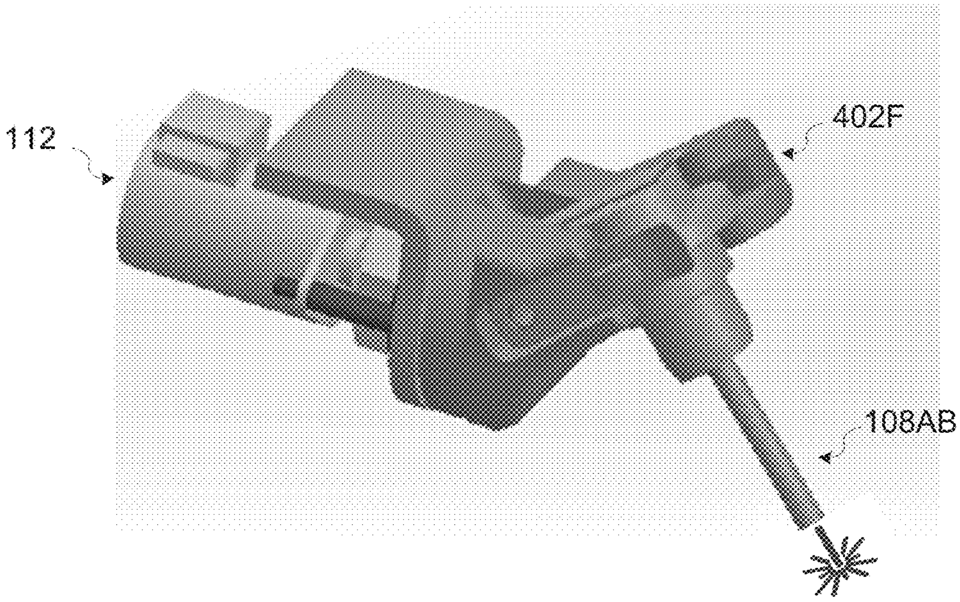
FIG. 7A and FIG. 7B are schematic illustrations of an exemplary focused moveable solidifying light source deployed in a nail polish applying and solidifying apparatus, according to some embodiments of the present invention.
Figure 7B:
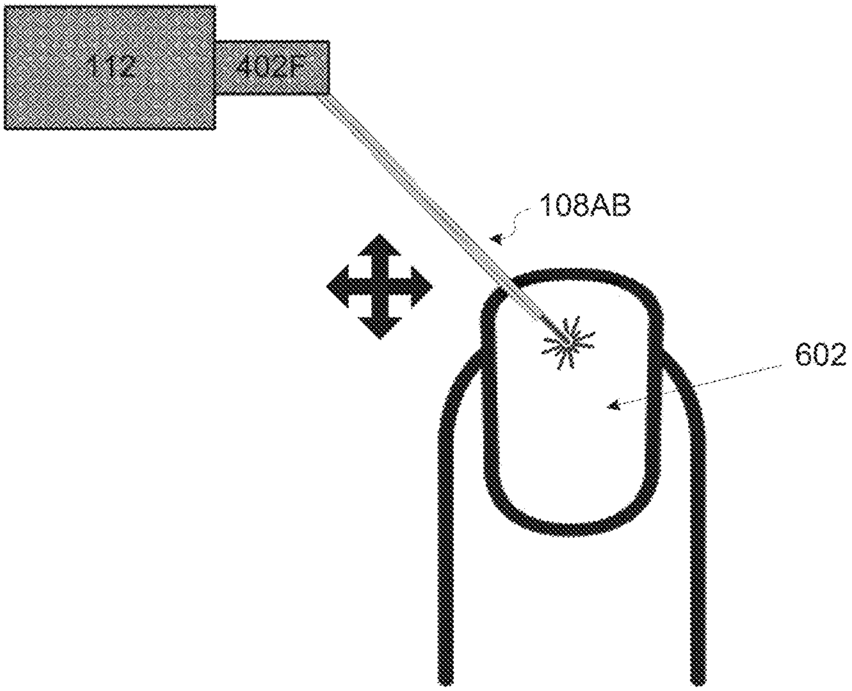

Reference is now made to FIG. 7A and FIG. 7B, which are schematic illustrations of an exemplary focused moveable solidifying light source deployed in a nail polish applying and solidifying apparatus such as the nail polish applying and solidifying apparatus 100A, according to some embodiments of the present invention. One or more focused moveable solidifying light sources 108AB such as the solidifying light source 108A may be used in the nail polish applying and solidifying apparatus 100A. The focused moveable solidifying light source(s) 108AB may be typically configured to emit a focused coherent light beam, for example, a laser beam and/or the like such that the focused light is projected on a substantially small and limited size surface area of a treated surface area, i.e., the nail surface(s).

As seen in FIG. 7A, the focused moveable solidifying light source(s) 108AB may be mechanically coupled to a mounting element 402F which is moveable across a treatment space such as the treatment space 130 by one or more actuators such as the actuator 112 operated by a control unit such as the control unit 102 as described for the nail polish applying element 106.

As seen in FIG. 7B, the control unit 102 may analyze the sensory data captured by one or more imaging sensors such as the imaging sensor 104 to identify a nail surface 602 within a boundary of each of the nail surface(s) identified in the treatment space 130. The control unit 102 may then calculate instructions to operate the actuator(s) 112 to move the focused moveable solidifying light source(s) 108AB over the nail surface(s).

Optionally, in case accurate solidification is applied, the control unit 102 may then calculate instructions to operate focused moveable solidifying light source(s) 108AB over the nail surface(s) only within the identified boundary(s). The control unit 102 may operate the actuator(s) 112 to pause the focused moveable solidifying light source(s) 108AB over each limited size and substantially small segment of the nail surface within the boundary(s) for a predefined time period determined to be sufficient for solidifying the nail polish applied on the respective limited size segment.

The control unit 102 may further analyze the sensory data captured by the imaging sensor(s) 104 during the solidification process to estimate the drying state of the nail polish applied on the nail surface(s). Based on the estimated drying state, in particular in case the nail polish is not sufficiently solidified (dry), the control unit 102 may further operate the focused moveable solidifying light source(s) 108AB to project light on at least part of the nail surface(s) 602 at locations identified to be insufficiently solidified.

Moreover, based on the analysis of the sensory data captured during the solidification process, the control unit 102 may detect movement of the finger(s) in the nail polish applying space 130 which may naturally lead to movement of the nail surface(s). The control unit 102 may identify the new location and/or position of the nail surface(s) and may operate the focused moveable solidifying light sources 108AB to accurately move over the nail surface(s) 602 within the boundary(s) in the newly detected location and/or position. As such the nail polish applied in areas 604 outside the boundary(s), for example, on the skin surrounding the nail surface(s) is not solidified.

Figure 8A:
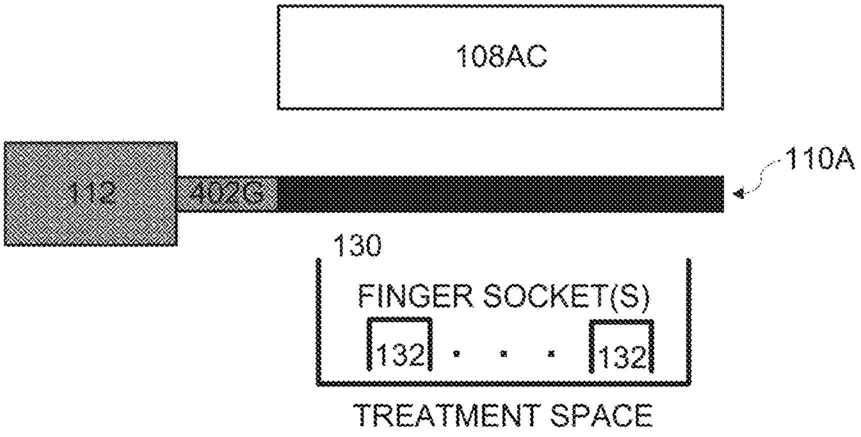
FIG. 8A, FIG. 8B and FIG. 8C are schematic illustrations of an exemplary light masking screen having a limited size opening for transferring a focused light beam projected by a solidifying light source deployed in a nail polish applying and solidifying apparatus, according to some embodiments of the present invention.
Figure 8B:
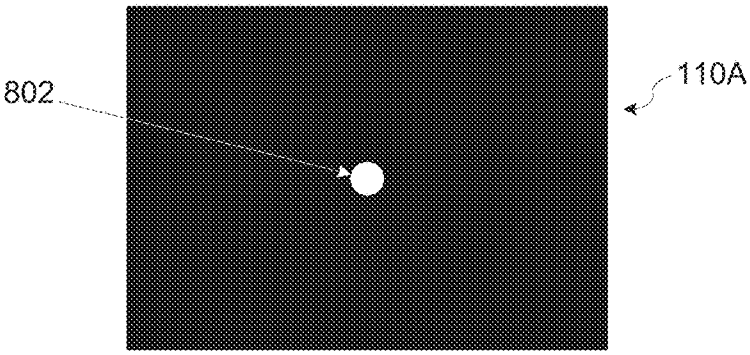
Figure 8C:
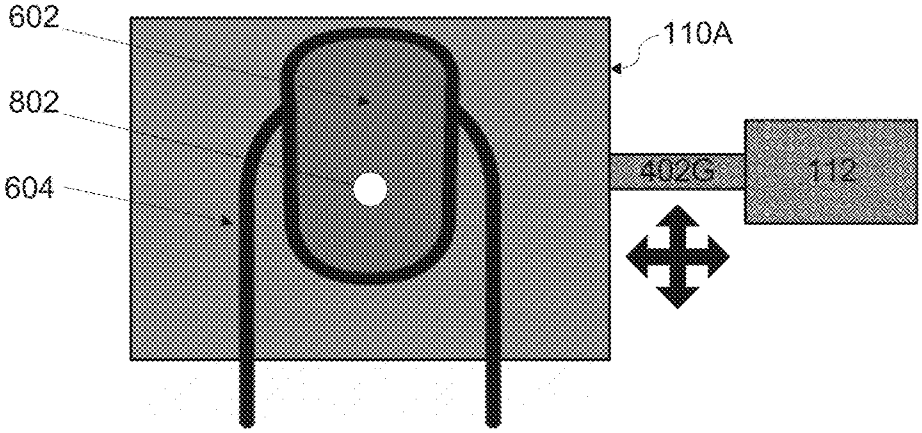

Reference is now made to FIG. 8A, FIG. 8B and FIG. 8C, which are schematic illustrations of an exemplary light masking screen having a limited size opening for transferring a focused light beam projected by a solidifying light source deployed in a nail polish applying and solidifying apparatus such as the nail polish applying and solidifying apparatus 100A, according to some embodiments of the present invention.

As seen in FIG. 8A, One or more solidifying light sources 108AC, in particular wide angle light sources adapted to emit light, for example, IR light, UV light and/or the like may be used in the nail polish applying and solidifying apparatus 100A. The control unit 102 may therefore calculate instructions to operate the solidifying light source(s) 108AC to emit solidifying light which is projected on the nail surface(s).

However, in case accurate solidification is required, due to its wide angle of light emission, in order to accurately solidify only the nail polish applied within the boundary of the nail surface(s), the solidifying light source(s) 108AC may be operated in conjunction with one or more light masking screens 110A deployed between the solidifying light source(s) 108AC and the treated surface area, i.e., the nail surface(s).

The light masking screen(s) 110A may be configured to limit projection of the light emitted by the solidifying light source(s) 108AC to a substantially small and limited size surface area of the nail surface(s). Moreover, the light masking screen(s) 110A may be mechanically coupled to a mounting element 402G which is moveable across a treatment space such as the treatment space 130 by one or more actuators such as the actuator 112 operated by a control unit such as the control unit 102 as described for the nail polish applying element 106.

Optionally, one or more of the solidifying light source(s) 108AC may be moveable to adjust its location and/or position with respect to one or more finger sockets such as the finger socket 132 located in the treatment space 130. However, the solidifying light source(s) 108AC may be typically fixed to project the light in a wide angle within the treatment space 130.

As seen in FIG. 8B, the light masking screen 110A may have a limited size opening 802 shaped to limit projection of the light emitted by the wide angle solidifying light source(s) 108AC to a fraction of the treated surface area which is a substantially small and limited size segment of the treated surface area, i.e., the nail surface(s).

The shape of the limited size opening 802 may include one of a plurality of shapes selected according to one or more parameters, for example, a location of the solidifying light source(s) 108AC, a distance between the light masking screen 110A and solidifying light source(s) 108AC, a distance between the light masking screen 110A and the treated nail surface, a propagation attribute of the emitted light and/or the like.

Optionally, in case multiple fingers are placed the finger sockets 132, a respective light masking screen 110A may be associated with each nail surface of the plurality of fingers identified in the treatment space 130.

As seen in FIG. 8C, the control unit 102 may analyze the sensory data captured by one or more imaging sensors such as the imaging sensor 104 to identify a nail surface 602 within a boundary of each of the nail surface(s) identified in the treatment space 130. The control unit 102 may then calculate instructions to operate the actuator(s) 112 to move the light masking screen 110A over the nail surface(s) only within the identified boundary(s). The control unit 102 may operate the actuator(s) 112 to pause the light masking screen 110A over each limited size and substantially small segment of the nail surface within the boundary(s) for a predefined time period during which the light emitted from the solidifying light source(s) 108AC is projected on the respective limited size segment. As such the nail polish applied in areas 604 outside the boundary(s), for example, on the skin surrounding the nail surface(s) is not solidified. The predefined time may be determined by the control unit 102 to be sufficient for solidifying the nail polish applied on the respective limited size segment.

The control unit 102 may further analyze the sensory data captured by the imaging sensor(s) 104 during the solidification process to estimate the drying state of the nail polish applied on the nail surface(s). Based on the estimated drying state, in particular in case the nail polish is not sufficiently solidified (dry), the control unit 102 may further operate the light masking screen 110A to enable projection of the light emitted by the solidifying light source(s) 108AC on at least part of the nail surface(s) 602 at locations identified to be insufficiently solidified.

Moreover, based on the analysis of the sensory data captured during the solidification process, the control unit 102 may detect movement of the finger(s) in the nail polish applying space 130 which may naturally lead to movement of the nail surface(s). The control unit 102 may identify the new location and/or position of the nail surface(s) 602 and may operate the light masking screen 110A to accurately move over the nail surface(s) within the boundary(s) in the newly detected location and/or position.

Figure 9A:
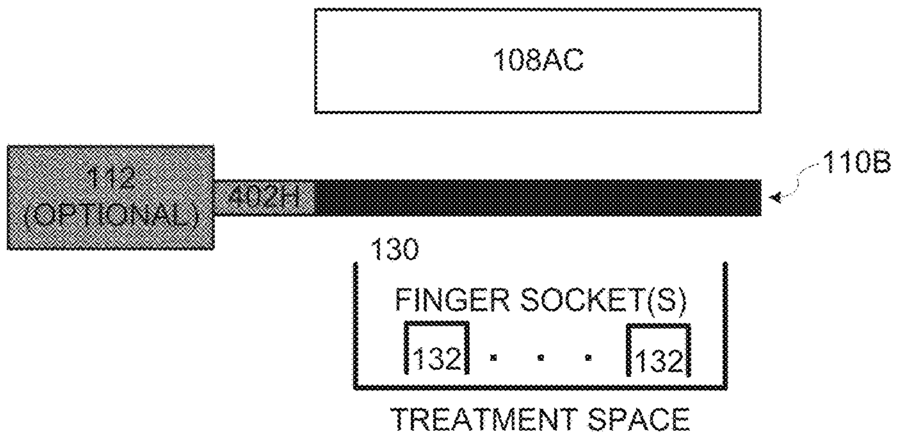
FIG. 9A, FIG. 9B and FIG. 9C are schematic illustrations of an exemplary light masking screen having a dynamically adjustable opening for transferring an adjustable pattern of solidifying light projected by a light source deployed in a nail polish applying and solidifying apparatus, according to some embodiments of the present invention.
Figure 9B:
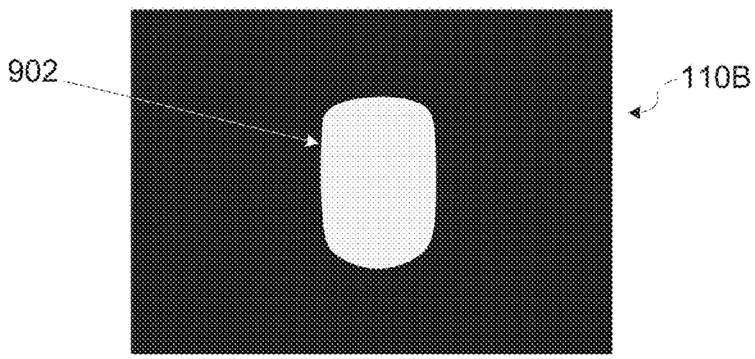
Figure 9C:
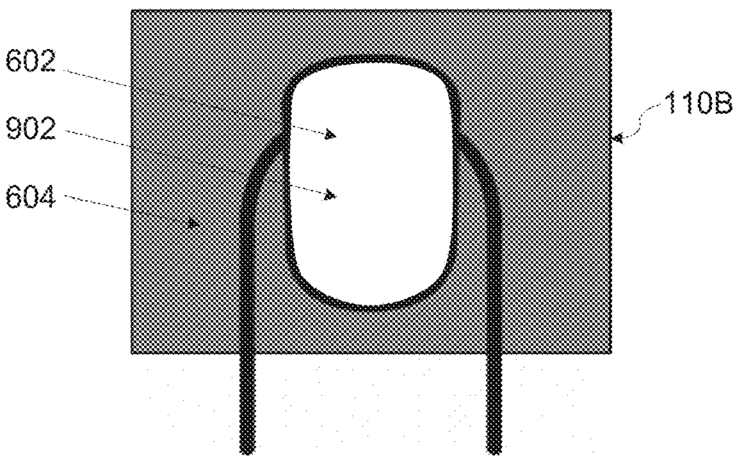

Reference is now made to FIG. 9A, FIG. 9B and FIG. 9C, which are schematic illustrations of an exemplary light masking screen having a dynamically adjustable opening for transferring an adjustable pattern of solidifying light projected by a light source deployed in a nail polish applying and solidifying apparatus such as the nail polish applying and solidifying apparatus 100A, according to some embodiments of the present invention.

As seen in FIG. 9A, one or more solidifying light sources such as the solidifying light source 108AC which is a wide angle light source adapted to emit light, for example, UV light, IR light and/or the like may be used in the nail polish applying and solidifying apparatus 100A. As describe here in before, the control unit 102 may calculate instructions to operate solidifying light source(s) 108AC to emit solidifying light which is projected on the nail surface(s).

However, in case accurate solidification is required, in order to accurately solidify only the nail polish applied within the boundary of the nail surface(s), the solidifying light source(s) 108AC may be operated in conjunction with one or more light masking screens 110B deployed between the solidifying light source(s) 108AC and the treated surface area, i.e., the nail surface(s). Optionally, the light masking screen(s) 110B may be mechanically coupled to a mounting element 402H which is moveable across a treatment space such as the treatment space 130 by one or more actuators such as the actuator 112 operated by a control unit such as the control unit 102 as described for the nail polish applying element 106.

As seen in FIG. 9B, the light masking screen(s) 110B may have a dynamically adjustable opening that may be dynamically shaped to limit projection of the light emitted by the solidifying light source(s) 108AC to the nail surface(s) only within the boundary(s) of the nail surfaces. The light masking screen(s) 110B may employ one or more mechanical constructions which are capable of fine adjustment to form a precise and accurate shape. For example, the light masking screen(s) 110B may be constructed from a plurality of moveable apertures that may be arranged to form a precise shape. In another example, the light masking screen(s) 110B may be constructed from a plurality of elastic elements which may be dynamically shaped to form a desired shape.

As seen in FIG. 9C, the control unit 102 may analyze the sensory data captured by one or more imaging sensors such as the imaging sensor 104 to identify a nail surface 602 within a boundary of each of the nail surface(s) identified in the treatment space 130. The control unit 102 may then calculate instructions to operate the light masking screen(s) 110B to shape the dynamically adjustable opening to overlap with the identified boundary(s) such that the light emitted from the solidifying light source(s) 108AC is projected only within the boundary(s). As such the nail polish applied in areas 604 outside the boundary(s), for example, on the skin surrounding the nail surface(s) is not solidified.

Optionally, in case the light masking screen(s) 110B is moveable, the control unit 102 may operate the actuator(s) 112 to move the light masking screen(s) 110B with respect to the identified nail surface(s) and/or with respect to the solidifying light source(s) 108AC in order to better improve accuracy of the overlap between the light masking screen(s) 110B and the identified boundary(s).

The control unit 102 may further analyze the sensory data captured by the imaging sensor(s) 104 during the solidification process to estimate the drying state of the nail polish applied on the nail surface(s). Based on the estimated drying state, in particular in case the nail polish is not sufficiently solidified (dry), the control unit 102 may further operate the light masking screen 110A to enable projection of the light emitted by the solidifying light source(s) 108AC within the boundary(s) of the nail surface(s) 602.

Moreover, based on the analysis of the sensory data captured during the solidification process, the control unit 102 may detect movement of the finger(s) in the nail polish applying space 130 which may naturally lead to movement of the nail surface(s). The control unit 102 may identify the new location and/or position of the nail surface(s) and may operate the light masking screen 110B, specifically the dynamically adjustable opening 902 to accurately overlap the boundary(s) of the nail surface(s) in the newly detected location and/or position.

Reference is now made to 10A, FIG. 10B and FIG. 10C, which are schematic illustrations of an exemplary light masking screen constructed of a plurality of tiles each configurable to be opaque or at least partially transparent for transferring an adjustable pattern of light projected by a solidifying light source deployed in a nail polish applying and solidifying apparatus such as the nail polish applying and solidifying apparatus 100A, according to some embodiments of the present invention.

As seen in FIG. 10A, one or more solidifying light sources such as the solidifying light source 108AC which is a wide angle light source adapted to emit light, for example, UV light, IR light and/or the like may be used in the nail polish applying and solidifying apparatus 100A. As describe here in before, the control unit 102 may calculate instructions to operate the solidifying light source(s) 108AC to emit solidifying light which is projected on the nail surface(s).

However, in case accurate solidification is required, in order to accurately solidify only the nail polish applied within the boundary of the nail surface(s), the solidifying light source(s) 108AC may be operated in conjunction with one or more light masking screens 110C deployed between the solidifying light source(s) 108AC and the treated surface area, i.e., the nail surface(s). Optionally, the light masking screen(s) 110C may be mechanically coupled to a mounting element 402I which is moveable across a treatment space such as the treatment space 130 by one or more actuators such as the actuator 112 operated by a control unit such as the control unit 102 as described for the nail polish applying element 106. Moreover, as described for the nail polish applying element 106, the mounting element 402I may be moveable in an axis perpendicular to the nail surface(s) of finger(s) placed in the treatment space to adjust a height of the light masking screen(s) 110C above the nail surface(s).

As seen in FIG. 10B, the light masking screen(s) 110C may be constructed of a plurality of tiles 110C(m,n) (m=1, . . . M; n=1, . . . N) each dynamically configurable to be in an opaque state or one or more at least partial transparency states to allow light emitted by the solidifying light source(s) 108AC to be projected on a selected surface in a specific projection pattern. The number and/or arrangement of the tiles 110C(m,n) constituting the light masking screen 110C may be selected, configured and/or positioned to effectively cover the entire nail surface(s) while supporting a fine, high resolution grid. As such, the light transferred by each of the limited range light sources 108AA(m,n) is projected on a respective substantially small and limited segment of the treated surface area, i.e., the nail surface(s).

The light masking screen(s) 110C may typically be implemented using a digital screen, for example, smart glass and/or the like constructed of a plurality of electrochromic cells (pixels) corresponding to the tiles. Each electrochromic cell may be dynamically configured to be fully opaque thus blocking the light emitted by the solidifying light source(s) 108AC from reaching the respective limited segment. Complementary each of the electrochromic cells may be dynamically configured to be at least partially transparent thus transferring to the respective limited segment at least some of the light emitted by the solidifying light source(s) 108AC. The electrochromic cells may be individually electrically controlled to individually set each electrochromic cell in the opaque state or in one or more of a plurality of transparency states which may allow controlling the amount of light emitted from the solidifying light source(s) 108AC to be projected on the respective limited segments. For example, the electrochromic cells may be electrically controlled by driving an electrical current to each of the electrochromic cells where the opaque/transparency state of each electrochromic cell is proportional to the electrical current level driven to the respective electrochromic cell. In another example, the electrochromic cells may be electrically controlled by exciting each of the electrochromic cells with an electrical voltage or potential where the opaque/transparency state of each electrochromic cell is proportional to the electrical voltage or potential level applied to the respective electrochromic cell.

As seen in FIG. 10C, the control unit 102 may analyze the sensory data captured by one or more imaging sensors such as the imaging sensor 104 to identify a nail surface 602 within a boundary of each of the nail surface(s) identified in the treatment space 130. The control unit 102 may then calculate instructions to operate a subset of the plurality of tiles 110C(m,n) to form a shape of at least partially transparent tiles which transfers a projection pattern such in which light emitted by the solidifying light source(s) 108AC is transferred and projected only within the boundary 602. The tiles 110C(m,n) corresponding to the area 604 outside the boundary of the nail surface are operated to be in the opaque state thus blocking the light emitted by the solidifying light source(s) 108AC from being transferred and projected on the areas outside the boundary. As result only the nail polish applied on the nail surface(s) 602 within the boundary(s) of the nail surface(s) is accurately solidified while the nail polish applied in areas 604 outside the boundary(s), for example, on the skin surrounding the nail surface(s) is not solidified.

As described herein before, the control unit 102 may optionally operate the actuator(s) 112 to adjust the location and/or the position of the light masking screen(s) 110C with respect to the identified nail surface(s).

The control unit 102 may further analyze the sensory data captured by the imaging sensor(s) 104 during the solidification process to estimate a drying state of the nail polish applied on the nail surface(s). Based on the estimated drying state, in particular in case the nail polish is not sufficiently solidified (dry), the control unit 102 may further operate the subset of tiles 110C(m,n) to further project light on at least part of the nail surface(s) 602.

Moreover, based on the analysis of the sensory data captured during the solidification process, the control unit 102 may detect movement of the finger(s) in the nail polish applying space 130 which may naturally lead to movement of the nail surface(s). The control unit 102 may identify the new location and/or position of the nail surface(s) and may operate the solidifying light array 108AA, specifically select an adjusted subset of the tiles 110C(m,n) to accurately project light on the nail surface(s) 602 in their newly detected location and/or position.

According to some embodiments of the present invention, the nail polish applying element 106 may be operated in conjunction with one or more of the drying elements, in particular with one or more of the solidifying light sources 108A to accurately solidify the nail polish applied only with in the boundary of the nail surface(s).

Reference is now made to FIG. 11A and FIG. 11B, which are schematic illustrations of an exemplary nail surface applied with light projected by a solidifying light source deployed in a nail polish applying and solidifying apparatus on a borderline of a boundary of the nail surface while nail polish is applied on the nail surface, according to some embodiments of the present invention. One or more solidifying light sources such as the solidifying light source 108A may be used in conjunction with one or more nail polish applying elements such as the nail polish applying element 106 for accurately solidifying nail polish, for example, nail polish fluid (in liquid form) applied only within the boundary of one or more nail surfaces identified in a treatment space such as the treatment space 130 of a nail polish applying and solidifying apparatus such as the nail polish applying and solidifying apparatus 100A.

As seen in FIG. 11A, a control unit such as the control unit 102 may analyze the sensory data captured by one or more imaging sensors such as the imaging sensor 104 to identify a borderline 1102 confining a nail surface boundary 602 of each of the nail surface(s) identified in the treatment space 130. The control unit 102 may calculate instructions to operate one or more of the solidifying light source 108A to project light only on a fine line at the boundary 1102. For example, the control unit 102 may operate a subset of the limited range light sources 108AA(m,n) of one or more of the solidifying light arrays 108AA such that the light emitted by the subset of the limited range light sources 108AA(m,n) is projected only on the borderline 1102 surface area. In another example, the control unit 102 may operate one or more of the wide angle solidifying light source 108AC in conjunction with a subset of the tiles 110C(m,n) of one or more of the light masking screens 110C such that the light emitted from the solidifying light source(s) 108AC is projected only on the borderline 1102 surface area.

While the light is projected on the borderline 1102, the control unit 102 may calculate instructions to operate one or more of the nail polish applying elements 106 to apply the nail polish fluid on the nail surface 602 confined by the borderline 1102. In particular, the control unit 102 may operate the one or more of the nail polish applying elements 106 to crudely apply the nail polish fluid on the nail surface(s) only within the borderline(s) 1102.

For example, the control unit 102 may operate one or more of the dispensing nail polish applying elements 106A to dispense the nail polish, specifically nail polish fluid at the center of the nail surface(s) 602 such that, due to the gravity force, the nail polish fluid disseminates over the nail surface(s) area 602 within the boundary confined by the borderline 1102. When the disseminating nail polish fluid reaches the borderline 1102, it may be solidified by the light projected on the borderline 1102 area thus preventing the nail polish fluid from further disseminating beyond the borderline 1102 and on to the areas outside the borderline 1102, for example, the skin surrounding the nail surface(s).

In another example, the control unit 102 may operate one or more of the dispensing nail polish applying elements 106A to dispense the nail polish fluid and one or more of the air blowing nail polish applying elements 106C to further spread the nail polish fluid over the nail surface(s) 602. The nail polish applying element 106C may disseminate the nail polish fluid over the nail surface(s) area 602 within the boundary confined by the borderline 1102. However, when the disseminating nail polish fluid reaches the borderline 1102, it may be solidified by the light projected on the borderline 1102 area thus preventing the nail polish fluid from further disseminating beyond the borderline 1102 and on to the areas outside the borderline 1102, for example, the skin surrounding the nail surface(s). Moreover, the control unit 102 may operate the actuator(s) 112 to prevent the nail polish applying element 106C from entering a predefined range from the borderline 1102 to prevent blowing nail polish fluid over the lighted borderline 1102.

As seen in FIG. 11B, after the nail polish fluid is applied on the nail surface(s) area 602 within the boundary confined by the borderline 1102, the control unit 102 may operate one or more of the solidifying light sources 108A to project light on the nail surface(s) area 602 to solidify the applied nail polish fluid.

According to some embodiments of the present invention, the solidifying energy sources employed by the nail polish applying and solidifying apparatus 100 to solidify nail polish applied on the nail surface(s) may include one or more air blowers configured and/or operated to blow air to solidify the nail polish. Optionally, one or more of the air blower(s) may be shaped, configured and/or adapted to blow air over a substantially small and limited size segment of the treated surface area in order to support accurate solidification of nail polish applied only within the boundary of the nail surface(s) while avoiding projecting solidifying light on the surrounding skin.

Figure 2B:
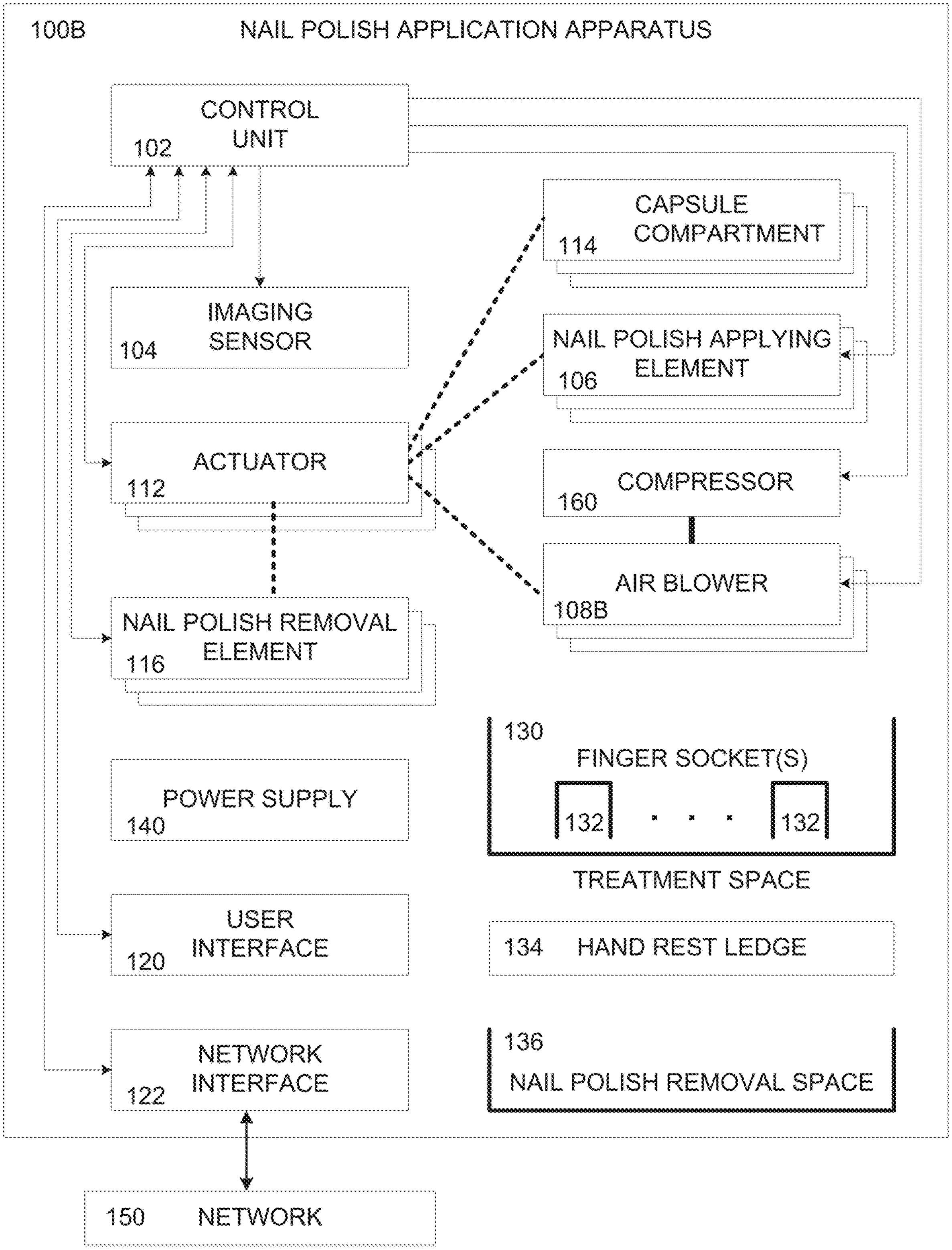

Reference is now made to FIG. 2B, which is a schematic illustrations of an exemplary embodiment 100B of a nail polish applying and solidifying apparatus such as the nail polish applying and solidifying apparatus 100 for applying and solidifying nail polish on nail surface(s) of a user, according to some embodiments of the present invention. The nail polish applying and solidifying apparatus 100B may employ one or more air blower 108B configured and/or operated to blow air optionally heated to solidify the nail polish crudely applied on the nail surface of on one or more fingers placed in a treatment space such as the treatment space 130, in particular finger(s) placed in one or more finger sockets such as the finger socket 132.

Each of the air blower(s) 108B may be connected to a compressor 150 via an air tube conveying compressed air from the compressor 150 to the air blower(s) 108B.

Reference is also made to FIG. 12A and FIG. 12B, which are schematic illustrations of an exemplary air blower such as the air blower 108B deployed in a nail polish applying and solidifying apparatus such as the nail polish applying and solidifying apparatus 100B, according to some embodiments of the present invention.

The control unit 102 may calculate instructions to operate the air blower 108B to blow air over the nail surface(s) to solidify the nail polish applied on them. The air blower(s) 108B may be connected to a compressor such as the compressor 160 via an air tube conveying compressed air from the compressor 160 to the air blower(s) 108B.

While one or more of the air blower(s) 108B may be statically fixed in the nail polish applying and solidifying apparatus 100, specifically to blow air on nail surface(s) of finger(s) identified in a treatment space such as the treatment space 130, one or more of the air blower(s) 108B may be dynamically moveable.

As seen in FIG. 12A, the air blower 108B may be mechanically coupled to a mounting element 402J which is moveable across the treatment space 130 by one or more actuators such as the actuator 112 operated by a control unit such as the control unit 102 as described for the nail polish applying element 106.

Optionally, the tip of the air blower(s) 108B may be shaped, configured and/or adapted to blow air over a substantially small and limited size segment of the treated surface area in order to support accurate solidification of nail polish fluid only within the boundary(s) of the nail surface(s).

As seen in FIG. 12B, the control unit 102 may analyze the sensory data captured by one or more imaging sensors such as the imaging sensor 104 to identify a nail surface 602 within a boundary of each of the nail surface(s) identified in the treatment space 130. The control unit 102 may then calculate instructions to operate the actuator(s) 112 to move the air blower(s) 108B over the nail surface(s) 602 only within the identified boundary(s). The control unit 102 may operate the actuator(s) 112 to set a predefined movement speed of the air blower(s) 108B across the nail surface(s) which is determined to be sufficient for solidifying the nail polish applied on the respective limited size segment currently blown with air from the air blower(s) 108B.

The control unit 102 may further analyze the sensory data captured by the imaging sensor(s) 104 during the solidification process to estimate the drying state of the nail polish applied on the nail surface(s). Based on the estimated drying state, in particular in case the nail polish is not sufficiently solidified (dry), the control unit 102 may further operate the air blower(s) 108B to blow air on the nail surface(s) 602 at locations identified to be insufficiently solidified.

Moreover, based on the analysis of the sensory data captured during the solidification process, the control unit 102 may detect movement of the finger(s) in the nail polish applying space 130 which may naturally lead to movement of the nail surface(s). The control unit 102 may identify the new location and/or position of the nail surface(s) and may operate the air blower(s) 108B to accurately move over the nail surface(s) 602 within the boundary(s) in the newly detected location and/or position. As such the nail polish applied outside the boundary(s), for example, on the skin surrounding the nail surface(s) is not solidified.

Optionally, the nail polish applying and solidifying apparatus 100, for example, the nail polish applying and solidifying apparatuses 100A and 100B may utilize the air blower(s) 108B as the air blowing nail polish applying element 106C as described herein before. In such case the control unit 102 may operate the air blower(s) 108B to blow air at one or more different temperatures. For example, when the air blower(s) 108B is operated as the air blowing nail polish applying element 106C for spreading the nail polish over the nail surface(s) the control unit 102 may operate the air blower(s) 108B to blow air at a first temperature, for example, room temperature or lower to prevent the blown air from solidifying the nail polish. However, when the air blower(s) 108B is operated to solidify the nail polish applied on the nail surface(s) the control unit 102 may operate the air blower(s) 108B to blow air at a second temperature, for example, heated air to more efficiently and/or rapidly solidify the nail polish. Naturally, the second temperature may be higher than the first temperature.

According to some embodiments of the present invention, the solidifying energy sources employed by the nail polish applying and solidifying apparatus 100 to solidify nail polish applied on the nail surface(s) may include one or more thermally reactive substance applying elements configured to apply one or more thermally reactive substances to solidify the nail polish. Optionally, the thermally reactive substance applying element(s) may be shaped, configured and/or operated to accurately apply the thermally reactive substance(s) over a substantially small and limited size segment of the treated surface area in order to support accurate solidification of nail polish applied only within the boundary of the nail surface(s) while avoiding solidification of the nail polish residues on the surrounding skin.

Figure 2C:
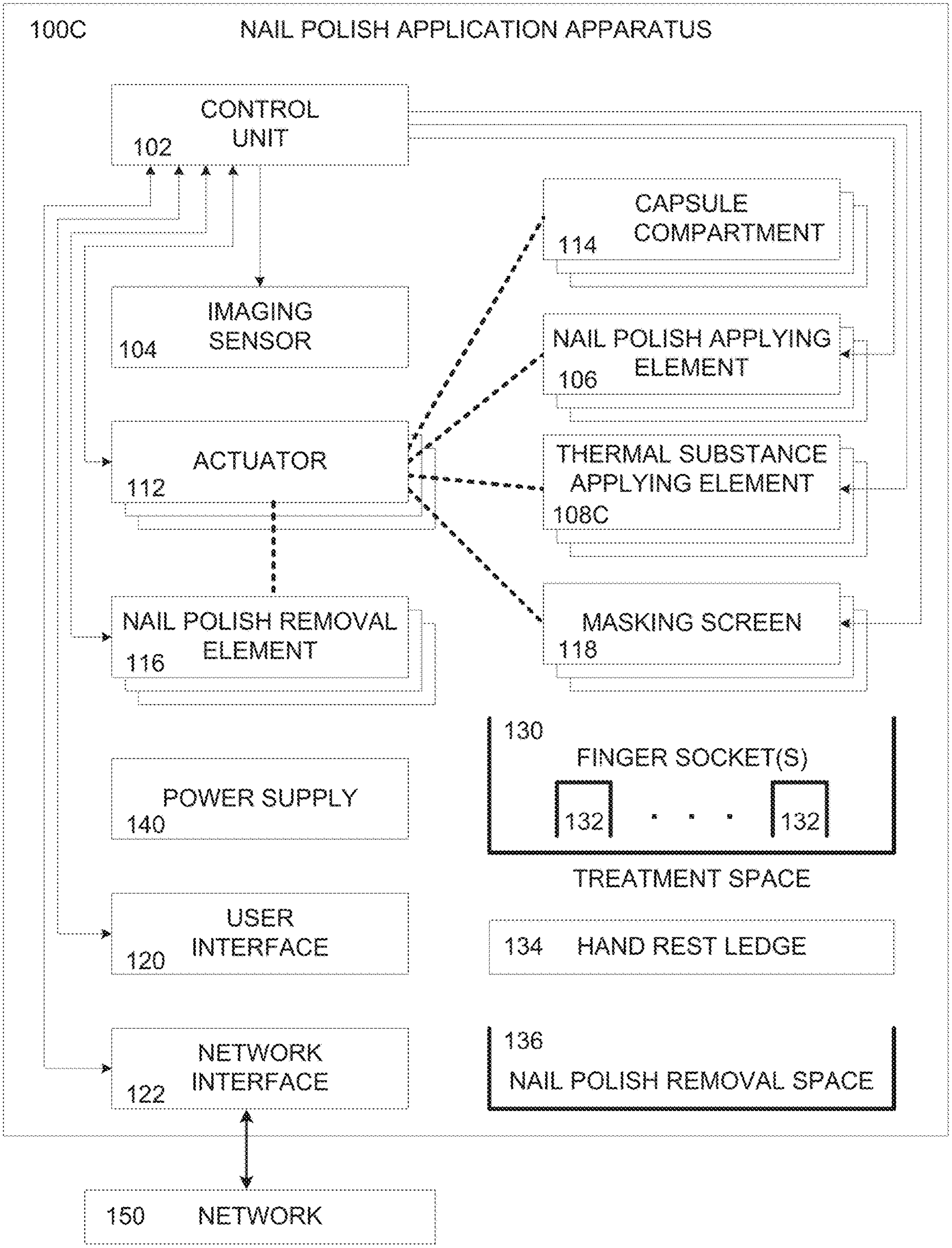

Reference is now made to FIG. 2C, which is a schematic illustrations of an exemplary embodiment 100C of a nail polish applying and solidifying apparatus such as the nail polish applying and solidifying apparatus 100 for applying and solidifying nail polish on nail surface(s) of a user, according to some embodiments of the present invention. The nail polish applying and solidifying apparatus 100C may employ one or more thermally reactive substance applying elements 108C shaped, configured and/or operated to apply, optionally accurately, one or more thermally reactive substances to solidify the nail polish crudely applied on the nail surface of on one or more fingers placed in a treatment space such as the treatment space 130, in particular finger(s) placed in one or more finger sockets such as the finger socket 132.

The thermally reactive substance applying element 108C may be constructed, shaped and/or configured substantially similarly to the nail polish applying element 106 to apply the thermally reactive substances(s) on the nail surface(s). As such the thermally reactive substance applying element 108C may be operated by the control unit 102 based on the analysis of the sensory data captured by the imaging sensor(s) 104 during which the control unit 102 may identify the nail surface of one or more fingers detected in the treatment space 130, specifically in the finger socket(s) 132. As described for the nail polish applying element 106, the thermally reactive substance applying element 108C may be moved through the treatment space 130 by one or more of the actuators 112 of the nail polish applying and solidifying apparatus 100 operated by the control unit 102. The nail polish applying element 106 may be mechanically attached and/or coupled to the actuator(s) 112 though one or more mounting elements such as the mounting element 402 serving as a fixture configured to mechanically couple the thermally reactive substance applying element 108C to the actuator(s) 112. As such, the control unit 102 may operate the actuator(s) 112 to move the thermally reactive substance applying element 108C in a longitudinal axis crossing the treatment space 130, in a lateral axis perpendicular to the longitudinal axis, rotate the thermally reactive substance applying element 108C around the longitudinal axis and/or perpendicularly to the identified nail polish surface(s). The actuator(s) 112 may be further adjust the pitch of the thermally reactive substance applying element 108C with respect to the identified nail surface(s) in order to adjust an attack angle of the thermally reactive substance applying element 108C with respect to the nail surface(s).

Optionally, unlike the nail polish applying element 106, the thermally reactive substance applying element 108C may be shaped, configured and/or operated by the control unit 102 to accurately apply the thermally reactive substance on the nail surface(s) only with the boundary(s) of the nail surface(s) as identified based on analysis of the sensory data captured by the imaging sensor(s) 104.

The thermal reactive substance(s) may be configured, selected and/or otherwise adapted to produce heat (exothermic) reaction, for example, produce heat and/or absorb heat on interaction with the nail polish.

As stated, the thermally reactive substance applying element 108C may be operated to accurately apply the thermally reactive substance only within the boundary of the nail surface(s) while avoiding application of the thermally reactive substance outside the boundary(s), specifically on the surrounding skin. Therefore, interaction between the thermally reactive substance and the nail polish occurs only within the boundary(s) thus solidifying only the nail polish applied within the boundary(s) while the nail polish residues applied on the surrounding skin do not solidify.

Optionally, the thermally reactive substance applying element 108C is shaped, configured and/or operated by the control unit 102 in conjunction with one or more masking screens 118. The masking screen(s) 118 may be configured to mask one or more areas outside the boundary(s) of the nail surface(s), specifically the surrounding skin while the thermally reactive substance applying element 108C is or operated to apply the thermally reactive substance within the boundary(s). Deploying the masking screen(s) 118 may therefore prevent application of the thermally reactive substance on the surrounding skin thus preventing solidification of the nail polish residues applied on the surrounding skin.

The masking screen(s) 118 may be shaped to fit one or more of the nail surface(s). The masking screen(s) 118 may be further coupled to one or more mounting elements such as the mounting element 402 connected to one or more of the actuators 112 such that the control unit 102 may operate the actuator(s) 112, based on the analysis of the sensory data captured by the imaging sensor(s) 104, to move the masking screen(s) 118 with respect to the nail surface(s) detected in the treatment space 130. Optionally, one or more of the masking screen(s) 118 may include a dynamically adjustable opening which may be dynamically adjusted by the control unit 102, based on the analysis of the sensory data captured by the imaging sensor(s) 104, to fit one or more of the nail surface(s).

According to some embodiments of the present invention, the solidifying energy sources employed by the nail polish applying and solidifying apparatus 100 to solidify nail polish applied on the nail surface(s) may include one or more second nail polish applying elements configured to apply a second component of nail polish which is solidified on mixture with a first component of the nail polish. In particular, the control unit 102 may operate the nail polish applying element 106 to apply the first component of the nail polish on the nail surface of one or more of the fingers and may further operate the second nail polish applying element(s) to apply the second component only on the nail surface(s).

Optionally, the second nail polish applying element(s) may be shaped, configured and/or operated to accurately apply the nail polish second component over a substantially small and limited size segment of the treated surface area in order to support accurate solidification of the nail polish applied only within the boundary of the nail surface(s) while avoiding application of the second component on the surrounding skin. As such the nail polish may solidify to form solid nail polish only on the nail surface(s) within the boundary(s) where both the first and second components are applied and mix.

Optionally, one or more of the second nail polish applying element(s) are utilized by one or more of the nail polish applying element(s) 106 of the nail polish application and solidification apparatus 100. In such case, the nail polish applying element(s) 106 may be first operated to apply the first component of the nail polish and followed by the control unit 102 operating the same nail polish applying element(s) 106 to apply the second nail polish component.

In such implementations, the first nail polish component and the second nail polish component may be stored separately. For example, the first nail polish component and the second nail polish component may be stored in separate containers of the nail polish application and solidification apparatus 100 such that the control unit 102 may operate the nail polish applying element(s) 106 to retrieve the first and second nail polish components from their respective containers, for example, dip the dispensing head in the respective containers. In another the first and second nail polish components may be provided and stored in separate capsules such as the capsule 500, in particular two-part capsules such as the capsule 500A such that a first container such as the container 502A contains the first nail polish component and a second container such as the container 502A contains the second nail polish component. The control unit 102 may operate the nail polish applying element(s) 106 to retrieve the first and second nail polish components from their respective containers 502A, for example, dip the dispensing head in the respective containers 502A which may be stored in one or more capsule compartments such as the capsule compartment 114.

Figure 2D:
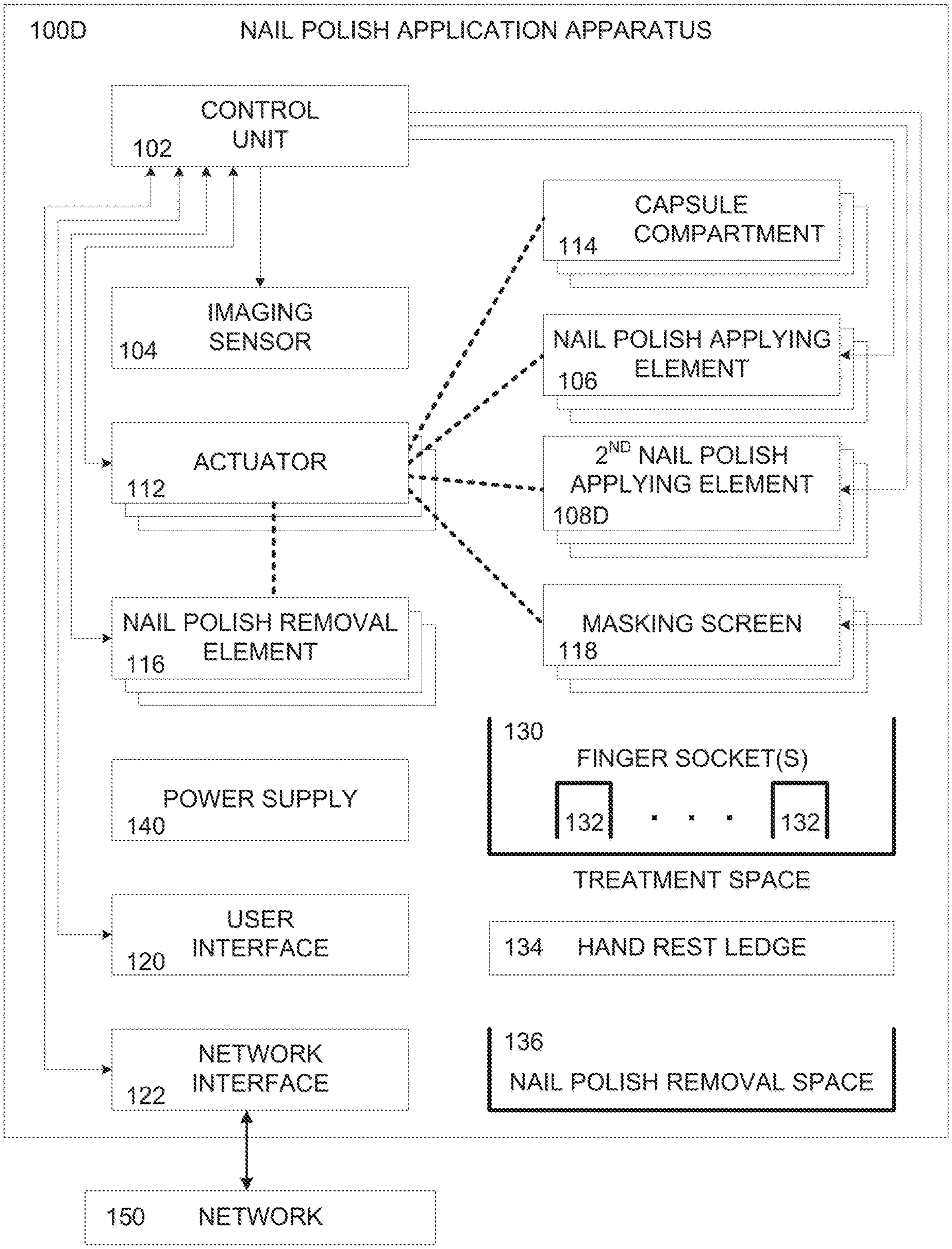

Reference is now made to FIG. 2D, which is a schematic illustrations of an exemplary embodiment 100D of a nail polish applying and solidifying apparatus such as the nail polish applying and solidifying apparatus 100 for applying and solidifying nail polish on nail surface(s) of a user, according to some embodiments of the present invention. The nail polish applying and solidifying apparatus 100D may employ one or more second ($2^{nd}$) nail polish applying elements 108D configured and/or operated to apply a second component of nail polish which is solidified on mixture with a first component of the nail polish crudely applied on the nail surface of on one or more fingers using the nail polish applying element(s) 106.

Optionally, the second nail polish applying elements 108D is shaped, configured and/or operated to accurately apply the second component of the nail polish over a substantially small and limited size segment of the treated surface area in order to support accurate solidification of nail polish applied only within the boundary of the nail surface(s) while avoiding solidification of the nail polish residues on the surrounding skin.

The second nail polish applying elements 108D may be constructed, shaped and/or configured substantially similarly to the nail polish applying element 106. As such the second nail polish applying elements 108D may be operated by the control unit based on the analysis of the sensory data captured by the imaging sensor(s) 104 during which the control unit 102 may identify the nail surface of one or more fingers detected in the treatment space 130, specifically in the finger socket(s) 132. As described for the nail polish applying element 106, the second nail polish applying elements 108D may be moved through the treatment space 130 by one or more of the actuators 112 of the nail polish applying and solidifying apparatus 100 operated by the control unit 102. The nail polish applying element 106 may be mechanically attached and/or coupled to the actuator(s) 112 though one or more mounting elements such as the mounting element 402 serving as a fixture configured to mechanically couple the second nail polish applying elements 108D to the actuator(s) 112. As such, the control unit 102 may operate the actuator(s) 112 to move the second nail polish applying elements 108D in a longitudinal axis crossing the treatment space 130, in a lateral axis perpendicular to the longitudinal axis, rotate the second nail polish applying elements 108D around the longitudinal axis and/or perpendicularly to the identified nail polish surface(s). The actuator(s) 112 may be further adjust the pitch of the second nail polish applying elements 108D with respect to the identified nail surface(s) in order to adjust an attack angle of the second nail polish applying elements 108D with respect to the nail surface(s).

However, unlike the nail polish applying element 106, the second nail polish applying elements 108D may be shaped, configured and/or operated by the control unit 102 to accurately apply the second component of the nail polish on the nail surface(s) only with the boundary(s) of the nail surface(s) as identified based on analysis of the sensory data captured by the imaging sensor(s) 104.

The nail polish may solidify to form a solid nail polish on mixture of the first component and second component. The first and second nail polish components may include resins which may react (cross-link) with themselves commonly referred to as curing. However, the first component may be a nail polish configured to solidify on reaction with one or more co-reactants serving as the second component commonly referred to as hardeners or curatives. Such material compounds may include, for example, two-component epoxy resins, a photo-initiator separated from a monomer to be polymerized, a photo-initiator separated from an oligomer to be polymerized and/or the like.

As stated, the second nail polish applying elements 108 is operated to accurately apply the second component only within the boundary of the nail surface(s) while avoiding application of the second component outside the boundary(s), specifically on the surrounding skin. Therefore, the first and second components of the nail polish may mix only within the boundary(s) thus the nail polish may solidify only within the boundary(s) while the nail polish residues applied on the surrounding skin do not solidify.

Optionally, as described herein before, one or more of the second nail polish applying element(s) 108D may be utilized by one or more of the nail polish applying element(s) 106 of the nail polish application and solidification apparatus 100. In such case, the nail polish applying element(s) 106 may be first operated to apply the first component of the nail polish and followed by the control unit 102 operating the same nail polish applying element(s) 106 to apply the second nail polish component.

Optionally, the second nail polish applying elements 108D is shaped, configured and/or operated by the control unit 102 in conjunction with one or more of the masking screens 118 as described for the thermally reactive substance applying element 108C. as such, the second nail polish applying elements may be operated in conjunction with the masking screen(s) 118 to apply the second nail polish component only within the boundary(s) while preventing application of the second nail polish component on the surrounding skin thus forming the solid nail polish only within the boundary(s).

After the nail polish applied on the nail surface(s) is solidified by the solidifying energy source(s) 108, residues of the nail polish which was crudely applied may be present on the areas outside the boundary of the nail surface(s), specifically on the skin surrounding the nail surface(s). As described herein before, these nail polish residues applied on the surrounding skin may be solidified if no accurate solidification is applied. However, in case accurate solidification is applied using one or more of the solidification energy sources 108 configured to solidify only the nail polish within the boundary of the nail surface(s), the nail polish residues applied on the surrounding skin are not solidified, for example, remain in the liquid state and may be removed fairly easily.

The nail polish residues present on the surrounding skin outside the boundary(s) of the nail surface(s) may be removed automatically using one or more of the nail polish removal elements 116 of the nail polish applying and solidifying apparatus 100. In particular, the nail polish removal element(s) 116 may be shaped, configured and/or operated to accurately remove the nail polish residues which may be at least partially solidified or not from the surrounding skin while not removing, damaging, touching and/or otherwise affecting the nail polish applied and solidified on the nail surface(s) within their boundary(s).

One or more of the nail polish removal elements 116 may be configured, located and adapted to remove the nail polish residues from the surrounding skin areas in the treatment space 130 while the finger(s) of the user are placed in the treatment space 130, specifically in the finger socket(s) 132. However, optionally, the nail polish applying and solidifying apparatus 100 includes a nail polish removal space 136 such that one or more of the nail polish removal elements 116 may be deployed, located, configured and/or adapted to remove the nail polish residues in the nail polish removal space 136 after the user places his finger(s) in the nail polish removal space 136. Optionally, the nail polish removal space 136 includes one or more nail polish removal sockets such as the finger sockets 132 in which the user may place his finger(s) during the nail polish residues removal.

The control unit 102 analyzing the sensory data received from one or more of the imaging sensor(s) 104 may identify the finger(s) placed in the treatment area 130, specifically areas outside the boundary of the nail surface(s) targeted for the nail polish application. The control unit 102 may further construct a 3D surface of the surrounding skin based on the sensory data received from the imaging sensor(s). The control unit 102 may further analyze the sensory data to identify one or more attributes, characteristics and/or parameters of the surrounding skin, for example, curvatures, coloration and/or the like.

Based on the analysis of the sensory data captured by the imaging sensor(s) 104 deployed to depict the treatment space 130 and/or the polish removal space 136, the control unit 102 may identify nail polish residues applied and/or spread on one or more areas outside the boundary of the nail surface(s), specifically nail polish residues applied and/or spread on the skin surrounding the nail surface(s).

The control unit 102 may then operate one or more of the nail polish removal element(s) 116 to accurately remove the nail polish residues identified on the surrounding skin areas.

The nail polish removal element(s) 116 may be constructed, configured and/or operated using one or more constructions and/or nail polish removal techniques. For example, one or more of the nail polish removal element(s) 116 may employ mechanical means. In another example, one or more of the nail polish removal element(s) 116 may use one or more solvent materials to remove the nail polish from the surrounding skin.

The nail polish removal element(s) 116 may be operated by the control unit 102 based on the analysis of the sensory data captured by the imaging sensor(s) 104 during which the control unit 102 may identify nail polish residues present on the surrounding skin area(s) of one or more of the fingers detected in the treatment space 130 and/or the nail polish removal space 136, specifically in the finger socket(s) 132. As described for the nail polish applying element 106, the nail polish removal element(s) 116 may be moved through the treatment space 130 and/or the nail polish removal space 136 by one or more of the actuators 112 of the nail polish applying and solidifying apparatus 100 operated by the control unit 102. The nail polish removal element(s) 116 may be mechanically attached and/or coupled to the actuator(s) 112 though one or more mounting elements such as the mounting element 402 serving as a fixture configured to mechanically couple the nail polish removal element(s) 116 to the actuator(s) 112. As such, the control unit 102 may operate the actuator(s) 112 to move the nail polish removal element(s) 116 in a longitudinal axis crossing the treatment space 130 and/or the nail polish removal space 136, in a lateral axis perpendicular to the longitudinal axis, rotate the nail polish removal element(s) 116 around the longitudinal axis and/or perpendicularly to the identified skin surface(s). The actuator(s) 112 may be further adjust the pitch of the nail polish removal element(s) 116 with respect to the identified skin surface(s) in order to adjust an attack angle of the nail polish removal element(s) 116 with respect to the skin surface(s).

Reference is now made to FIG. 13A and FIG. 13B, which are schematic illustrations of an exemplary mechanical nail polish removal element 116A such as the nail polish removal element 116 of a nail polish applying and solidifying apparatus such as the nail polish applying and solidifying apparatus 100, according to some embodiments of the present invention.

As seen in FIG. 13A, the nail polish removal element 116A may be mechanically coupled to a mounting element 402K which is moveable across a treatment space such as the treatment space 130 and/or a nail polish removal space such as the nail polish removal space 136 by one or more actuators such as the actuator 112 operated by a control unit such as the control unit 102 as described for the nail polish applying element 106.

The nail polish removal element 116A may be constructed to include a sharpened end which may by operated by the control unit 102 to remove nail polish residues identified on the skin through one or more abrasion operations, for example, scarping, scratching, sanding, peeling, grinding and/or the like.

As seen in FIG. 13B, the control unit 102 may analyze the sensory data captured by one or more imaging sensors such as the imaging sensor 104 to identify a nail surface such as the nail surface 602 within the boundary of each nail surface identified in the treatment space 130 and/or the nail polish removal space 136. The control unit 102 may further analyze the sensory data to identify nail polish residues on one or more areas outside the boundary of the identified nail surface(s), specifically on skin 1302 surrounding the nail surface(s).

The control unit 102 may then calculate instructions to operate the actuator(s) 112 to move the nail polish removal element 116A to abrade the soiled surrounding skin 1302 outside the identified boundary(s).

The control unit 102 may further analyze the sensory data captured by the imaging sensor(s) 104 during and/or after operating the nail polish removal element 116A in order to evaluate whether the surrounding skin 1302 is clean. Based on the evaluation, the control unit 102 may further operate the nail polish removal element 116A to further abrade the soiled surrounding skin 1302 in attempt to remove remaining nail polish residues and clean the surrounding skin 1302.

Moreover, based on the analysis of the sensory data captured during the nail polish residues removal process, the control unit 102 may detect movement of the finger(s) in the nail polish applying space 130 and/or the nail polish removal space 136. The control unit 102 may identify the new location and/or position of the nail surface(s) and the new location and/or position of the surrounding skin 1302 and may operate the nail polish removal element 116A accordingly to accurately abrade the surrounding skin 1302.

Reference is now made to FIG. 14A and FIG. 14B, which are schematic illustrations of an exemplary mechanical nail polish removal element 116B such as the nail polish removal element 116 of a nail polish applying and solidifying apparatus such as the nail polish applying and solidifying apparatus 100 utilizing removal substance to remove nail polish, according to some embodiments of the present invention.

As seen in FIG. 14A, the nail polish removal element 116B may be mechanically coupled to a mounting element 402L which is moveable across a treatment space such as the treatment space 130 and/or a nail polish removal space such as the nail polish removal space 136 by one or more actuators such as the actuator 112 operated by a control unit such as the control unit 102 as described for the nail polish applying element 106.

The nail polish removal element 116B may be constructed, configured and operated to remove nail polish residues identified on the skin using one or more nail polish removal substances and/or materials, for example, acetone and/or the like configured to remove the nail polish through one or more chemical reactions, for example, de-polymerization, random chain scissoring, side group elimination, oxidation, solvent reaction and/or the like. The nail polish removal element 116B may be therefore constructed similarly to the nail polish applying element 106 comprising a tipped head, for example, a sponge, hair strands, elastic tube(s), solid pipe(s) and/or the like infused with one or more nail polish removal materials, for example, a solvent such as, for example, acetone and/or the like.

As seen in FIG. 14B, the control unit 102 may analyze the sensory data captured by one or more imaging sensors such as the imaging sensor 104 to identify a nail surface such as the nail surface 602 within the boundary of each nail surface identified in the treatment space 130 and/or the nail polish removal space 136. The control unit 102 may further analyze the sensory data to identify nail polish residues on one or more areas outside the boundary of the identified nail surface(s), specifically on skin surrounding the nail surface(s) such as the surrounding skin 1302.

The control unit 102 may then calculate instructions to operate the actuator(s) 112 to move the nail polish removal element 116A to wipe, brush, swab and/or otherwise wash the soiled surrounding skin 1302 outside the identified boundary(s).

The control unit 102 may further analyze the sensory data captured by the imaging sensor(s) 104 during and/or after operating the nail polish removal element 116B in order to evaluate whether the surrounding skin 1302 is clean. Based on the evaluation, the control unit 102 may further operate the nail polish removal element 116B to further wash the soiled surrounding skin 1302 in attempt to remove remaining nail polish residues and clean the surrounding skin 1302.

Moreover, based on the analysis of the sensory data captured during the nail polish residues removal process, the control unit 102 may detect movement of the finger(s) in the nail polish applying space 130 and/or the nail polish removal space 136. The control unit 102 may identify the new location and/or position of the nail surface(s) and the new location and/or position of the surrounding skin 1302 and may operate the nail polish removal element 116B accordingly to accurately wash the surrounding skin 1302.

The nail polish removal material(s), for example, the solvent may be stored in one or more containers of the nail polish applying and solidifying apparatus 100. The nail polish removal element 116B may be operated by the control unit 102 to occasionally dip the tipped head of the nail polish removal element 116B in the nail polish removal material container to infuse it with the nail polish removal material, for example, acetone and/or the like.

Optionally, the nail polish removal material, for example, the solvent is contained in one or more disposable capsules such as the capsule 500. For example, the disposable capsule may be constructed as the two-part capsule 500A having the container (body portion) containing the nail polish removal material and a detachable nail polish removal element of the nail polish removal element 116B configured for removing the nail polish residues. In another example, the disposable capsule may be constructed as the integrated nail polish capsules 500B constructed of the body portion 502B containing the nail polish removal material and an integrated nail polish removal element of the nail polish removal element 116B configured for removing the nail polish residues.

Reference is now made to FIG. 15A and FIG. 15B, which are schematic illustration of exemplary nail polish removal elements such as the nail polish removal elements 116 of a nail polish applying and solidifying apparatus such as the nail polish applying and solidifying apparatus 100, according to some embodiments of the present invention.

As seen in FIG. 15A, a nail polish removal elements 116C such as the nail polish removal element 116 may be constructed to include a housing shaped to host, for example, a hollow cylinder shaped sponge to receive and accommodate at least a tip of one or more fingers of the user, in particular the finger section comprising the skin areas surrounding the nail surface. The user may place one or more of his fingers, in particular his fingertip comprising the nail surface into the hollow cylinder shaped sponge which may be infused with the nail polish removal solvent(s). Optionally, a control unit such as the control unit 102 may operate one or more actuators such as the actuator 112 to spin the nail polish removal elements 116C such that the cylinder shaped sponge spins around the fingertip and cleans the nail polish residues from the skin surrounding the nail surface(s).

As seen in FIG. 15B, a nail polish removal elements 116D such as the nail polish removal elements 116 may be constructed to include a spinning element on which the cylinder shaped sponge, for example, may be placed. The control unit 102 may operate the actuator(s) 112 to spin the spinning element of the nail polish removal elements 116D such that the cylinder shaped sponge spins around the axis of the spinning element. The user may place his fingertip, in particular the skin surrounding the nail surface(s) against the spinning cylinder shaped sponge which may clean and/or remove nail polish fluid residues from the skin. Optionally, the hollow cylinder sponge is disposable and may be replaced after one or more nail polish removal sessions. The disposable hollow cylinder sponge may be removed from the housing of the nail polish removal elements 116D and replaced with a new disposable hollow cylinder sponge.

According to some embodiments of the present invention, the nail polish applying and solidifying apparatus may include and/or apply one or more shielding elements to shield one or more of the nail surfaces while operating the nail polish removal element(s) 116 to remove nail polish residues from the skin 1302 surrounding the nail surface(s). One or more of the shielding element(s) may be configured to locally shield the nail surface(s) and/or part thereof which is in proximity to the nail polish removal element(s) 116 at any given time. However, one or more of the shielding element(s) may be configured to shield the entire nail surface(s) during the entire operation time of the nail polish removal element(s) 116.

Reference is now made to FIG. 16, which are schematic illustrations of an exemplary mechanical nail polish removal element 116B such as the nail polish removal element 116 of a nail polish applying and solidifying apparatus such as the nail polish applying and solidifying apparatus 100 comprising a wall segment to protect a nail surface during removal of nail polish residues, according to some embodiments of the present invention. The wall segment embodiment is described herein for a nail polish removal element such as the nail polish removal element 116B. this however should not be construed as limiting since the wall segment may be applied for any other nail polish removal element 116, for example, the nail polish removal element 116A, 116C and/or 116D.

The nail polish removal element 116B may further include a wall segment 1602 constructed and configured to shield and protect at least part of a nail surface 602 within the boundary of the nail surface while the nail polish removal element 116B is operated to remove nail polish residues from areas outside the boundary, specifically skin surrounding the nail surface 602 such as the surrounding skin 1302. The wall segment 1602 may be constructed from one or more materials, for example, a metal foil, a polymeric material and/or the like. By shielding the nail surface 602, the wall segment 1602 protects the nail polish applied and solidified on the nail surface 602 against damage that may be inflicted by operation of the nail polish removal element 116B operated to remove the nail polish reside from the surrounding skin 1302 occasionally in close proximity to the nail surface 602.

The wall segment 1602 may be configured and typically connected to the nail polish removal element 116B such that it faces the nail surface 602 during the operation of the nail polish removal element 116B to remove the nail polish residues and thus shields the nail surface 602, specifically the nail polish applied and solidified on the nail surface 602. A control unit such as the control unit 102 may operate one or more actuators such as the actuator 112 to move the mounting element 402F and maneuver the nail polish removal element 116B with respect to the nail surface 602 and the surrounding skin 1302. As seen, while the nail polish removal element 116B is moved to remove the nail polish residues from the surrounding skin 1302, the wall segment 1602 is constantly facing the nail surface 602 thus preventing the nail polish removal element 116B from removing, damaging and/or otherwise affecting the nail polish applied on the nail surface 602.

Optionally, the nail polish applying and solidifying apparatus 100 comprises one or more wall segments such as the wall segment 1602 which are separate from the nail polish removal element 116B. Such wall segment(s) 1602 may be connected to one or more mounting elements such as the mounting element 402 coupled to one or more of the actuators 112 such that the control unit such as the control unit 102 may operate one or more of the actuator(s) 112 to move one or more of the wall segment(s) 1602 while operating the nail polish removal element 116B to shield the nail surface(s) 602 thus preventing the nail polish removal element 116B from removing, damaging and/or otherwise affecting the nail polish applied on the nail surface(s) 602.

Reference is now made to FIG. 17 is a schematic illustration of an exemplary protective screen of a nail polish applying and solidifying apparatus such as the nail polish applying and solidifying apparatus 100 comprising a shielding element configured to protect nail(s) applied with nail polish during nail polish residue removal, according to some embodiments of the present invention. The shielding element embodiment is described herein for a nail polish removal element such as the nail polish removal element 116B. this however should not be construed as limiting since the wall segment may be applied for any other nail polish removal element 116, for example, the nail polish removal element 116A, 116C and/or 116D.

The nail polish applying and solidifying apparatus 100 may optionally include one or more shielding elements 1702 shaped, configured and optionally operated to be deployed over one or more nail surfaces such as the nail surface 602 identified in a treatment space such as the treatment space 130 and/or a nail polish removal space such as the nail polish removal space 136. In particular, the shielding element(s) 1702 may be deployed on the nail surface(s) 602 before and while the control unit 102 operates the nail polish removal element 116B to remove nail polish residues from skin surrounding the nail surface(s) 602 such as the surrounding skin 1302. As such the nail surface(s) 602, specifically the nail polish applied on the nail surface(s) 602 is protected from damage by the nail polish removal element 116B while operated to remove nail polish residues from the surrounding skin 1302 which may be in close proximity to the nail surface(s) 602.

The shielding element(s) 1702 may be shaped to fit one or more of the nail surface(s). The shielding element(s) 1702 may be further coupled to one or more mounting elements such as the mounting element 402 connected to one or more of the actuators 112. A control unit such as the control unit 102 may operate the actuator(s) 112, based on the analysis of the sensory data captured by imaging sensor(s) such as the imaging sensor(s) 104, to move the shielding element(s) 1702 with respect to the nail surface(s) 602. Optionally, one or more of the shielding element(s) 1702 may be dynamically adjustable to fit one or more of the nail surface(s). For example, the control unit 102 may, based on the analysis of the sensory data captured by the imaging sensor(s) 104, adjust the shielding element(s) 1702 to fit one or more of the nail surface(s).

Optionally, the nail polish applying and solidifying apparatus 100, for example, the apparatus 100A, 100B, 100C and/or 100D is configured to apply one or more of the nail polish removal elements 116, for example, the nail polish removal elements 116A, 116B, 116C and/or 116D to remove previously applied nail polish from the nail surface of one or more fingers prior to application of the nail polish on the nail surface(s). Before starting the nail polish application process, the user may place one or more of his fingers in the treatment space 130 and/or the nail polish removal space 136 and the nail polish removal element(s) 116 may be operated to remove nail polish, in particular solidified nail polish which was previously applied on one or more of the nail surface(s) in past. The control unit 102 may analyze sensory data captured by one or more imaging sensors such as the imaging sensor 104 to identify the nail surface(s) in the treatment space 130 and/or the nail polish removal space 136 and further identify nail polish previously applied on one or more of the nail surface(s). The control unit 102 may then calculate instructions accordingly to operate the actuator(s) 112 to move the nail polish removal element(s) 116 to remove the previously applied nail polish from the nail surface(s).

Optionally, the nail polish applying and solidifying apparatus 100, for example, the apparatus 100A, 100B, 100C and/or 100D is configured for solidifying the nail polish and removing the nail polish residues after the nail polish is manually applied in a crude (inaccurate) manner on the nail surfaces of one or more of the user's fingers. In such embodiments of the nail polish applying and solidifying apparatus 100, the nail polish applying element 106 may be removed thus reducing design complexity and/or production complexity. This may significantly simplify and/or reduce cost of the cost of the nail polish applying and solidifying apparatus 100.

Optionally, the nail polish applying and solidifying apparatus 100, for example, the apparatus 100A, 100B, 100C and/or 100D is configured to apply one or more protective substances on skin surrounding one or more of the nail surface(s) such as the surrounding skin 1302 before operating the nail polish applying element(s) 106 to crudely apply the nail polish on the nail surface(s). The protective substance(s), for example, polyvinyl acetate (PVAc), polyvinyl alcohol (PVA), polystyrene, polyvinyl chloride (PVC) and/or the like, may be selected and/or configured to prevent nail polish which may be applied on the surrounding skin 1302 from adhering to the surrounding skin 1302.

The protective substances may be applied on the surrounding skin 1302 using one or more protective substance applying elements which may be constructed, shaped and/or configured substantially similarly to the nail polish applying element 106. As such the protective substance applying element(s) may be operated by the control unit 102 to apply the protective substance(s) on the surrounding skin 1302 identified by the control unit based on the analysis of the sensory data captured by the imaging sensor(s) 104. The protective substance applying element(s) may be moved through the treatment space 130 by one or more of the actuators 112 of the nail polish applying and solidifying apparatus 100 operated by the control unit 102. The protective substance applying element(s) may be mechanically attached and/or coupled to the actuator(s) 112 though one or more mounting elements such as the mounting element 402 serving as a fixture configured to mechanically couple the protective substance applying element(s) to the actuator(s) 112. The protective substance applying element(s) however, may be shaped, configured and/or operated by the control unit 102 to accurately apply the protective substance on the surrounding skin 1302 only outside the boundary(s) of the nail surface(s) as identified based on analysis of the sensory data captured by the imaging sensor(s) 104 while avoiding application of the protective substance within the boundary(s).

Since the nail polish residues applied on the surrounding skin 1302 during the crude application of the nail polish to the nail surface(s) does not adhere to the surrounding skin 1302, the nail polish residues may be easily removed, wiped and/or otherwise cleaned from the surrounding skin 1302. For example, one or more of the nail polish removal elements 116 may be operated to remove the nail polish resides from the surrounding skin 1302 as described herein before. Due to the fact that the nail polish residues applied on the surrounding skin 1302 is not firmly adhered to the surrounding skin 1302, the nail polish removal elements 116 may easily remove the nail polish residues.

The protective substance(s) may be stored in one or more containers of the nail polish applying and solidifying apparatus 100. The protective substance applying element(s) may be operated by the control unit 102 to occasionally dip its tipped head in the protective substance container to infuse it with the protective substance.

Optionally, the protective substance is contained in one or more disposable capsules such as the capsule 500. For example, the disposable capsule may be constructed as the two-part capsule 500A having the container (body portion) containing the nail polish removal material and a detachable nail polish removal element of the protective substance applying element configured for applying the protective substance. In another example, the disposable capsule may be constructed as the integrated nail polish capsules 500B constructed of the body portion 502B containing the nail polish removal material and an integrated nail polish removal element of the protective substance applying element configured for applying the protective substance.

Optionally, the nail polish applying and solidifying apparatus 100, for example, the apparatus 100A, 100B, 100C and/or 100D includes a user interface 120 operated by the control unit 102 for interacting with one or more users using the nail polish applying and solidifying apparatus 100. The user interface 120 may provide one or more indications to present operational states, status and/or indications relating to the nail polish applying and solidifying apparatus 100 and/or to the nail polish application, solidification and cleaning session process. The status indications may include, for example, ON/OFF indication, a malfunction indication, a capsule proper/improper positioning indication, type of the nail polish (e.g. base, top, polish, gel, etc.), color of the nail polish, a progress status of the nail polish application and solidification session and/or the like. The user interface 120 may provide the indications via one or more indication lights, for example, an ON/OFF indication light, a malfunction indication light, a status indication light and/or the like. The user interface 120 may also support interaction with the user via one or more control switches, for example, a button, a switch, a lever and/or the like, for example, an ON/OFF button, a reset button, a mode selection dial and/or the like. The user interface 120 may further include a display, for example, a Liquid Crystal Display (LCD) and/or the like allowing the control unit 102 to present information to the user, for example, status information, progress of the nail polish application session and/or the like. The screen may further be a touch screen to allow the user to interact with the control unit 102. The user interface 120 may also include a sound interface, for example, a speaker, a buzzer, a piezoelectric device and/or the like for generating one or more sound indications, for example, a ready sound indication, a failure sound indication and/or the like.

Optionally, the nail polish applying and solidifying apparatus 100, for example, the apparatus 100A, 100B, 100C and/or 100D includes a network interface 122 operated by the control unit 102 for communicating with one or more remote devices over one or more networks 150, in particular wireless networks. The network interface 122 may support one or more communication protocols, standards, implementations and/or deployments. The network interface 122 may support, for example, Wireless Local Area Network (WLAN), Bluetooth, Near Field communication (NFC), cellular communication and/or the like. The network interface 122 may support infrastructure connection(s), for example, WLAN (e.g. Wi-Fi) through one or more infrastructure devices, for example, an access point, a router, a switch and/or the like. The network interface 122 may further support AD-Hoc and/or point-to-point connections, for example, WLAN (e.g. AD-Hoc Wi-Fi), Bluetooth and/or the like. Through the network interface 122, the control unit 102 may communicate with the remote device(s), for example, a mobile device of the user, a local network node and/or the like. In such implementation, the control unit 102 may communicate with a mobile device of the user to present information to the user through a display of the mobile device, for example, the status information, the progress of the nail polish application solidification and cleaning session and/or the like. In case the network interface 122 is connected to an infrastructure network 150 providing access to the internet, the control unit 102 may further communicate with one or more remote servers, cloud services and/or the like.

Moreover, specifically in case the nail polish applying and solidifying apparatus 100 utilizes one or more capsules such as the capsules 500, the nail polish applying and solidifying apparatus 100 may include one or more communication interfaces for communicating with communication devices which may be integrated, attached and/or coupled to the capsule(s) 500. The nail polish applying and solidifying apparatus 100 may communicate with one or more of the capsule(s) 500 to identify one or more attributes and/or parameters of the respective capsule, for example, a unique identifier of the capsule, the type of a nail polish contained in the respective capsule, a color of the nail polish, an amount (volume) of the nail polish, a viscosity coefficient of the nail polish, a solidification period and/or the like.

The nail polish applying and solidifying apparatus 100 may include several types of communication interfaces for communicating with the capsule(s) 500. For example, the nail polish applying and solidifying apparatus 100 may include a NFC interface for communicating with a NFC device integrated, attached and/or coupled to one or more of the capsule(s) 500 inserted in the capsule compartment(s) 114. In another example, the nail polish applying and solidifying apparatus 100 may include a Radio Frequency (RF) interface configured to interact with an RFID device integrated, attached and/or coupled to one or more of the capsule(s) 500 inserted in the capsule compartment(s) 114.

The control unit 102 may further operate and/or adjust operation of one or more elements of the nail polish applying and solidifying apparatus 100, for example, the nail polish applying element 106, the solidifying energy source 108, the nail polish removal element 116 and/or the like according to one or more attributes and/or parameters of the capsule(s) 500. For example, the control unit 102 may operate the nail polish applying elements 106C and/or solidifying energy sources 108 according to the viscosity of the nail polish contained in the capsule(s) 500 where the viscosity may be computed based on the viscosity coefficient of the nail polish read from the capsule(s). In another example, the control unit 102 may set an operation period, a speed, and/or an advancement pace (rate) of the solidifying energy source 108 according to the solidifying period read from the capsule(s). In another example, the control unit 102 may analyze the unique identifier of a certain capsule 500 to identify whether the certain capsule 500 was used before or whether it is new. Moreover, in case the communication device of a certain capsule 500 is capable of storing data, the communication device may store an indication of usage of the certain capsule 500 in the nail polish applying and solidifying apparatus 100. When communicating with the communication device of the certain capsule 500, the control unit 102 may therefore collect information relating to previous usage events of the certain capsule 500, for example, determine whether the certain capsule 500 is new or used.

The nail polish applying and solidifying apparatus 100, for example, the apparatus 100A, 100B, 100C and/or 100D may include a power supply 140 for powering one or more of the operational units of the nail polish applying and solidifying apparatus 100, for example, the control unit 102, the actuator(s) 112, the solidifying energy source(s) 108, the user interface 120, the network interface 122 and/or the like. The power supply 140 may include a power circuit adapted to receive power from a power grid, for example, 110 Vac/60 Hz, 220 Vac/50 Hz and/or the like. The nail polish applying and solidifying apparatus 100 may include a power cord connecting the power supply 140 to a power outlet. In another example, the power supply 140 may be adapted to receive its power from a DC power source providing, for example, 3 Vdc, 5 Vdc, 12 Vdc, 24 Vdc and/or the like.

Optionally, the power supply 140 includes a power circuit adapted to utilize one or more batteries to generate the power for the operational units of the nail polish applying and solidifying apparatus 100. The power supply 140 may further include a charging circuit for recharging the batteries from the power grid. In case the power supply 140 is capable of utilizing the battery(s), the nail polish applying and solidifying apparatus 100 may include a battery(s) compartment adapted to receive and accommodate one or more batteries. The battery(s) compartment may be fitted with contacts to connect the battery(s)' poles to the power circuit of the power supply 140.

Reference is now made to FIG. 18A and FIG. 18B, which are perspective side and top views of exemplary embodiments of a nail polish applying and solidifying apparatus such as the nail polish applying and solidifying apparatus 100, according to some embodiments of the present invention. The exemplary nail polish applying and solidifying apparatus 100 demonstrates an exemplary industrial and functional design which may be applied to one or more of the presented nail polish applying and solidifying apparatuses, for example, the nail polish applying and solidifying apparatus 100A and/or the nail polish applying and solidifying apparatus 100B.

The nail polish application apparatus 100 may comprise an enclosure made of one or more materials, for example, plastic, metal, complex materials and/or the like which contains the operational elements of described herein before for the nail polish applying and solidifying apparatus 100, for example, the apparatus 100A, 100B, 100C and/or 100D. While most of the operational elements of the nail polish applying and solidifying apparatus 100 may not be visible as they may be internal, at least some of the features of the nail polish applying and solidifying apparatus 100 may be seen. The nail polish applying and solidifying apparatus 100 may include an exemplary treatment space such as the treatment space 130. The exemplary treatment space 130 includes 4 finger sockets such as the finger socket 132 to host four fingers (excluding the thumb) of the user. The nail polish applying and solidifying apparatus 100 further comprises a hand rest ledge such as the hand rest ledge 134 to support the user to comfortably rest his hand while placing his fingers in the finger sockets 132.

The nail polish applying and solidifying apparatus 100 may further include a capsule compartment such as the capsule compartment 114 adapted to receive and accommodate one or more disposable capsules such as the capsule 500. The capsule compartment 114 further includes a lid (a cover) that may be closed after inserting the capsule 500 into the capsule compartment 114.

The nail polish applying and solidifying apparatus 100 also includes an exemplary user interface such as the user interface 120 comprising status indication lights, for example, operational status, Bluetooth connection status and mobile device platform type (e.g. iOS, Android, etc.) of the connected (paired) mobile device of the user. The exemplary user interface 120 further includes an ON/OFF push button.

The nail polish applying and solidifying apparatus 100 may further include a nail polish removal space such as the nail polish removal space 136 in which nail polish residues may be removed from the skin surrounding the nail surface(s) and/or nail polish previously applied on one or more of the nail surfaces of the user.

Reference is now made to FIG. 19, which is a flow chart of an exemplary process of automatically applying nail polish to nail surface(s) and solidifying the nail polish using solidifying light source(s), according to some embodiments of the present invention. An exemplary process 1900 of automatically applying nail polish to one or more nail surfaces and solidifying the nail polish may be executed by one or more processors of a control unit such as the control unit 102 of a nail polish applying and solidifying apparatus such as the nail polish applying and solidifying apparatus 100, for example, the nail polish applying and solidifying apparatus 100A, 100B, 100C and/or 100D.

As shown at 1902, the automatic nail polish application and solidification process 1900 starts with the control unit 102 analyzing the sensory data collected form one or more imaging sensors such as the imaging sensor 104 deployed to depict a treatment space such as the treatment space 130 constructed in the nail polish applying and solidifying apparatus 100.

The control unit 102 may continuously repeat this step throughout the process 1900 to collect updated sensory data. Moreover, the control unit 102 may automatically control one or more operations of the operational elements of the nail polish applying and solidifying apparatus 100 according to analysis of the continuously captured and collected sensory data.

As shown at 1904, based on the analysis of the sensory data, the control unit 102 may detect one or more nail surfaces of fingers of the user located in the treatment space 130, specifically in finger socket(s) such as the finger sockets 132.

Optionally, the control unit 102 analyzes the sensory data, specifically the visual sensory data to estimate compliance of the detected nail surface(s) for nail polish application. For example, based on the analysis the control unit 102 may estimate whether the nail surface(s) are broken or damaged such that nail polish application and solidification process may be ineffective.

Optionally, based on the analysis of the sensory data, the control unit 102 identifies old (solidified) nail polish or nail polish residues on one or more of the nail surfaces which may be left from one or more previous applications of nail polish on the nail surface(s). The control unit 102 may further operate one or more of the nail polish removal elements 116 to remove the old nail polish residues from one or more of the nail surfaces.

As shown at 1906, based on the analysis of the sensory data, the control unit 102 operates one or more actuators such as the actuator 112 to maneuver one or more nail polish applying elements such as the nail polish applying element 106 to properly locate and position them with respect to the identified nail surface(s). The control unit 102 further operates the nail polish applying element 106 to crudely apply the nail polish on one or more of the identified nail surface(s). The control unit 102 may continuously, throughout the nail polish application and solidification process 1900, collect new sensory data from the imaging sensor(s) 104 and operate the actuators to adjust the movement of the nail polish applying element(s) 106 accordingly. Step 1906 may be repeated until the control unit 102 determines based, for example, on the analysis of the sensory data that the nail polish is properly applied on the nail surface(s).

Optionally, the nail polish was manually applied on the nail surface of one or more of the fingers identified in the treatment space 130 prior to the user placing the finger(s) in the treatment space 130 such that the applied nail polish is not solidified, i.e. not in the solid state. The manually applied and unsolidified nail polish may be identified by the control unit 102 by analyzing the sensory data depicting the nail surface(s).

As shown at 1908, based on the analysis of the sensory data, the control unit 102 may operate one or more solidifying energy sources such as the solidifying energy sources 108 to solidify the nail polish applied on the nail surface(s).

Optionally, the control unit 102 operates one or more of the solidifying energy sources 108 to solidify only nail polish applied within the boundary(s) of the nail surface(s) while preventing solidification of nail polish applied on areas outside the boundary(s), for example, the skin surrounding the nail surface(s). As such only the nail polish applied within the boundary(s) of the nail surface(s) is accurately solidified while the nail polish applied outside the boundary(s) is left unsolidified, for example, remains in the liquid state.

For example, in the nail polish applying and solidifying apparatus 100A, the control unit 102 may operate one or more of the solidifying light array 108AA and/or the moveable focused solidifying light source 108AB to project light on the nail surface(s). Optionally, the control unit 102 may operate one or more of the solidifying light array 108AA and/or the moveable focused solidifying light source 108AB to project light only within the boundary(s) of the nail surface(s) while preventing light projection on areas outside the boundary(s). In another example of the nail polish applying and solidifying apparatus 100A embodiment, the control unit 102 may operate one or more of the wide angle solidifying light sources 108AC to project solidifying light on the nail surface(s). Optionally, the control unit 102 may operate one or more of the wide angle solidifying light sources 108AC in conjunction with one or more of the light masking screens 110, for example, the light masking screen 110A, the light masking screen 110B and/or the light masking screen 110C to accurately project light only within the boundary(s) of the nail surface(s) while preventing light projection on areas outside the boundary(s).

In another example, in the nail polish applying and solidifying apparatus 100B, the control unit 102 may operate one or more of the air blowers 108B to blow air, optionally heated, on the nail surface(s). Optionally, the control unit 102 may operate one or more of the air blowers 108B to blow air only within the boundary(s) of the nail surface(s) while preventing blowing air on areas outside the boundary(s), for example, the skin surrounding the nail surface(s). As such only the nail polish applied within the boundary(s) of the nail surface(s) is accurately solidified while the nail polish applied outside the boundary(s) is not solidified, for example, left in the liquid state.

In another example, in the nail polish applying and solidifying apparatus 100C, the control unit 102 may operate one or more of the thermally reactive substance applying elements 108C to apply the thermally reactive substance on the nail surface(s). Optionally, the control unit 102 may operate one or more of the thermally reactive substance applying elements 108C to apply the thermally reactive substance only within the boundary(s) of the nail surface(s) while preventing application of the thermally reactive substance on areas outside the boundary(s), for example, the skin surrounding the nail surface(s). As such only the nail polish applied within the boundary(s) of the nail surface(s) which is further applied with the thermally reactive substance is solidified while the nail polish applied outside the boundary(s) which is not applied with the thermally reactive substance is not solidified, for example, left in the liquid state.

In another example, in the nail polish applying and solidifying apparatus 100D, the nail polish applying element(s) 106 are operated by the control unit 102 in step 1906 to crudely apply a first component of the nail polish on the nail surface(s). The control unit 102 may now operate one or more of the second nail polish applying elements 108D to apply the second component of the nail polish on the nail surface(s). Optionally, the control unit 102 may operate one or more of the second nail polish applying elements 108D to apply the second component only within the boundary(s) of the nail surface(s) while preventing application of the second component on areas outside the boundary(s), for example, the skin surrounding the nail surface(s). As such only the nail polish first component applied within the boundary(s) of the nail surface(s) is mixed with the second component accurately applied within the boundary(s) to accurately solidify and form the solid nail polish within the boundary(s) while the nail polish first component applied outside the boundary(s) does not mix with the second component and is thus not solidified, for example, left in the liquid state.

As shown at 1910, based on the analysis of the sensory data, in particular, sensory data depicting area(s) outside the boundary(s), the control unit 102 may operate one or of the nail polish removal elements 116 to accurately remove the nail polish residues applied outside the boundary(s), specifically on skin surrounding the nail surface(s) such as the skin 1302. Since the nail polish residues spread over the surrounding skin 1302 remains unsolidified, for example, in the liquid state, the nail polish removal element(s) 116 operated by the control unit 102 may easily remove the nail polish residues while not damaging the nail polish which is solidified on the nail surface(s) and is hence in solid state and remains intact.

Optionally, the process 1900 is stopped, paused and/or resumed manually by the user of the nail polish applying and solidifying apparatus 100.

Optionally, the control unit 102 indicates to the user of one or more status indications during the nail polish application and solidification process 1900, for example, a current phase, a time remaining to current phase completion, a time remaining to completion of the process 1900, a communication status and/or the like.

Optionally, the control unit 102 communicates with one or more remote devices, for example, a remote node and/or a mobile device of the user. The control unit 102 may communicate with the remote device(s) before, during and/or after completion and/or initiation of the process 1900.

Reference is now made to FIG. 20, which is a flow chart of an exemplary process of automatically applying nail polish to nail surface(s) while projecting solidifying light to a borderline of a boundary of the nail surface(s), according to some embodiments of the present invention. An exemplary process 2000 of automatically applying nail polish to one or more nail surfaces and solidifying the nail polish may be executed by one or more processors of a control unit such as the control unit 102 of a nail polish applying and solidifying apparatus such as the nail polish applying and solidifying apparatus 100, in particular, the nail polish applying and solidifying apparatus 100A. In particular, the process 2000 is conducted to operate one or more solidifying light sources such as the solidifying light source 108A to project light on a borderline of the nail surface(s) to limit dissemination of the nail polish, specifically nail polish fluid applied by one or more nail polish applying elements such as the nail polish applying element 106.

As shown at 2002, the automatic nail polish application and solidification process 2000 starts with the control unit 102 analyzing the sensory data collected form one or more imaging sensors such as the imaging sensor 104 deployed to depict a treatment space such as the treatment space 130 constructed in the nail polish applying and solidifying apparatus 100A.

The control unit 102 may continuously repeat this step throughout the process 2000 to collect updated sensory data. Moreover, the control unit 102 may automatically control one or more operations of the operational elements of the nail polish applying and solidifying apparatus 100A according to analysis of the continuously captured and collected sensory data.

As shown at 2004, based on the analysis of the sensory data, the control unit 102 may detect one or more nail surfaces of fingers of the user located in the treatment space 130, specifically in finger socket(s) such as the finger sockets 132.

As shown at 2006, based on the analysis of the sensory data, the control unit 102 operates one or more of the solidifying light sources 108A, for example, the solidifying light array 108AA and/or the solidifying light array 108AC coupled with the light masking screen 110C to project light on a borderline such as the borderline 1102 confining a boundary of each of the nail surface(s).

As shown at 2008, based on the analysis of the sensory data, the control unit 102 operates one or more actuators such as the actuator 112 to maneuver the nail polish applying element 106 to properly locate it with respect to the identified nail surface(s). The control unit 102 further operates the nail polish applying element 106 to crudely apply the nail polish fluid on one or more of the identified nail surface(s). The control unit 102 may continuously, throughout the nail polish application and solidification process 2000, collect new sensory data from the imaging sensor(s) 104 and operate the actuators to adjust the movement of the nail polish applying element 106 accordingly. Step 2008 may be repeated until the control unit 102 determines based, for example, on the analysis of the sensory data that the nail polish fluid is properly applied on the nail surface(s).

Dissemination of the nail polish fluid crudely applied on the nail surface(s) may be limited by the borderline 1102 since the nail polish fluid reaching the borderline 1102 which is projected with the solidifying light starts solidifying and hence stops disseminating beyond the borderline 1102.

As shown at 2010, based on the analysis of the sensory data, the control unit 102 operates one or more of the solidifying light sources 108A, for example, the solidifying light array 108AA, the moveable focused solidifying light source 108AB to project light only within the boundary(s) of the nail surface(s) while preventing light projection on areas outside the boundary(s), for example, the skin surrounding the nail surface(s). As such only the nail polish applied within the boundary(s) of the nail surface(s) is accurately solidified while the nail polish applied outside the boundary(s) is not solidified and is left in the liquid state.

Due to the fact that the nail polish fluid is prevented from spreading out of the borderline of the nail surface(s), the nail polish fluid is accurately applied and solidified only within the boundary of the nail surface(s) thus resulting in a high quality nail polish with practically no nail polish fluid residues and/or stains present on the skin surfaces surrounding the nail surface(s).

In another example, the control unit 102 may operate one or more of the wide angle solidifying light sources 108AC in conjunction with one or more of the light masking screens 110, for example, the light masking screen 110A, the light masking screen 110B and/or the light masking screen 110C to accurately project light only within the boundary(s) of the nail surface(s) while preventing light projection on areas outside the boundary(s) thus accurately solidifying the nail polish fluid applied with the boundary(s) while the nail polish applied outside the boundary(s) is not solidified and is left in the liquid state.

Optionally, the process 2000 is stopped, paused and/or resumed manually by the user of the nail polish applying and solidifying apparatus 100A.

Optionally, the control unit 102 indicates to the user of one or more status indications during the nail polish application and solidification process 2000, for example, a current phase, a time remaining to current phase completion, a time remaining to completion of the process 2000, a communication status and/or the like.

Optionally, the control unit 102 communicates with one or more remote devices, for example, a remote node and/or a mobile device of the user. The control unit 102 may communicate with the remote device(s) before, during and/or after completion and/or initiation of the process 2100.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methodologies, materials and/or substances will be developed and the scope of the term nail polish is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. An apparatus for nail polish application and solidification, comprising:
- at least one nail polish applying element configured to apply nail polish;
- at least one actuator;
- at least one solidifying energy source configured to solidify nail polish;
- at least one nail polish removal element configured to remove nail polish;
- at least one imaging sensor configured to capture sensory data depicting a treatment space;
- a light masking screen deployed between the at least one solidifying energy source and the treated space, the light masking screen is configured to limit solidifying light emitted from the at least one solidifying energy source to project on a limited surface area; and at least one processor executing a code for:

analyzing the sensory data to identify at least one nail surface of at least one finger, calculating instructions for operating the at least one nail polish applying element to crudely apply nail polish on the at least one nail surface, calculating instructions for operating the at least one actuator for moving the light masking screen according to an analysis of the sensory data such that solidifying light transferred by the light masking screen is projected only within a boundary of the at least one nail surface;

calculating instructions for operating the at least one solidifying energy source to solidify the nail polish applied on the at least one nail surface, and calculating instructions for operating the at least one nail polish removal element to remove nail polish residues applied on skin of the at least one finger surrounding at least partially the boundary of the at least one nail surface while avoiding removing the nail polish applied within the boundary.

2. The apparatus of claim 1, wherein the nail polish comprises at least one member of a group consisting of: a nail polish material, a base coating material, a top coating material, a gel polish material, a drying material, a polish removal material, a nail art polish and a medical nail treatment material.

3. The apparatus of claim 1, further comprising the at least one nail polish applying element is moveable by at least one actuator, the at least one processor calculates instructions for operating the at least one actuator according to the analysis to move the at least one nail polish applying element with respect to the at least one nail surface.

4. The apparatus of claim 1, wherein the at least one nail polish applying element is part of a nail polish capsule inserted in a capsule compartment of the apparatus.

5. The apparatus of claim 1, wherein the at least one processor is further configured to execute code for calculating instructions for operating the at least one solidifying energy source to accurately solidify only nail polish applied within the boundary while avoiding solidification of the nail polish residues applied on the surrounding skin.

6. The apparatus of claim 1, wherein the at least one solidifying energy source comprises at least one solidifying light source configured to project solidifying light to solidify the nail polish, the solidifying light is a member of a group consisting of: Infra-Red (IR) light, Ultra Violate (UV) light and a coherent laser beam.

7. The apparatus of claim 1, wherein the at least one solidifying energy source comprises at least one air blower configured to blow air to solidify the nail polish.

8. The apparatus of claim 1, wherein the at least one solidifying energy source comprises at least one thermally reactive substance applying element configured to apply at least one thermally reactive substance configured to solidify the nail polish by producing heat on interaction with the nail polish applied on the at least one nail surface.

9. The apparatus of claim 1, wherein the at least one solidifying energy source comprises at least one second nail polish applying element configured to apply a second nail polish component while the at least one nail polish applying element is configured to apply a first nail polish component, mixture of the first component and the second component on the at least one nail surface solidifies the nail polish into a solid nail polish.

10. The apparatus of claim 1, further comprising the at least one solidifying energy source is moveable by at least one actuator, the at least one processor calculates instructions for operating the at least one actuator according to the analysis to move the at least one solidifying energy source with respect to the at least one nail surface.

11. The apparatus of claim 1, further comprising the at least one nail polish removal element is moveable by at least one actuator, the at least one processor calculates instructions for operating the at least one actuator according to the analysis to move the at least one nail polish removal element with respect to the at least one nail surface.

12. The apparatus of claim 1, wherein the at least one nail polish removal element further comprising at least one wall segment constructed to shield at least part of the at least one nail surface when deployed on the boundary while the at least one nail polish removal element is operated to remove the nail polish from the skin surrounding the at least one nail surface such that the nail polish applied on the at least one nail surface is not affected by operation of the at least one nail polish removal element.

13. The apparatus of claim 1, further comprising at least one protective substance applying element configured to apply protective substance to the skin prior to application of the nail polish to prevent the nail polish from adhering to the skin.

14. The apparatus of claim 1, further comprising at least one protective screen deployed over the at least one nail surface within the boundary while the at least one nail polish removal element is operated to remove the nail polish from the skin surrounding the at least one nail surface such that the nail polish applied on the at least one nail surface is not affected by operation of the at least one nail polish removal element.

15. The apparatus of claim 1, wherein the at least one imaging sensor comprising at least one Radio Frequency (RF) sensor configured to transmit radio waves and intercept reflected waves reflected from objects in the treatment space to create at least one image of the treatment space.

16. The apparatus of claim 1, wherein the analysis comprises image processing for identifying at least one of:

detecting at least one segment of the boundary of the at least one nail surface, detecting a three dimension (3D) surface of the at least one nail surface, detecting a 3D surface of the skin surrounding the at least one nail surface, detecting a movement of the at least one nail surface in the nail polish treatment space, and estimating a drying state of the nail polish applied on the at least one nail surface.

17. The apparatus of claim 1, further comprising at least one finger socket in the treatment space, the at least one finger socket having a surface shaped to receive and accommodate the at least finger which is a member of a group consisting of: a human finger and a human toe.

* * * * *